United States Patent
Hayes et al.

(10) Patent No.: US 10,984,411 B1
(45) Date of Patent: Apr. 20, 2021

(54) SENDING SECURE PROXY ELEMENTS WITH MOBILE WALLETS

(71) Applicant: Wells Fargo Bank, N.A., San Francisco, CA (US)

(72) Inventors: Thomas Hayes, Katy, TX (US); Joon Maeng, Newcastle, WA (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 889 days.

(21) Appl. No.: 15/382,116

(22) Filed: Dec. 16, 2016

(51) Int. Cl.
    *G06Q 20/36* (2012.01)
    *G06Q 20/40* (2012.01)

(52) U.S. Cl.
    CPC ........... *G06Q 20/367* (2013.01); *G06Q 20/40* (2013.01)

(58) Field of Classification Search
    None
    See application file for complete search history.

(56) References Cited

U.S. PATENT DOCUMENTS

| | | |
|---|---|---|
| 8,463,674 B2 | 6/2013 | Hurst |
| 8,511,543 B2 | 8/2013 | Yankovich |
| 8,566,168 B1 | 10/2013 | Bierbaum et al. |
| 8,589,267 B2 | 11/2013 | Hurst |
| 8,676,709 B2 | 3/2014 | Kunz et al. |
| 9,064,249 B1 | 6/2015 | Borovsky et al. |
| 9,100,383 B2 | 8/2015 | Gantman et al. |
| 9,288,259 B2 | 3/2016 | Shao et al. |
| 2002/0054044 A1 | 5/2002 | Lu et al. |
| 2008/0052224 A1 | 2/2008 | Parker |

(Continued)

FOREIGN PATENT DOCUMENTS

| | | |
|---|---|---|
| CN | 104219551 A | 12/2014 |
| CN | 104426870 A | 3/2015 |

(Continued)

OTHER PUBLICATIONS

Wu, et al. A cloudlet-based multi-lateral resource exchange framework for mobile users, Apr. 1, 2015, 2015 IEEE Conference on Computer Communications, pp. 927-935 (Year: 2015).*

*Primary Examiner* — Elda G Milef
*Assistant Examiner* — Gregory S Cunningham, II
(74) *Attorney, Agent, or Firm* — Schwegman Lundberg & Woessner, P.A.

(57) ABSTRACT

Various examples are directed to systems and methods for securely sending and using proxy element in a mobile wallet system. Through a user interface associated with a proxy originator wallet, user input may be received that defines the parameters of the proxy element. The parameters may include one or more of a spending limit, a time duration, a use number condition, and a transfer condition, and a product condition. A request may be sent from the proxy originator wallet to a proxy approver system to create the proxy element. The originator wallet may receive a proxy grant acknowledgement from the proxy approver system. The grant acknowledgement may instructions for obtaining credentials for the proxy element. The proxy element including the parameters and the instructions for obtaining credentials may be sent to a mobile wallet of a recipient. The recipient mobile wallet may use the proxy element for payment or non-payment transactions.

16 Claims, 36 Drawing Sheets

(56) References Cited

U.S. PATENT DOCUMENTS

| | | |
|---|---|---|
| 2009/0247136 A1 | 10/2009 | Srinivasan et al. |
| 2010/0125495 A1* | 5/2010 | Smith ................ G06Q 20/3223 |
| | | 705/14.23 |
| 2011/0295744 A1 | 12/2011 | Wisniewski et al. |
| 2013/0013499 A1* | 1/2013 | Kalgi .................... G06Q 20/12 |
| | | 705/41 |
| 2013/0046690 A1 | 2/2013 | Calman et al. |
| 2013/0226812 A1 | 8/2013 | Landrok et al. |
| 2014/0019352 A1* | 1/2014 | Shrivastava ......... G06Q 20/326 |
| | | 705/41 |
| 2014/0032394 A1 | 1/2014 | Liberty et al. |
| 2014/0195425 A1* | 7/2014 | Campos ................ G06Q 20/20 |
| | | 705/41 |
| 2014/0214640 A1* | 7/2014 | Mallikarjunan ....... G06Q 20/36 |
| | | 705/35 |
| 2014/0258019 A1 | 9/2014 | Cummins et al. |
| 2014/0297438 A1* | 10/2014 | Dua .................... G06Q 20/202 |
| | | 705/21 |
| 2015/0066757 A1 | 3/2015 | Shenoy et al. |
| 2015/0088753 A1* | 3/2015 | Van Der Schueren ..................... |
| | | G06Q 20/351 |
| | | 705/67 |
| 2015/0254699 A1 | 9/2015 | Bondesen et al. |
| 2016/0094991 A1* | 3/2016 | Powell ................... G06Q 20/32 |
| | | 455/411 |
| 2016/0239842 A1* | 8/2016 | Cash .................... G06Q 20/102 |
| 2016/0283925 A1* | 9/2016 | Lavu .................. G06Q 30/0222 |
| 2017/0017958 A1* | 1/2017 | Scott ...................... G06Q 20/40 |
| 2017/0357972 A1* | 12/2017 | Van Os .................. G06Q 20/29 |
| 2018/0025353 A1* | 1/2018 | Collinge ............. G06Q 20/322 |
| | | 705/71 |

FOREIGN PATENT DOCUMENTS

| | | |
|---|---|---|
| WO | WO-02063526 A1 | 8/2002 |
| WO | WO-201583574 A1 | 12/2015 |

\* cited by examiner

SENDING SECURE PROXY ELEMENTS WITH MOBILE WALLETS

TECHNICAL FIELD

Disclosed herein are apparatuses, systems, and methods that generally relate to electronic repositories for secure and authenticated data blocks. Such electronic repositories may be applied as electronic wallets, but the invention is not limited thereto and may comprise various implementations for the use of such electronic repositories. This disclosure, for example and without limitation, also relates to secure proxy elements for such electronic repositories.

BACKGROUND

Certain types of data in a computer-based storage environment benefit from being secure and being authenticated, meaning that one without authority or without utilizing proper procedures, may not modify this data. Such data may be held in an electronic repository of a device or system. One non-limiting example of such an electronic repository is a mobile wallet, and the secure and authenticated data are elements within the mobile wallet. Mobile wallets may allow consumers to make payments for products and services with mobile computing devices instead of cash, credit cards or checks. Mobile wallets may also store non-payment elements such as identification cards, insurance cards, and the like, for users.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1:
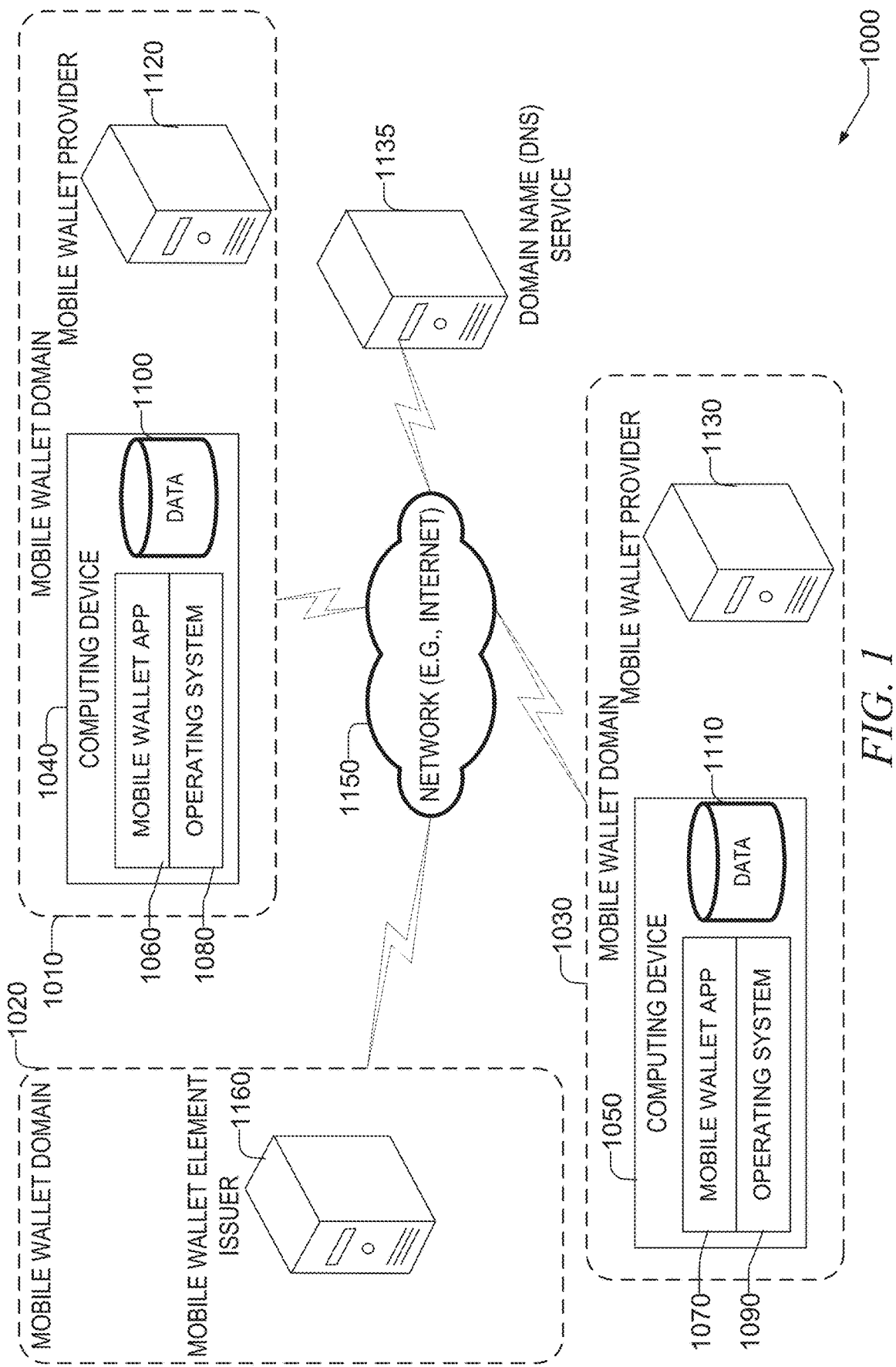
FIG. 1 shows a schematic of a mobile wallet secure digital communication environment according to some examples of the present disclosure.

A computer-based electronic storage element may benefit from being secure and being authenticated, as described above. A networked computer-based system may be utilized to ensure the integrity and use of such an electronic storage element. Many uses of such electronic storage elements may be made. By way of example only, the present disclosure considers a mobile wallet as one non-limiting example of such an element.

A mobile wallet (also known as an electronic or digital wallet) refers to an application program executed by one or more computing devices (e.g., mobile devices such as a smartphone) and corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student ids, library cards, membership cards, insurance cards, and so on. The mobile wallet application allows an individual to use the stored information to pay for items (either in person or in e-commerce transactions), provide for identification (e.g., producing a driver's license), transfer money to others, access bank accounts, collect discount coupons, submit subway passes, and the like. As another example, a mobile wallet may be used to verify the age of a buyer while purchasing alcohol. Examples of mobile wallets include but are not limited to WELLS FARGO WALLET® (provider Wells Fargo), APPLE PAY® (provider Apple), ANDROID PAY®, GOOGLE WALLET® (provider Google), CURRENT C® by MCX®, SAMSUNG PAY®, PAYPAL®, STARBUCKS APP®, and peer-to-peer payment apps such as VENMO®, SQUARE CASH®, and TILT APP®.

Mobile wallet applications of one user presently do not securely communicate with the mobile wallet applications of another user. The user of the mobile wallet must perform any such communications out-of-channel through email, short message service, or the like. These communications may not be secure.

Disclosed in some examples are methods, systems, and machine readable mediums for secure end-to-end digital communications involving mobile wallets. The result may produce direct, secure, in-band messaging using mobile wallets that may be used to send messages such as payments, requests for money, financial information, messages to authorize a debit or credit, and/or messages to provide an identification of the user.

In some examples, mobile wallets may each have an address which will utilize a new Internet top-level domain. For example, fred.jones@abc.mwallet, where "abc" is a mobile wallet domain and mwallet is the top-level domain. While ".mwallet" is used herein, one of ordinary skill with the benefit of the present disclosure will appreciate that other top-level domain names may be utilized. A mobile wallet domain may provide one or more services to the mobile wallets in its domain to facilitate mobile wallet communications. In some examples, mobile wallet domains may be provided by mobile wallet providers.

In an example process, a first mobile wallet (sender mobile wallet) sends a message to a second mobile wallet (recipient mobile wallet) by utilizing a mobile wallet message transfer agent (MTA) provided by its mobile wallet domain. The MTA of the sender mobile wallet retrieves the public key of the recipient mobile wallet from a public key server (PKS) provided by the recipient's mobile wallet domain. The sender mobile wallet encrypts the message with this public key, sends it to the MTA in its mobile wallet domain, which then sends the message to an MTA provided by the recipient's mobile wallet domain. The recipient mobile wallet domain's MTA stores the encrypted message in a message storage agent (MSA). The MSA notifies the recipient mobile wallet application of the request. The recipient mobile wallet may then download the message and decrypt it with its private key. The encryption keys may be created by the mobile wallets or the mobile wallet domains. The public key may be stored with a PKS and the private key may be maintained in one or more of: the mobile wallet in an encrypted form, the mobile wallet domain provider (e.g., mobile wallet provider), and a trusted third party (which may not be related to the mobile wallet domain provider).

Through utilizing this process, two mobile wallets may securely communicate. Additionally, mobile wallet communications may not be limited to two mobile wallets communicating. The methods and systems disclosed here may be utilized where only one endpoint is a mobile wallet. For example, a merchant may accept a mobile wallet payment through a mobile wallet message. Mobile wallets may communicate with one or more financial institutions using the methods and systems described to authorize payments, deduct funds, transfer funds, and the like. Mobile wallets may communicate with any number of endpoints using the disclosed techniques. Other example endpoints include government agencies, individuals, sellers, buyers, and the like. For example, a mobile wallet may communicate information about a digital identification with a merchant to provide age verification for certain products.

Turning now to FIG. 1, a schematic 1000 of a mobile wallet secure digital communication environment is shown according to some examples of the present disclosure. Three mobile wallet domains 1010, 1020, and 1030 are shown. Mobile wallet domains 1010 and 1030 include two respective user computing devices 1040 and 1050 with mobile wallet applications 1060 and 1070 executing along with operating systems 1080 and 1090 respectively. Mobile wallet domains may be provided by one or more mobile wallet providers. Mobile wallet providers may administer one or more mobile wallet domains. The mobile wallet applications 1060 and 1070 may originate from the mobile wallet providers 1120 and 1130 respectively.

Mobile wallet applications 1060 and 1070 store one or more data structures that store digital representations of payment and non-payment elements of the user. In some examples, this may be identification information (drivers licenses), financial information (credit card information, bank card information, bank account information), and the like. A digital representation may include one or more information fields stored by the mobile wallet and providing information about the user (e.g., account number, user age, user name, and the like) and in some cases verification (e.g., a certificate or other way to assure that the digital representation is authentic). Operating systems 1080 and 1090 provide services to the mobile wallets (and other applications) on the computing devices 1040 and 1050, such as scheduling tasks for execution, controlling peripherals, providing an interface to the hardware, managing memory, and the like.

Computing devices 1040 and 1050 may also contain data storage devices 1100 and 1110 that may store mobile wallet application data, including mobile wallet messages, encryption keys, address books, data structures storing information about the user of the computing device (such as information on payment and non-payment elements of the mobile wallet), and the like. Mobile wallet domains 1010, and 1030 may have mobile wallet providers 1120 and 1130 that provide mobile wallet communication services to the mobile wallets within their respective mobile wallet domains 1010 and 1030. Example services include message forwarding, message storage, message encryption, and the like.

Domain Name Server (DNS) 1135 translates a domain name (e.g., abc@walletprovider.mwallet) to an Internet Protocol (IP) address that may be utilized to send messages to that mobile wallet domain. Mobile wallet domains 1010, 1020, 1030, and DNS 1135 may communicate over computer network 1150, which in some examples may be the Internet. Mobile wallet domain 1020 may include mobile wallet element issuer 1160. Mobile wallet element issuer 1160 may contain applications which may communicate with mobile wallets in other mobile wallet domains according to the present disclosure. Example mobile wallet issuers include banks, merchants, government organizations, corporations, or the like. In some examples, the mobile wallet provider (e.g., mobile wallet providers 1120 and/or 1130) and the mobile wallet element issuer 1160 may be the same entity.

Figure 2:
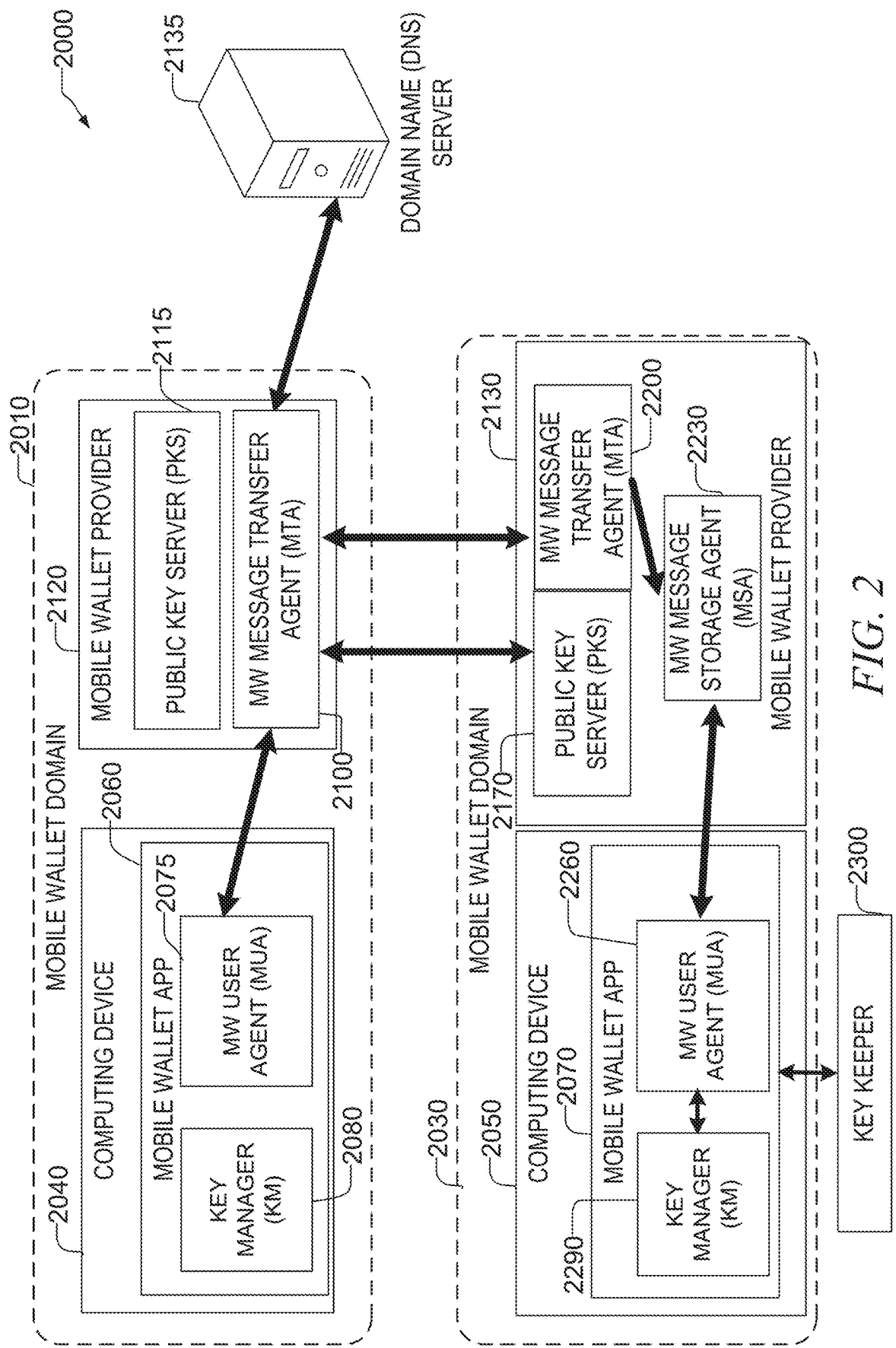
FIG. 2 shows a schematic of a mobile wallet to mobile wallet secure digital communication according to some examples of the present disclosure.

Mobile wallet element issuer 1160 may issue one or more identification cards, credit cards, bank cards, bank accounts, or the like to one or more users of mobile wallets (e.g., mobile wallet applications 1060 and 1070). Mobile wallet element issuer 1160 may include one or more of the components of mobile wallet providers 1120 and 1130 as shown in FIG. 2 (e.g., PKS, MTA, MSA). In some examples, these elements may be issued by sending the digital representations to one or more mobile wallet recipients. Thus, using the disclosed techniques, it may be possible to automatically provision and populate a mobile wallet with little consumer effort.

Turning now to FIG. 2, a schematic 2000 of a mobile wallet to mobile wallet secure digital communication is shown according to some examples of the present disclosure. Mobile wallet domain 2010 may be an example implementation of mobile wallet domain 1010 and mobile wallet domain 2030 may be an example implementation of mobile wallet domain 1030 of FIG. 1. Similarly, computing device 2040, mobile wallet application 2060 and mobile wallet provider 2120 may be an example implementation of computing device 1040, mobile wallet application 1060 and mobile wallet provider 1120 respectively of FIG. 1 in some examples. Computing device 2050, mobile wallet application 2070 and mobile wallet provider 2130 may be an example implementation of computing device 1050, mobile wallet application 1070 and mobile wallet provider 1130 respectively of FIG. 1 according to some examples.

A first mobile wallet application 2060 executing on a computing device 2040 in a first mobile wallet domain 2010 sends a message to a second mobile wallet application 2070 executing on a second computing device 2050 in a second mobile wallet domain 2030. Mobile wallet application 2060 may include a mobile wallet user agent (MUA) 2070 and a key manager 2080. The MUA 2075 allows users to compose, send, and retrieve mobile wallet (MW) messages. Key manager 2080 may perform one or more of the following actions: create, provision, register, store, and manage one or more cryptographic keys. Key manager 2080 may register (or obtain) a public key with a certificate authority (not shown for clarity) and with a PKS 2115.

A mobile wallet application 2060 may provide one or more graphical user interfaces (GUIs) to allow users to compose and edit one or more mobile wallet messages. Before sending a message, the MUA 2075 requests the recipient's public key from the MTA 2100. The PKS 2115 and MTA 2100 may be provided by the mobile wallet provider 2120 of the mobile wallet domain 2010. The PKS 2115 and MTA 2100 may be provided by the same computing device, or different computing devices. While the PKS 2115 and MTA 2100 are shown as part of the mobile wallet provider 2120, they may be provided by separate entities. The MTA and PKS are accessible to computing device 2040 and other computing devices both within the mobile wallet domain 2010 and other devices within other mobile wallet domains, over one or more networks (not shown for clarity). These networks may include one or more portions of: Local Area Networks (LAN), Wide Area Networks (WAN), Metropolitan Area Networks (MAN), the Internet, cellular networks, and the like.

The MTA 2100 first examines the message to determine which mobile wallet domain the recipient is in. If the mobile wallet domain is mobile wallet domain 2010, the MTA may retrieve the public key from the PKS 2115 of mobile wallet domain 2010. If the mobile wallet domain is in another domain, then the MTA checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to the PKS 2170 asking for the public key of the recipient mobile wallet (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature may be verified using the CA's public key (which is known and may be pre-installed on the computing devices). This may serve as a way to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the MUA 2075 then encrypts the contents of the message with the received public key and sends it to the MTA 2100. The MTA 2100 determines the IP Address of the recipient mobile wallet domain's MTA 2200. In some examples, the MTA 2100 utilizes the IP Address previously determined from the DNS server (e.g., using the cache) when retrieving the public key of the recipient. For example, the PKS 2170 and MTA 2200 may have the same IP Address, or the IP Address of the MTA 2200 may be derivable from the IP Address of the PKS 2170. In other examples, a mobile wallet application in mobile wallet domain 2010 may have previously communicated with a mobile wallet in mobile wallet domain 2030 (and thus the MTA 2100 still has the IP Address in its cache). In other examples, the MTA 2100 may re-request the IP Address from the DNS server 2135.

The MTA 2100 then sends the message 2190 to the MTA 2200 of the mobile wallet provider 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet message storage agent (MSA) 2230. The mobile wallet provider 2120 may also employ an MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in the key manager 2290. Key manager 2290 may communicate with key keeper 2300. Key keeper 2300 may be a remote key storage facility to prevent the loss of the cryptographic keys should the computing device 2050 experience a loss in data. For example, the key manager 2290 may store one or more keys of the mobile wallet application 2070 in the key keeper 2300.

In some examples, the mobile wallet application 2070 may utilize a second cryptographic key to encrypt the private key. The private key may then be stored with the mobile wallet provider 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the mobile wallet provider 2130 and thus the user may be sure that no one associated with the mobile wallet provider 2130 may access their messages. The key keeper 2300 may be a trusted entity by the mobile wallet 2070 which may be a service provider, a home computer of the mobile wallet owner, a companion device of the computing device 2050 (e.g., a smart watch that may be paired with a smartphone with mobile wallet), etc.

Figure 3:
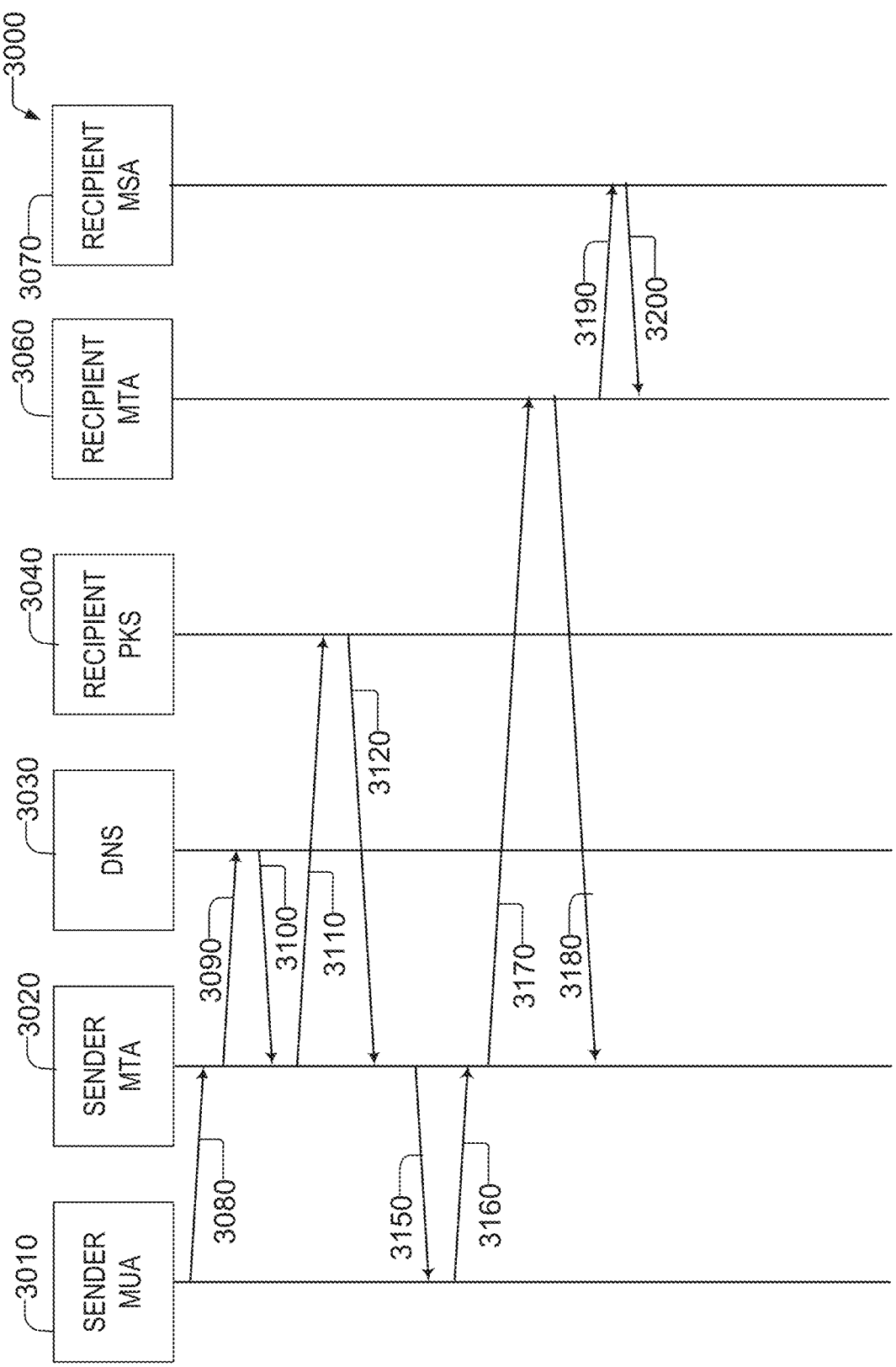
FIG. 3 shows a message sequence chart showing a mobile wallet communication according to some examples of the present disclosure.

Turning now to FIG. 3, a message sequence chart 3000 showing a mobile wallet communication is shown according to some examples of the present disclosure. Sender MUA 3010 sends a public key request 3080 to request a recipient mobile wallet's public key to the sender MTA 3020 in sender MUA 3010's mobile wallet domain. In this request, the sender MUA 3010 includes the address of the recipient mobile wallet (part of the address is a mobile wallet domain name). The sender MTA 3020 may determine the Internet Protocol Address of the mobile wallet domain name using DNS 3030 via request message 3090. Response 3100 from DNS 3030 includes the address of the recipient mobile wallet's domain. Sender MTA 3020 may then cache this address for later use. In some examples, if the sender MTA 3020 already has the IP address of the recipient PKS 3040 from a previous DNS request (e.g., in its DNS cache), messages 3090 and 3100 may not be needed.

The sender MTA 3020 then uses this address to contact the recipient public key server (PKS) 3040 using message 3110 requesting the public key of the recipient. The recipient PKS 3040 may reply with the recipient's public key using message 3120. As already noted, the response from the PKS 3040 may be a digital certificate issued by a trusted CA.

Sender MUA 3010 may then send a completed mobile wallet message 3160 to sender MTA 3020. This mobile wallet message may be encrypted by the sender MUA 3010 with the public key obtained at operation 3150. In some examples, the message is not unencrypted until received by the recipient MUA—as such, the message is encrypted end-to-end. Sender MTA 3020 may then pass this message 3170 to recipient MTA 3060 using the address received from DNS 3030 in message 3100. In some examples, if the time elapsed between the sender MUA 3010 requesting the public key of the recipient and the time between sending the message 3160 is too great, the sender MTA 3020's cache may have cleared and thus the sender MTA 3020 may have to re-request the Internet Protocol (IP) Address of the recipient mobile wallet domain. In other examples, the IP Address of the recipient PKS 3040 and the recipient MTA 3060 may be different and thus the sender MTA 3020 may have to make two separate DNS requests. In still other examples, the IP Address of the recipient MTA 3060 and the recipient PKS 3040 may be derivable from each other, such that if the sender MTA 3020 knows the IP address of one, it may determine the IP address of the other without a DNS query.

Recipient MTA 3060 may respond with a confirmation 3180 that this message was received and the recipient is a valid recipient mobile wallet. Recipient MTA 3060 then passes the message 3190 to recipient MSA 3070 for storage. Recipient MSA 3070 may acknowledge receipt of the message 3190 with ack message 3200.

Figure 4:
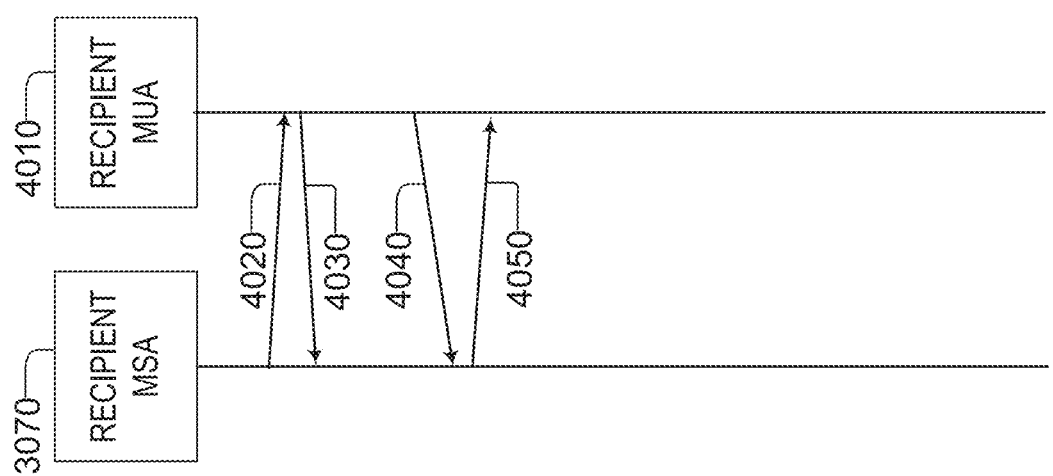
FIG. 4 shows a message sequence chart that is a continuation of FIG. 3 according to some examples of the present disclosure.

Continuing now to FIG. 4, the recipient MSA 3070 may send a message 4020 notifying the recipient mobile wallet user agent (MUA) 4010 that a message is waiting for the recipient MUA 4010. Recipient MUA 4010 may acknowledge this notification with reply message 4030. When the recipient MUA 4010 wishes to retrieve this message, recipient MUA 4010 may send a request message 4040 to the recipient MSA 3070 for the message. Recipient MSA 3070 may then send a reply 4050 with the message. Recipient MUA 4010 may then utilize its private key to decrypt and read the message. In some examples, rather than a notification, the recipient MUA 4010 may simply poll the recipient MSA 3070 periodically for new messages. In yet other examples, the recipient MSA 3070 will immediately deliver the message to the MUA 4010 unless the MUA 4010 is offline, in which case the recipient MSA 3070 will store the message until the MUA 4010 is back online (at which point it will deliver the message to the MUA 4010).

Figure 5:
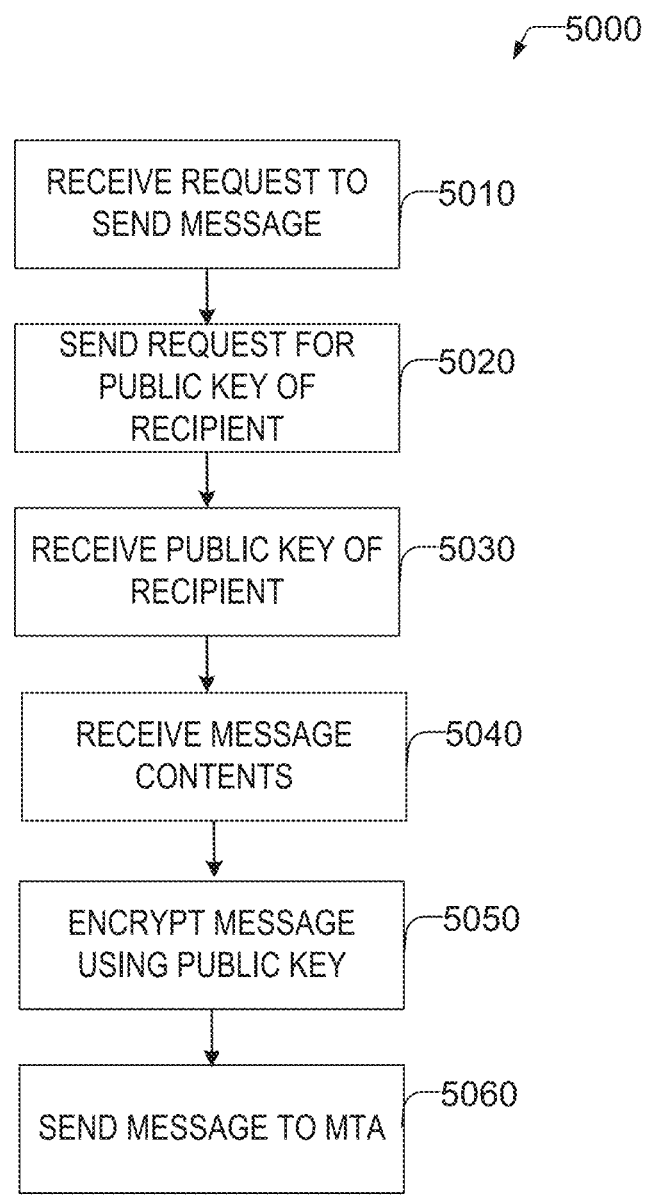
FIG. 5 shows a flowchart of a method of a mobile wallet user agent (MUA) sending a mobile wallet message according to some examples of the present disclosure.

FIG. 5 shows a flowchart of a method 5000 of a MUA sending a mobile wallet message according to some examples of the present disclosure. At operation 5010 the MUA receives a request to send a message. For example, a user utilizing a GUI provided by a mobile wallet application may request to send a message. For example, the user presses a "compose" button and enters a recipient's mobile wallet address and presses a "send" button. At operation 5020, the MUA determines the recipient(s) of the message and sends a request for the public key of the recipient(s) to the MTA of the user's current mobile wallet domain. At operation 5030, the MUA receives the public keys. These public keys may be cached or stored to avoid future calls to the MTA in future messages. In some examples, the public keys may be received as a digital certificate signed by a trusted CA. The MUA may attempt to verify the digital certificate and if the verification is successful, processing may continue, otherwise, processing may terminate and the user may be notified of the unsuccessful verification.

At operation 5040 the MUA may receive the message contents of the mobile wallet to mobile wallet message. At operation 5050 the MUA may encrypt the message using the public key received at operation 5030. At operation 5060, the MUA may send the encrypted message to the MTA. In some examples, the MTA may respond to the MUA and the MUA may retransmit the message if it did not receive the acknowledgement from the MTA. If there are multiple recipients of the mobile wallet message, the message may be encrypted and sent separately for each recipient.

Figure 6:
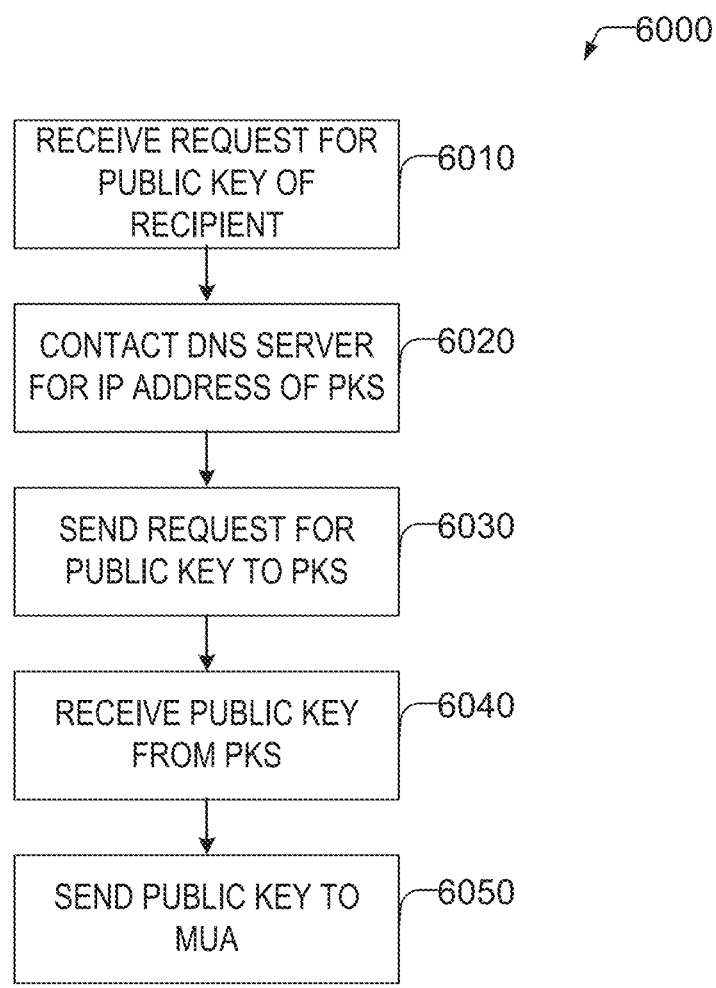
FIG. 6 shows a flowchart of a method of a message transfer agent MTA requesting a public key of a recipient mobile wallet according to some examples of the present disclosure.

FIG. 6 shows a flowchart of a method 6000 of a MTA requesting a public key of a recipient mobile wallet according to some examples of the present disclosure. At operation 6010 the MTA may receive a request for a public key of a recipient from an MUA. At operation 6020 the MTA may contact a DNS for the IP address of the PKS of the recipient mobile wallet domain. At operation 6030 the MTA sends a request to the PKS of the recipient's mobile wallet domain. At operation 6040 the MTA receives the public key from the PKS. At operation 6050 the MTA sends this public key to the MUA.

In some examples, the MTA may cache or otherwise store DNS responses. If the MTA already has the IP address of the recipient mobile wallet domain's PKS, operations 6020 and 6030 may be omitted. Additionally, the method shown may be utilized to retrieve a key for a remote mobile wallet domain. If the recipient is in the same mobile wallet domain as the sender (and also the MTA), then operations 6020 and 6030 are also not needed, and the PKS in operation 6030 is the local mobile wallet domain's PKS. Furthermore, the MTA may also cache public keys of recipient devices so as to instantly provide these keys to requesting MUAs in their mobile wallet domain. If the public key is cached (and the cache is not expired), then operations 6020-6040 are not necessary.

Figure 7:
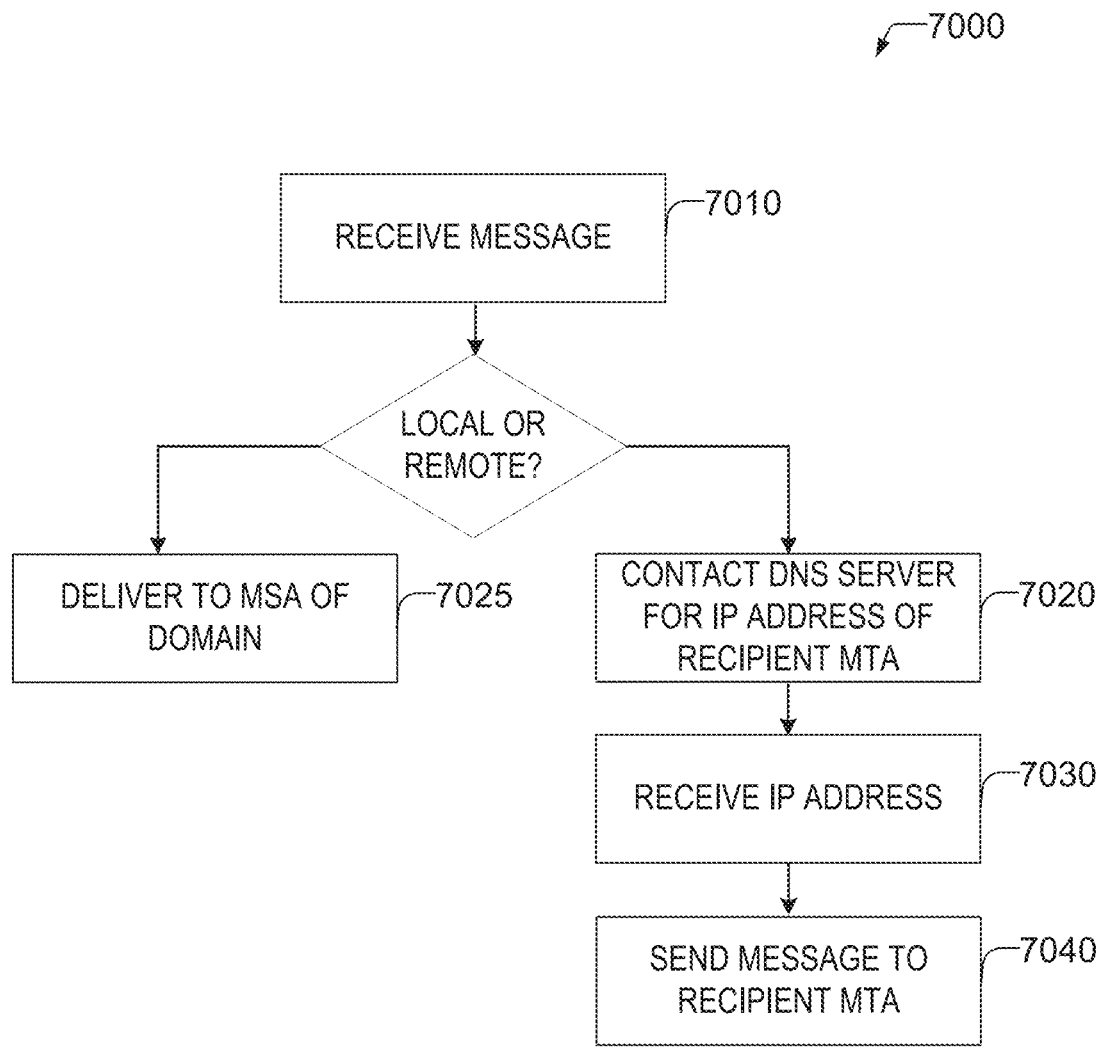
FIG. 7 shows a flowchart of a method of an MTA sending a message to another MTA according to some examples of the present disclosure.

FIG. 7 shows a flowchart of a method 7000 of an MTA sending a message to another MTA according to some examples of the present disclosure. At operation 7010, the MTA may receive a completed message for sending to another mobile wallet. This message may be encrypted, however, the header identifies its destination. If the message is to another mobile wallet in the same mobile wallet domain, the MTA may deliver the message to the message storage agent of the mobile wallet domain at operation 7025. Otherwise, at operation 7020, the MTA may contact the DNS server for the IP address of the recipient MTA. In some examples, if the MUA previously requested the public key, it is possible that the DNS record is cached and this operation is not needed. At operation 7030, the IP address is received. At operation 7040, the message is sent to the IP address received at operation 7030. In some examples, the message may be sent using standard Internet protocols such as Internet Protocol (IP), Transmission Control Protocol (TCP), HyperText Transfer Protocol (HTTP), Simple Mail Transfer Protocol (SMTP), and the like.

Figure 8:
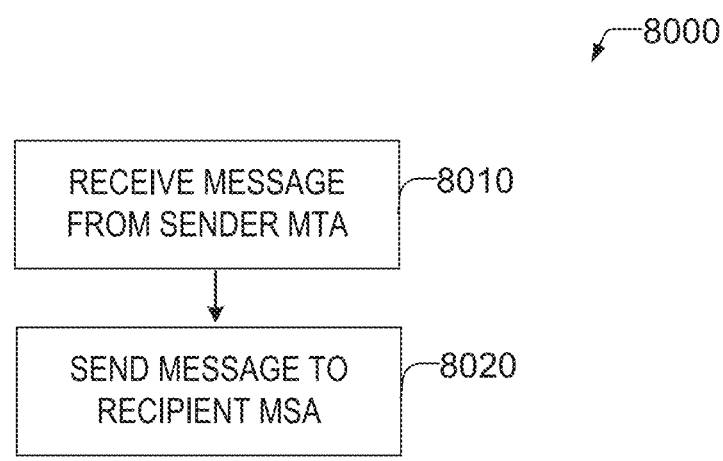
FIG. 8 shows a flowchart of a method of an MTA receiving a message sent by another MTA according to some examples of the present disclosure.

FIG. 8 shows a flowchart of a method 8000 of an MTA receiving a message sent by another MTA according to some examples of the present disclosure. At operation 8010 the MTA receives the message from the sender MTA. At this point, the MTA may verify that the intended recipient is registered with the mobile wallet domain and is a proper recipient. If the MTA is a proper recipient, then, at operation 8020, the message is sent to the recipient MSA for storage.

Figure 9:
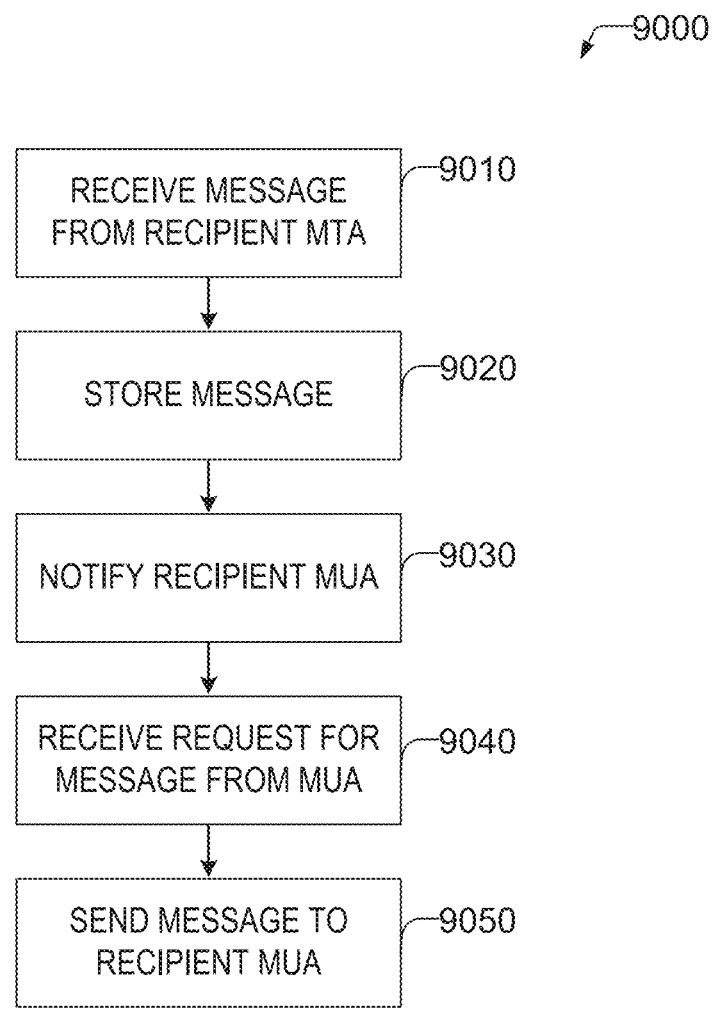
FIG. 9 shows a flowchart of a method of a recipient message storage agent (MSA) receiving a message according to some examples of the present disclosure.

FIG. 9 shows a flowchart of a method 9000 of a recipient MSA receiving a message according to some examples of the present disclosure. At operation 9010, an MTA sends the MSA a message destined for a mobile wallet in the MSA's mobile wallet domain. The MSA stores the message at operation 9020. This may be a storage device, a database, or the like. At operation 9030 the recipient MUA of the recipient's computing device is notified. For example, the MUA may register its address with the MSA to be notified of new communications. The notification may be a message sent over a network to the MUA. The MUA may then respond by downloading the message. At operation 9040 the MUA may request the message. This request may include one or more verifications to ensure that only the recipient MUA is allowed to access the message. At operation 9050, the message is sent to the recipient MUA. In some examples, once the message is delivered, the message may be deleted from storage. In other examples, the message may be retained for later downloading.

Figure 10:
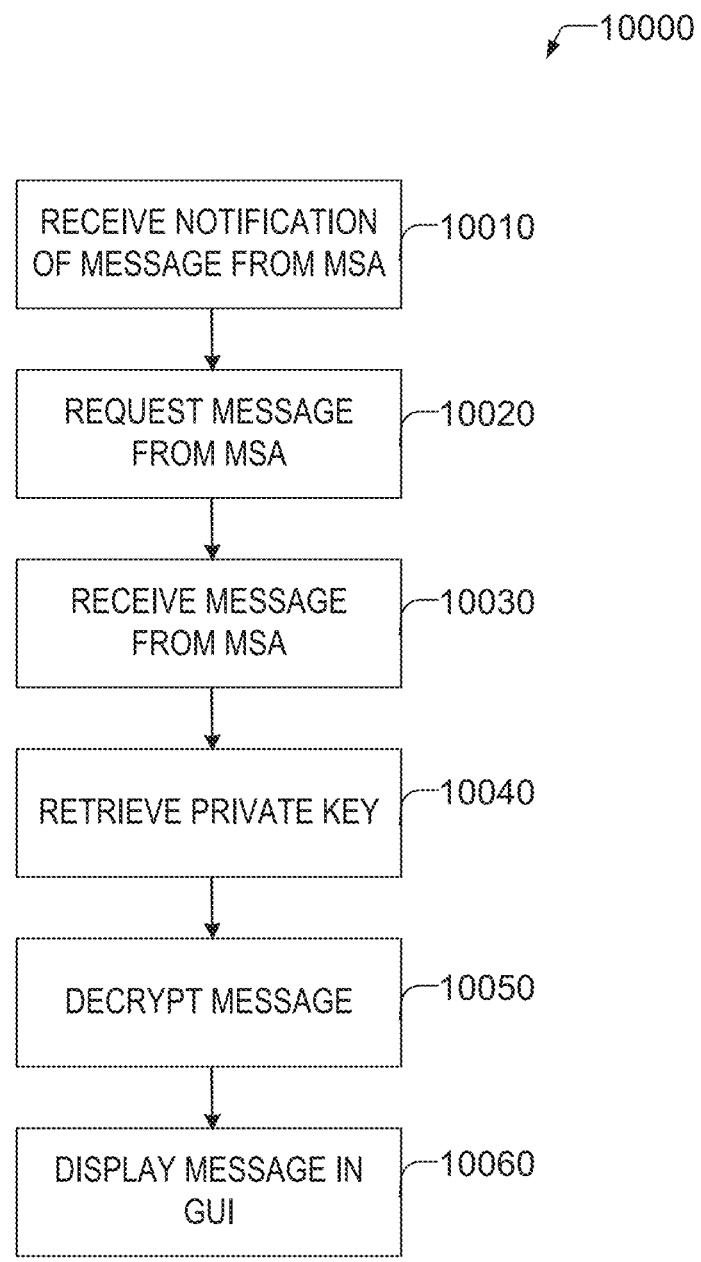
FIG. 10 shows a flowchart of a method of a recipient MUA receiving a message according to some examples of the present disclosure.

Turning now to FIG. 10, a flowchart of a method 10000 of a recipient MUA receiving a message is shown according to some examples of the present disclosure. At operation 10010 the recipient MUA may receive a notification from the MSA in its mobile wallet domain. At operation 10020, the MUA may request the message from the MSA. Operation 10020 may happen much later than the receipt of the notification at operation 10010. For example, the MUA may wait for a user to indicate that they are interested in viewing the message before retrieving it. At operation 10030 the message may be received from the MSA. At operation 10040, the private key of the MUA is retrieved. The private key may be stored by the MUA, or may be in the key keeper. At operation 10050, the message may be decrypted. This may also happen later. For example, the MUA may download the message immediately, but store it encrypted on the computing device of the user. In some examples, the MUA may only decrypt the message upon receiving a request to view the message by the user. This may protect the message by storing it encrypted. At operation 10060 the message may be displayed to a user, such as in a GUI provided by the mobile wallet application. In other examples, the message may trigger one or more payments, deductions from balances, or other actions.

Public and private keys for a mobile wallet used by the present disclosure may be generated by a key manager component of the mobile wallet application. In these examples, the public key is then communicated to the public key server provided by the mobile wallet provider for distribution to other mobile wallets. In some examples, the private key may be encrypted by another cryptographic key from another cryptographic key pair and stored with the mobile wallet domain administrator. This allows for a backup of the private key without allowing the mobile wallet domain administrator access to the key (and thus access to the mobile wallet messages). The key used to unlock the first private key may be stored in the mobile wallet application. For reliability, in case the mobile wallet application is erased (e.g., a failure of the computing device it is run on), the mobile wallet may store this key in a key keeper, such as key keeper 2300 of FIG. 2. Key keeper 2300 may be an application on another computing device of the user, a network based application, or the like, which may not be the mobile wallet provider. The transmissions of the keys to the key keeper may be protected through one or more mechanisms such as secure socket layer (SSL) communications, and may be protected from unauthorized access through mechanisms such as username and password and two factor authentication. If the mobile wallet loses keys due to device failure or device replacement, it retrieves the second cryptographic key from the key keeper and the encrypted private key from the administrator. The device then recovers the private key by decrypting it using the second cryptographic key.

In some examples, the recipient may verify the identity of the sending mobile wallet. This may be important to maintaining security when processing financial transactions electronically without human intervention. For instance, the recipient mobile wallet may receive a monthly electric bill from a power company and may verify authenticity of the bill by verifying the sender of the bill before making a payment automatically. In some examples, the sender may sign the message with a digital signature. For example, the message is hashed and the hash value is then encrypted with the sender's private key. The sender's public key is then used by the recipient (after having been obtained by the recipient's MTA) to verify the hash of the message. This verifies that the message is from the sender. However, in other examples, an additional verification may be sent. For example, non-public details about the recipient's account may also be sent to provide the recipient with an assurance that the message is genuine. Using these two techniques the recipient may be assured of the sender's legitimacy.

Figure 11:
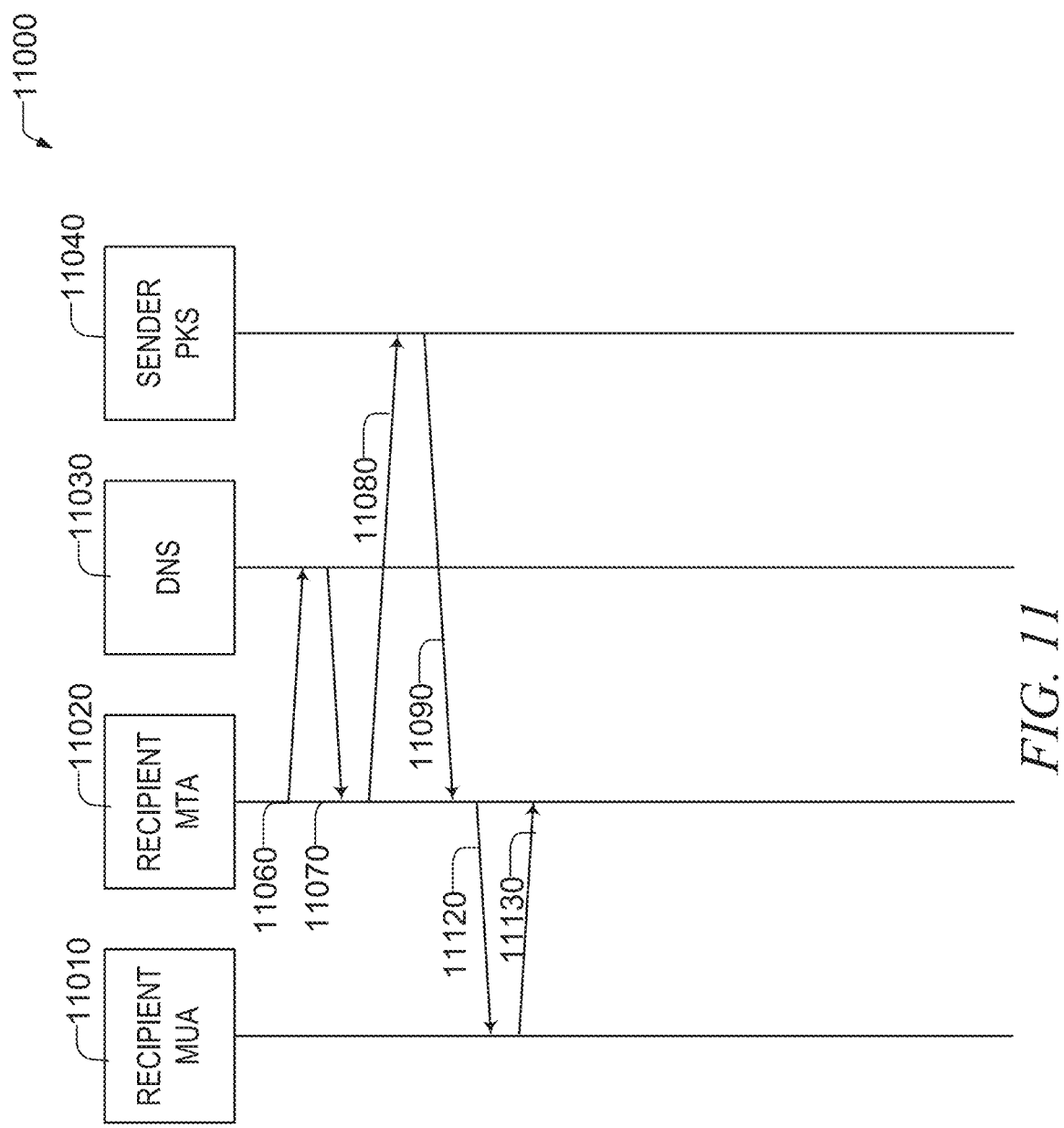
FIG. 11 shows an example message sequence chart of a recipient MTA verifying the authenticity of the sender.

FIG. 11 shows an example message sequence chart 11000 of a recipient MTA verifying the authenticity of the sender. This flow may happen after the MTA receives the message. First the recipient MTA may identify the sender name in the message. Recipient MTA 11020 may send a DNS lookup request 11060 for the sender name identified in the message to DNS 11030 to obtain the IP address of the senders PKS. At operation 11070 the DNS server 11030 responds with the IP address (or an error if the mobile wallet domain was not found—in which case the flow ends). If the IP address of the message sender is different from the IP address of the sender identified in the message, the message may be from a fraudulent sender. For instance, suppose the sender is an imposter of Wells Fargo. When the recipient performs DNS lookup of Wells Fargo, the IP address of Wells Fargo would be different from the imposter's IP address. In other examples, the IP address may be deducible from the received message (e.g., from analysis of IP-packet or mobile wallet message headers) and messages 11060 and 11070 may not be necessary.

The recipient MTA 11020 may then send a request for the public key of the sender from the sender's PKS using message 11080. The sender PKS 11040 may then reply 11090 with the public key. In some examples, the public key provided may be as part of a digital certificate issued by a trusted certificate authority.

Once the recipient MTA 11020 receives the sender's public key, the recipient MTA 11020 may verify the certificate (e.g., if the public key was provided as a digital certificate), decrypt the signature, calculate the message hash and compare the decrypted signature hash with the calculated message hash. If the hashes match, then the message was sent by the sender. If the hashes do not match, it is possible that the sender did not send the message. Message 11120 may be an indication of whether the sender is legitimate. Message 11130 may acknowledge message 11120.

In other examples, the verification is done by the recipient MUA 11010. In these examples, message 11120 is the digital certificate or public key. The recipient MUA 11010 may verify the certificate (e.g., if the public key was provided as a digital certificate), decrypt the signature, calculate the message hash, and compare the decrypted signature hash with the calculated message hash. If the hashes match, then the message was sent by the sender. If the hashes do not match, it is possible that the sender did not send the message. In either case, the recipient MUA 11010 may inform the user on the results of the verification.

Figure 12:
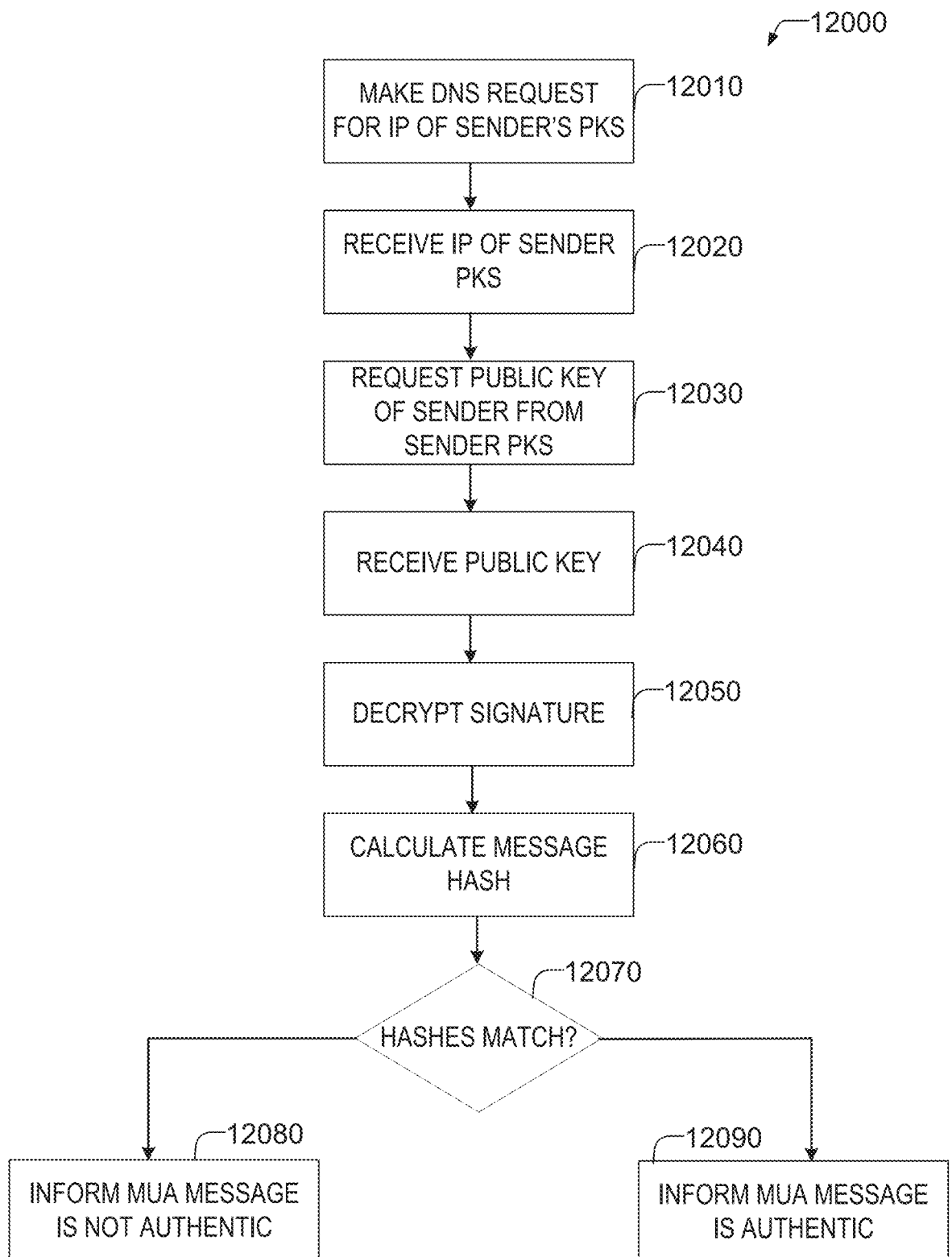
FIG. 12 shows a flowchart of a method for verifying the sender of a mobile wallet message according to some examples of the present disclosure.

Turning now to FIG. 12, a flowchart of a method 12000 for verifying the sender of a mobile wallet message is shown according to some examples of the present disclosure. At operation 12010, the recipient's MTA may request the IP of the sender's PKS. At operation 12020, the recipient's MTA may receive the IP of the sender's PKS. As noted previously, the DNS lookup may not be necessary if the IP Address is available from the original message or from other sources (e.g., a cache).

At operation 12030, the recipient's MTA may request the sender's public key from the PKS of the sender. At operation 12040, the MTA may receive the public key. Also as previously noted, the public key may be in the form of a digital certificate issued by a trusted certificate authority.

Operations 12050-12090 may be performed by either the MTA of the recipient or the recipient MUA. In some examples, before operations 12050-12090, the public key of the sending MUA may be verified by verifying the digital certificate using the public key of the certificate authority that issued the digital certificate, by verifying it has not expired, and verifying that the identity of the user is as stated by the sender.

At operation 12050, the signature of the message may be decrypted. At operation 12060, a cryptographic hash value of the message may be computed using a cryptographic hash function. The sender had calculated the cryptographic hash utilizing the same hashing function, encrypted it with its private key (which only the sender has, and only the valid public key may decrypt) as the signature, and sent it to the recipient. If the signature is decrypted with the public key and matches the correct cryptographic hash, then the recipient may be assured that the message came from the person holding the private key matching the public key registered with the PKS and verified by the CA. Example cryptographic hash functions include MD5, SHA-1, SHA-2, SHA-3, BLAKE, BLAKE2, and the like. At operation 12070, if the hash in the message matches the computed hash value, then, at operation 12090, the MTA may notify the MUA that the message is authentic. At operation 12080, if the hash in the message does not match the computed hash value, then the MTA may inform the MUA that the message is not authentic (and may be considered suspicious).

While the above procedure ensures that the entity that sent the message also knows the private key of the public key associated with the entity, it is possible that the private key was compromised. In order to add another layer of security, in some examples of this disclosure, an application layer security mechanism may be added. In this layer, the MUA of the recipient may require the MUA of the sender to provide certain verification information. For example, the MUA of recipient may request information known to both the MUA of the sender and MUA of the recipient. If the MUA of the sender provides this information (in either the original message or as part of a challenge response sequence) and it is correct, the MUA of the recipient may determine that the sender is legitimate. Example information may include one or more of: bank account information (account numbers, balances, account holder personal information such as name, address, and phone number), transaction information (e.g., transaction dates, amounts, and parties), driver's license information, user information, and a secret phrase (e.g., a predetermined data field). The information requested may be standardized, such that the sender may provide this information as part of the message, or the information may be requested by the MUA of the recipient.

Both levels of verification (e.g., verifying the signature of the sender, as well as application-layer verifications) may be performed automatically, or may be performed at the request of the recipient. In some examples, certain types of messages (e.g., certain mobile wallet messages, such as transactions) may automatically trigger one or both of the verification layers. In some examples, a table may indicate whether no verification, signature verification, application layer verification, or both signature and application layer verification is to be performed based upon one or more of: the type of mobile wallet message, a text content of the mobile wallet message, a sender of the mobile wallet message, or the like.

Figure 13:
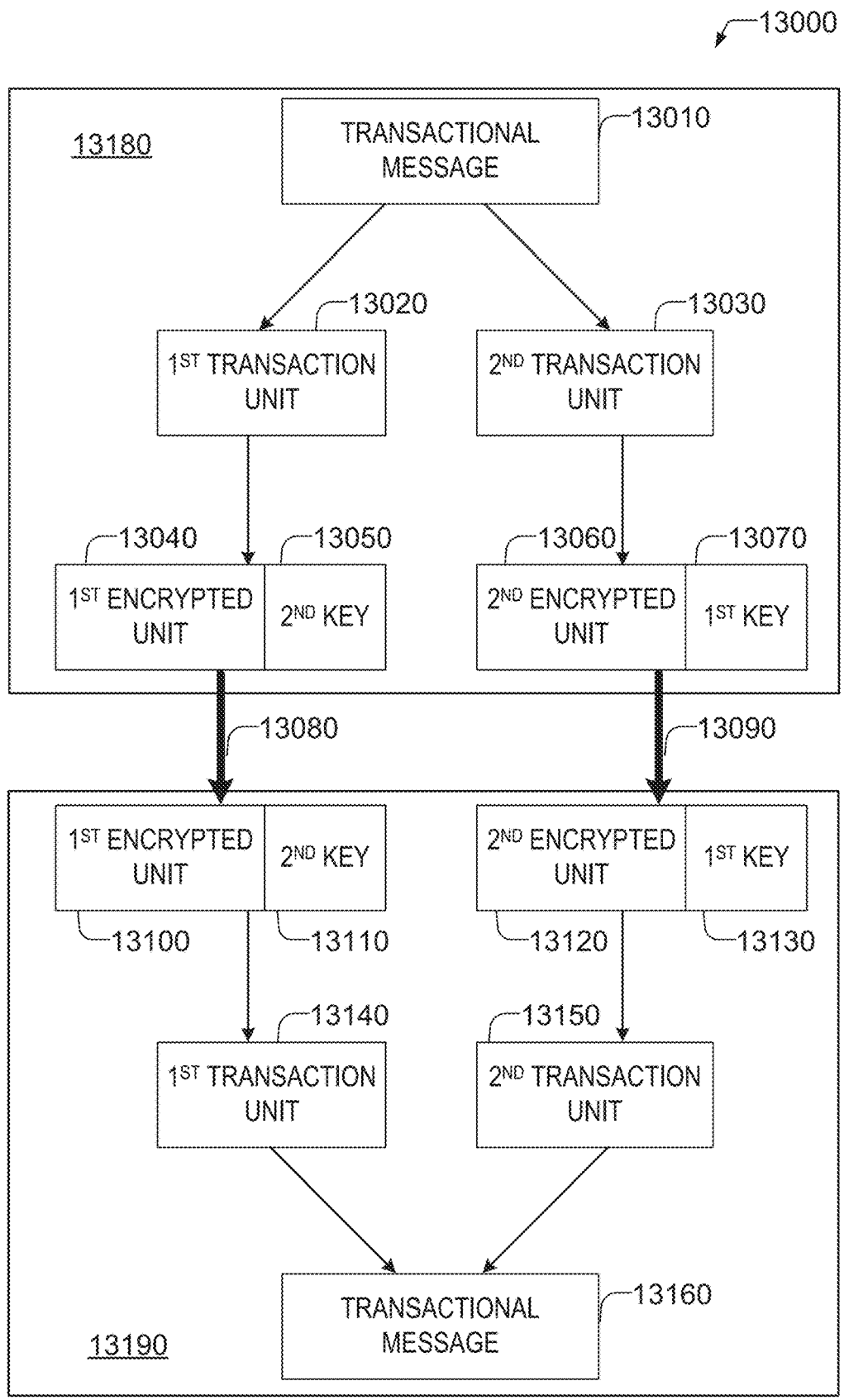
FIG. 13 shows an example message sequence chart of a secured transmission of a mobile wallet message from a sender to a recipient.
Figure 14:
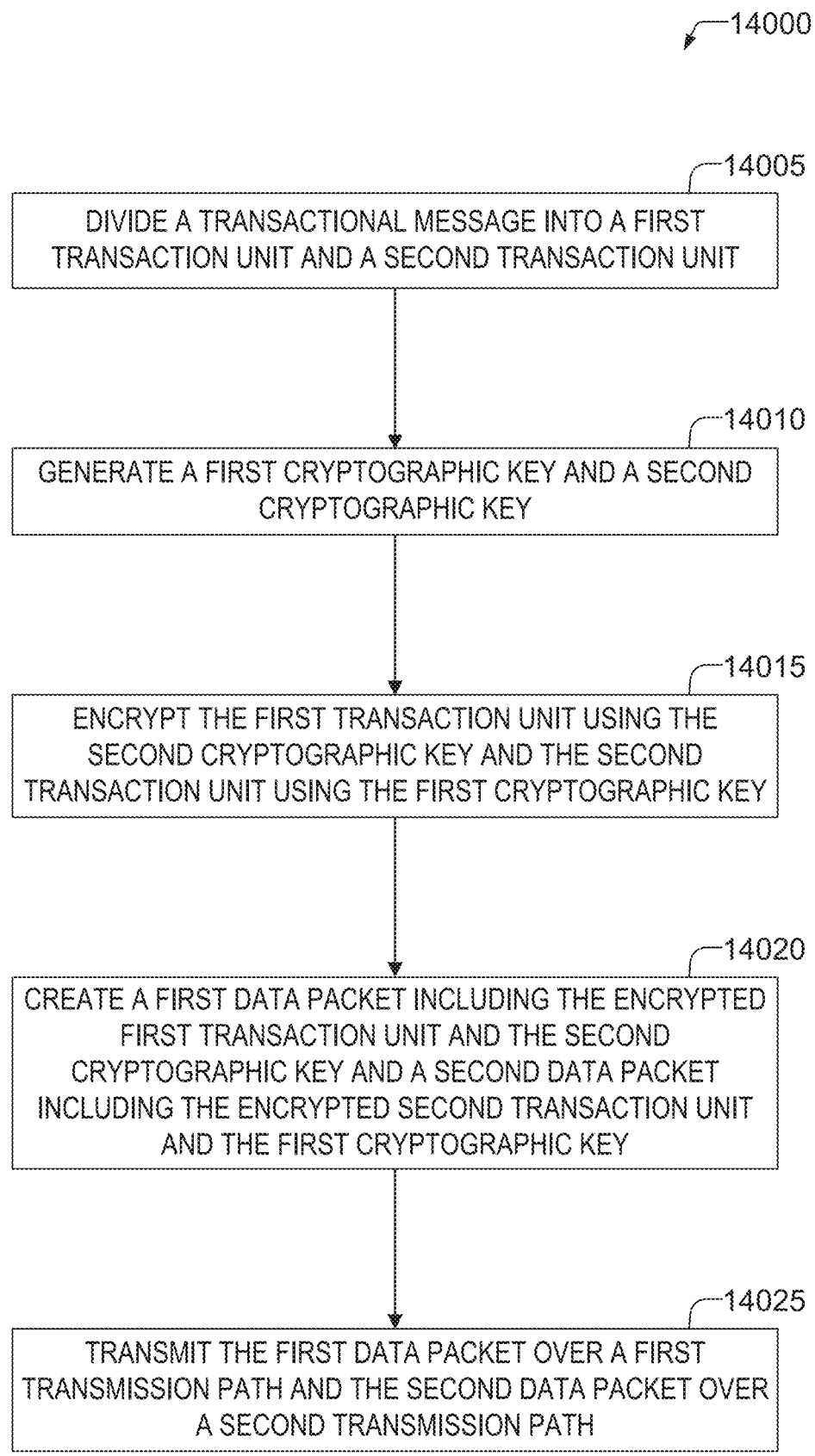
FIG. 14 shows a flowchart of a method for securing mobile wallet message transmissions between a sender and a recipient according to some examples of the present disclosure.
Figure 15:
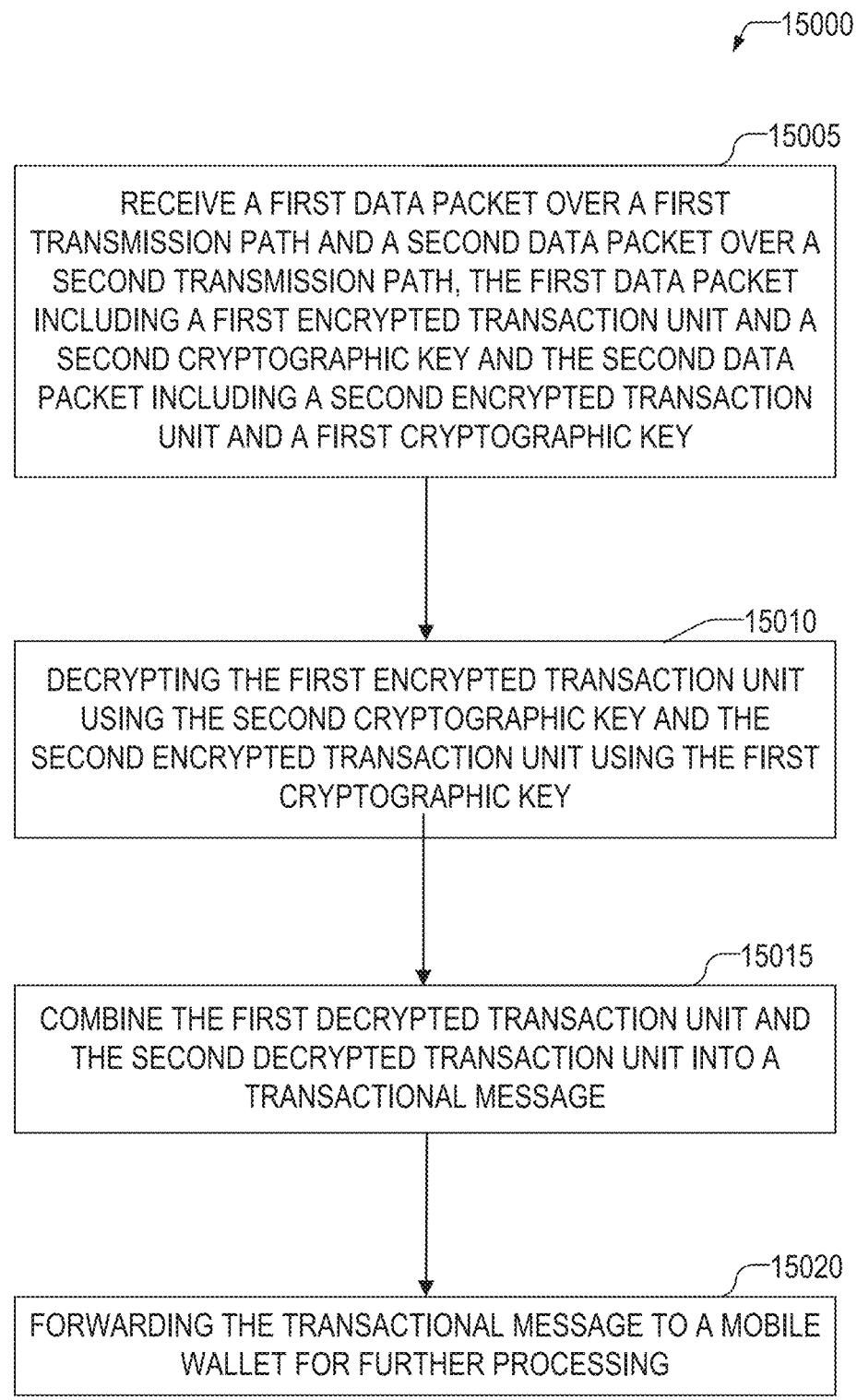
FIG. 15 shows a flowchart of a method for securing mobile wallet message transmissions between a recipient and a sender according to some examples of the present disclosure.

Mobile wallets may use an alternative security scheme in some cases to maintain the integrity of transmitted messages. For instance, a sender mobile wallet may discover that there is no public key published by the recipient mobile wallet in the process of DNS lookup. The sender may still want to send a message with some protection against a man-in-the-middle attack. FIGS. 13-15 illustrate an example of a security scheme for securing messages transmitted between mobile wallets, according to some embodiments.

FIG. 13 shows an example message sequence chart 13000 of a secured transmission of a mobile wallet message from a sender to a recipient. A first mobile wallet (sender) 13180 may compose a transactional message 13010 and may divide it into a first transaction unit 13020 and a second transaction unit 13030. The first transaction unit 13020 may include a first half of the transactional message and the second transaction unit 13030 may include a second half of the message. In an example, the first transaction unit 13020 may include odd lines of the transactional message 13010, and the second transaction unit 13030 may include even lines of the transactional message 13010. The transactional message 13010 may be divided in a variety of other ways.

The first mobile wallet 13180 may create two different cryptographic keys and may encrypt the first transaction unit 13020 with a first key 13070 to produce a first encrypted unit 13040 and may encrypt the second transaction unit 13030 with a second key 13050 and may produce a second encrypted unit 13060. The first mobile wallet 13180 may produce a first packet by combining the first encrypted unit 13040 and the second key 13050 and may produce a second packet by combining the second encrypted unit 13060 and the first key 13070. Each packet may specify the relationship with the other packet. The first mobile wallet 13180 may transmit the first packet using a first communication path 13080 and may transmit the second packet using a second communication path 13090. The first communication path 13080 is different from the second communication path 13090. For example, the first communication path 13080 and the second communication path 13090 may operate on two different wireless media or two different underlying networks (e.g., separate network backbones, etc.). For example, the first communication path 13080 may be a cellular network and the second communication path 13090 may be a Wi-Fi network. In another example, the first communication path 13080 may be a telephone company network and the second communication path 13090 may be the Internet.

The second mobile wallet (recipient) 13190 may receive the first packet via the first communication path 13080 and the second packet via the second communication path 13090. The second mobile wallet 13190 may decrypt the first encrypted unit 13100 included in the first packet using the first cryptographic key 13130 and may decrypt the second encrypted unit 13120 included in the second packet using second key 13110 and may produce a first transaction unit 13140 and a second transaction unit 13150, and may combine the first transaction unit 13140 and the second transaction unit 13150 into a transactional message 13160.

In some examples, the first mobile wallet 13180 may divide the transactional message 13010 into more than two units, encrypt each unit using a different cryptographic key for each unit, and send each data unit over two or more communication paths at different time intervals. In an example, each unit may be numbered or their relationships may be defined to enable recombination.

If one of the packets is lost on the way, the second mobile wallet 13190 may transmit a request to the first mobile wallet 13180 to retransmit the data packets. In an example, the first mobile wallet 13180 may use a different division technique and may use different encryption keys from the first attempt to insure the security of the second attempt.

A recipient may receive a first encrypted segment of the transactional message and may need a cryptographic key included in a packet with a second encrypted segment of the transactional message. Because each segment is encrypted with a key included in another segment and each segment is transmitted over a different communication path at a different time interval, the likelihood of the message being intercepted or compromised (e.g., via a man-in-the-middle attack, etc.) may be reduced.

FIG. 14 shows a flowchart of a method 14000 for securing mobile wallet message transmissions between a sender and a recipient according to some examples of the present disclosure.

At operation 14005, a first mobile wallet (e.g., mobile wallet application 2060 as described in FIG. 2) may divide a transactional message into a first transaction unit and a second transaction unit. In an example, the first mobile wallet may determine a first half and a second half of the transactional message and may include the first half in the first transaction unit and may include the second half in the second transaction unit. In another example, the first mobile wallet may extract odd lines and even lines from the transactional message and may include the odd lines in the first transaction unit and may include the even line in the second transaction unit.

At operation 14010, the first mobile wallet may generate (e.g., using the key manager 2080 as described in FIG. 2) a first cryptographic key and a second cryptographic key. In an example, the first cryptographic key and the second cryptographic key may be different.

At operation 14015, the first mobile wallet may encrypt (e.g., using the MUA 2075 as described in FIG. 2) the first transaction unit using the second cryptographic key and the second transaction unit using the first cryptographic key.

At operation 14020, the first mobile wallet may create (e.g., using the MUA 2075 as described in FIG. 2) a first data packet including the encrypted first transaction unit and the second cryptographic key and a second data packet including the encrypted second transaction unit and the first cryptographic key. In an example according to the present disclosure, the first data packet may include a reference to the second data packet and the second data packet may include a reference to the first data packet.

At operation 14025, the first mobile wallet may transmit (e.g., using the MUA 2075 as described in FIG. 2) the first data packet over a first transmission path and the second data packet over a second transmission path. In an example according to the present disclosure, the first transmission path may use a first wireless protocol and the second transmission path may use a second wireless protocol. In another example, the first transmission path may use a first physical network and the second transmission path may use a second physical network. In another example, the first transmission path may use a cellular network and the second communication path may use a Wi-Fi network. In another example, the first communication path may use a telephone company network and the second transmission path may use an internet connection.

In some examples, the first mobile wallet may receive a request from a second mobile wallet (e.g., mobile wallet application 2070 as described in FIG. 2) indicating that one of the first data packet and the second data packet was not received. The first mobile wallet may retransmit the first data packet and the second data packet in response to the request. In an example according to the present disclosure, the first mobile wallet may generate a third cryptographic key and a fourth cryptographic key and may encrypt the first transaction unit using the fourth cryptographic key and the second transaction unit using the third cryptographic key before retransmitting the first data packet and the second data packet.

FIG. 15 shows a flowchart of a method 15000 for securing mobile wallet message transmissions between a recipient and a sender according to some examples of the present disclosure.

At operation 15005, a mobile wallet user agent (MUA) of second mobile wallet (e.g., the MUA 2260 of mobile wallet application 2070 as described in FIG. 2) may receive a first data packet over a first transmission path and a second data packet over a second transmission path, the first data packet including a first encrypted transaction unit and a second cryptographic key and the second data packet including a second encrypted transaction unit and a first cryptographic key. In an example according to the present disclosure, the first data packet may include a reference to the second data packet and the second data packet may include a reference to the first data packet. In an example according to the present disclosure, the first transmission path may use a first wireless protocol and the second transmission path may use a second wireless protocol. In another example according to the present disclosure, the first transmission path may use a first physical network and the second transmission path may use a second physical network. In another example according to the present disclosure, the first transmission path may use a cellular network and the second communication path may use a Wi-Fi network. In another example, the first communication path may use a telephone company network and the second transmission path may use an Internet connection.

At operation 15010, the MUA may decrypt (e.g., using the key manager 2290 as described in FIG. 2, etc.) the first encrypted transaction unit using the second cryptographic key and the second encrypted transaction unit using the first cryptographic key.

At operation 15015, the MUA may combine the first decrypted transaction unit and the second decrypted transaction unit into a transactional message.

At operation 15020, the MUA may forward the transactional message to the second mobile wallet for further processing.

In some examples according to the present disclosure, the MUA may determine that only one data packet of the first data packet and the second data packet has been received. The MUA may transmit a request to resend the first data packet and the second data packet to a sender (e.g., mobile wallet application 2060 as described in FIG. 2) of the only data packet. The MUA may receive the first data packet and the second data packet in response to the request.

Figure 16:
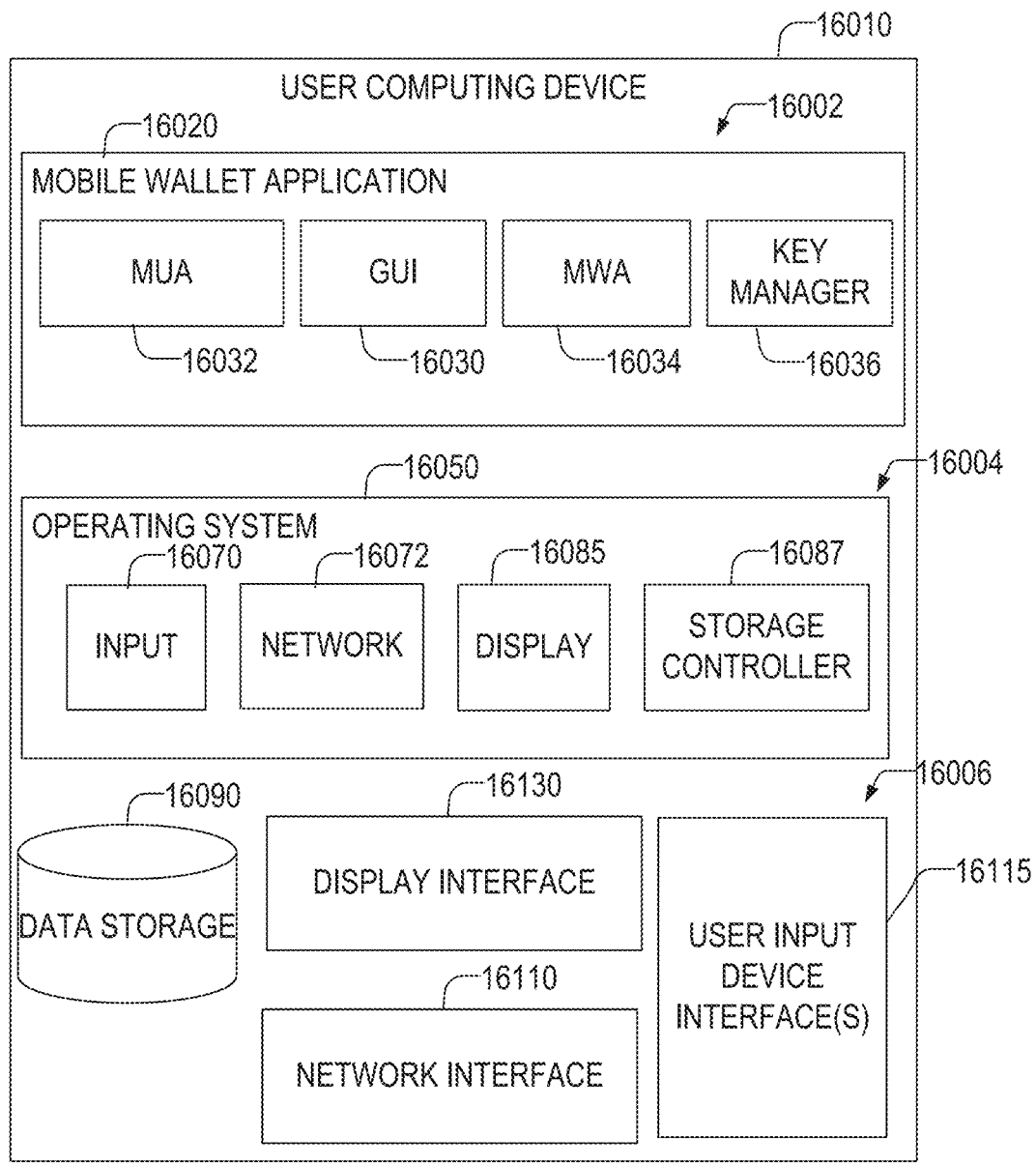
FIG. 16 shows a schematic of a logical diagram of a user computing device according to some examples of the present disclosure.

FIG. 16 illustrates a schematic of a logical diagram of a user computing device 16010 according to some examples of the present disclosure. For example, user computing device 16010 may, in some examples, be an embodiment of computing devices 1040, 1050, 2040, and 2050. User computing device 16010 may implement a sender MUA 3010, a recipient MUA 4010, or a recipient MUA 11010. User computing device 16010 may implement processes illustrated in FIGS. 5, 10, and portions of FIGS. 12, 14, and 15. User computing device 16010 may be a desktop computer, laptop computer, tablet computer, mobile phone, smartphone, computer server, or wearable device, and be configured as illustrated in FIG. 27 (discussed below). User computing device may have a hardware layer 16006 including display interface 16130, network interface 16110, user input device interface(s) 16115, and data storage 16090. User computing device 16010 may have an operating system layer 16004 with one or more operating system(s) such as operating system 16050. Operating system 16050 may have, among other modules, an input module 16070, a network module 16072, a display module 16085, and a storage controller module 16087. User computing device may have an application layer 16002. Application layer 16002 may have many applications, but as shown, application layer includes a mobile wallet application 16020. User computing device may have other layers (such as a Basic Input and Output System (BIOS), Unified Extensible Firmware Interface (UEFI), Firmware layer), and the like, which are not shown for the sake of clarity.

Included in mobile wallet application 16020 is MUA module 16032 which implements the mobile wallet user agent, such as MUA 2075, 2260, 3010, 4010, 11010, and implements the methods of FIGS. 5, 10, and all of, or portions of, FIG. 12. MUA module 16032 may provide one or more graphical user interfaces for creating, editing, sending, or reading mobile wallet messages. MUA module 16032 may also provide for communicating with one or more MTA's to obtain encryption keys of recipient mobile wallets, encrypting one or more messages with obtained encryption keys, sending one or more messages (e.g., encrypted messages) to the one or more MTA's, receiving notifications that one or more messages sent to the MUA are available at an MSA, retrieving the one or more messages from the MSA, decrypting the one or more messages, managing the public and private keys of the mobile wallet, and the like. MUA module 16032 may interface with the GUI module 16030 to provide one or more GUIs to facilitate the mobile wallet messaging. MUA module 16032 may also interface with the input module 16070 of operating system 16050 to receive user input from devices connected to the user computing device 16010 through user input device interface(s) 16115 and with display module 16085 to provide output to the user through display interface 16130 in providing these GUIs.

Mobile Wallet Application (MWA) module 16034 provides for storing, managing, and using items in the mobile wallet. For example, MWA module 16034 may, upon input from the user, transmit one or more payment authorizations to other devices, transmit identification information to other users, store, modify, or delete items in a user's wallet, and the like. MWA module 16034 may also work with GUI module 16030 to provide one or more GUIs to facilitate the management of the mobile wallet by interfacing with the input module 16070 and display module 16085.

Also included in mobile wallet applications 16020 is a GUI module 16030 which, as noted, may work with display module 16085, input module 16070, MUA module 16032, and MWA module 16034 to provide one or more GUIs for allowing users to use their mobile wallet and to send messages from and receive messages to their mobile wallets. For example, GUI module 16030 may allow users to view representations of the contents of their mobile wallets, edit their mobile wallets, add items, remove items, modify items, use items (e.g., for payment, for identification, and the like), and send and receive messages to and from other mobile wallets. Key manager module 16036 may obtain, store, and manage one or more cryptographic keys or key pairs. Key manager module 16036 may be an embodiment of key manager 2080 and 2290. Key manager module 16036 may work with the storage controller 16087 to store keys in the data storage 16090. Key manager module 16036 may also work with storage controller module 16087 to obtain keys, certificates, or other cryptographic items from one or more remote servers.

Operating system layer 16004 provides one or more services to the application layer 16002 and manages hardware in the hardware layer 16006. Example tasks performed by the operating system layer 16004 includes providing one or more device drivers which manages hardware and provides one or more interfaces for applications in the application layer 16002 to utilize the hardware in the hardware layer 16006. Other tasks performed by the operating system layer 16004 include memory management, task scheduling, resource management, optimizations, security, and other tasks.

Input module 16070 is a device driver that manages user input device interface(s) 16115 and provides input sensed by devices connected to the user input device interface(s) 16115 to interested modules in the operating system layer 16004 and interested applications in the application layer 16002. Display module 16085 is a device driver that manages display interface 16130 and provides modules in the operating system layer 16004 and applications in application layer 16002 access to displays connected to the display interface 16130. Storage controller module 16087 is a device driver that manages data storage 16090 and provides modules in the operating system layer 16004 and applications in application layer 16002 access to store and retrieve data in data storage 16090. For example, storage controller module 16087 may provide mobile wallet application(s) 16020 with access to data storage 16090 for storing messages, storing cryptographic keys (e.g., key manager 16036 may store keys for the user of mobile wallet application(s) or may cache one or more public keys of other mobile wallet users to avoid asking the MTA for keys, and the like), etc.

Network module 16072 is a device driver for the network interface 16110. Network module 16072 may manage network interface 16110 and provide network access to modules in the operating system layer 16004 and application layer 16002. Network module 16072 may implement one or more network protocols, such as Transmission Control Protocol (TCP), Internet Protocol (IP), IEEE 802 series protocols promulgated by the Institute of Electrical and Electronics Engineers (IEEE) including 802.11 protocols and 802.3 protocols, cellular protocols such as those promulgated by the Third Generation Partnership Project (3GPP) including Long Term Evolution (LTE) protocols and Long Term Evolution-Advanced (LTE-A) protocols, and others.

Data storage 16090 may be any type of non-transitory storage, such as Random Access Memory (RAM), Solid State Drives (SSD), Hard Disk Drives (HDD), magnetic storage, and optical storage. Display interface 16130 may be graphics hardware that connects to a Cathode Ray Tube (CRT), a Liquid Crystal Display (LCD), a Light Emitting Diode (LED) display, an Organic LED display, or the like. Display interface 16130 may be coupled to one or more user input devices to form a touch screen display. User input device interface(s) 16115 may be any interface to a user input device. Examples include Universal Serial Bus (USB), Serial ATA (SATA), Peripheral Component Interconnect Express (PCI-E), and the like. Input devices that may connect to the user input device interface(s) 16115 may include touch sensors (e.g., in a touch screen display), a keyboard, a mouse, a trackpad, a touchpad, and the like. Network interface 16110 may provide user computing device 16010 with access to one or more computer networks. Network interface 16110 may be an Ethernet card, a Wireless Local Area Network (WLAN) card, a Radio Frequency Transmitter, or the like.

Figure 17:
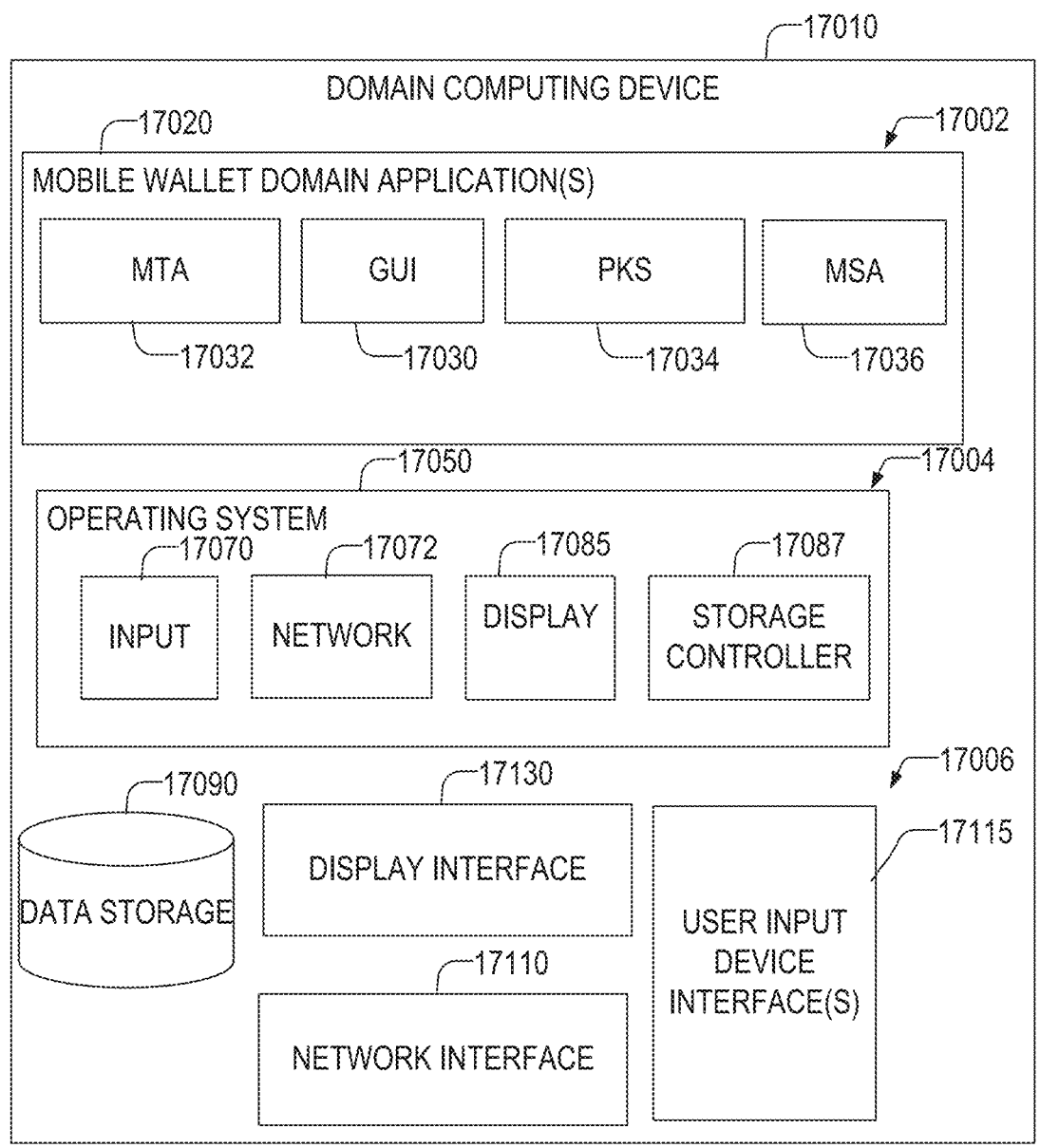
FIG. 17 shows a schematic of a mobile wallet domain computing device according to some examples of the present disclosure.

FIG. 17 illustrates a schematic of a mobile wallet domain computing device 17010 according to some examples of the present disclosure. Mobile wallet domain computing device 17010 may perform the role of one or more of: MTA, PKS, and MSA. For example, one mobile wallet domain computing device 17010 may perform all of these roles, or multiple mobile wallet domain computing devices 17010 may perform these roles. Mobile wallet domain computing device 17010 may be an example of provider 1120, 1130 mobile wallet element issuer 1160, mobile wallet providers 2110, 2210, sender MTA 3020, recipient PKS 3040, recipient MTA 3060, recipient MSA 3070, recipient MTA 11020, sender PKS 11040, and the like. Mobile wallet domain computing device 17010 may perform the methods illustrated in one or more of FIGS. 6, 7, 8, 9, and portions or all of FIGS. 12, 14, and 15.

Mobile wallet domain computing device 17010 may be a desktop computer, laptop computer, tablet computer, mobile phone, smartphone, computer server, or wearable device. Mobile wallet domain computing device may have a hardware layer 17006 including display interface 17130, network interface 17110, user input device interface(s) 17115, and data storage 17090. Mobile wallet domain computing device 17010 may have an operating system layer 17004 with one or more operating system(s) such as operating system 17050. Operating system 17050 may have, among other modules, an input module 17070, a network module 17072, a display module 17085, and a storage controller module 17087. Mobile wallet domain computing device may have an application layer 17002. Application layer 17002 may have many applications, but as shown, application layer includes mobile wallet domain applications 17020.

Included in mobile wallet domain application(s) 17020 is MTA module 17032 which may determine one or more public keys of one or more recipient mobile wallet applications, determine IP addresses of one or more recipient mobile wallet domain PKS' and MTAs, forward one or more mobile wallet messages to one or more other MTAs, and receive one or more mobile wallet messages from other MTAs where a mobile wallet application within the mobile wallet domain as the MTA is the recipient. MTA module 17032 may be an example implementation of MTA module

2100, 2200, 3020, 3060, 11020 and may implement processes illustrated in FIGS. 6, 7, 8, and portions of FIGS. 12, 14, and 15.

Mobile wallet domain application(s) 17020 may also include PKS module 17034 which may manage and provide one or more public keys of mobile wallet users within the mobile wallet domain. PKS module 17034 may store, manage, and distribute public keys of mobile wallet applications within its mobile wallet domain. PKS module may be one example embodiment of PKS 2115, 2170, 3040, 11040, and may implement operations to receive a request from a MTA, the request including an address, determine from the address whether there is a public key matching the address stored in the PKS, and if there is a matching public key, send the public key back to the requesting MTA. If there is not a matching public key, send an error back to the requesting MTA.

Mobile wallet domain application(s) 17020 may also include an MSA module 17036. The MSA module 17036 may be an example embodiment of MSA 2230, 3070 and may perform the operations illustrated in FIG. 9. GUI module 17030 provides one or more GUIs and other user interfaces to users to provide for administration of the mobile wallet domain applications. GUI module 17030 may work with the display module 17085 of the operating system to provide a GUI for output on a display connected to display interface 17130.

Operating system layer 17004 provides one or more services to the application layer 17002 and manages hardware in the hardware layer 17006. Example tasks performed by the operating system layer 17004 includes providing one or more device drivers which manages hardware and provides one or more interfaces for applications in the application layer 17002 to utilize the hardware in the hardware layer 17006. Other tasks performed by the operating system layer 17004 include memory management, task scheduling, resource management, optimizations, security, and other tasks.

Input module 17070 is a device driver that manages user input device interface(s) 17115 and provides input sensed by devices connected to the user input device interface(s) 17115 to interested modules in the operating system layer 17004 and interested applications in the application layer 17002. Display module 17085 is a device driver that manages display interface 17130 and provides modules in the operating system layer 17004 and applications in application layer 17002 access to displays connected to display interface 17130. Storage controller module 17087 is a device driver that manages data storage 17090 and provides modules in the operating system layer 17004 and applications in application layer 17002 access to store and retrieve data in data storage 17090.

Network module 17072 is a device driver for the network interface 17110. Network module 17072 may manage network interface 17110 and provide network access to modules in the operating system layer 17004 and application layer 17002. Network module 17072 may implement one or more network protocols, such as Transmission Control Protocol (TCP), Internet Protocol (IP), IEEE 802 series protocols promulgated by the Institute of Electrical and Electronics Engineers (IEEE) including 802.11 protocols and 802.3 protocols, cellular protocols such as those promulgated by the Third Generation Partnership Project (3GPP) including Long Term Evolution (LTE) protocols and Long Term Evolution-Advanced (LTE-A) protocols, and others.

Data storage 17090 may be any type of non-transitory storage, such as Random Access Memory (RAM), Solid State Drives (SSD), Hard Disk Drivers (HDD), magnetic storage, and optical storage. Display interface 17130 may be graphics hardware that connects to a Cathode Ray Tube (CRT), a Liquid Crystal Display (LCD), a Light Emitting Diode (LED) display, an Organic LED display, or the like. Display interface 17130 may be coupled to one or more user input devices to form a touch screen display. User input device interface(s) 17115 may be any interface to a user input device. Examples include Universal Serial Bus (USB), Serial ATA (SATA), Peripheral Component Interconnect Express (PCI-E), and the like. Input devices that may connect to the user input device interface(s) 17115 may include touch sensors (e.g., in a touch screen display), a keyboard, a mouse, a trackpad, a touchpad, and the like. Network interface 17110 may provide mobile wallet domain computing device 17010 with access to one or more computer networks. Network interface 17110 may be an Ethernet card, a Wireless Local Area Network (W LAN) card, a Radio Frequency Transmitter, or the like.

Managing and Using a Limited Use Payment Token

A mobile wallet system described herein may also include a wallet client system that allows a first user to send their payment credentials associated with a digital credit/debit card to a second user and allows the first user to control how the second user may use the card. This system may thereby provide users with capabilities of managing their electronic cards similar to how they would manage their physical cards. These capabilities may be provided by a limited use payment token that is: 1) generated at a sending wallet client that includes personalized payment credentials and token use key value pairs that describe how the token may be used; and 2) sent to a receiving wallet client wherein the receiving wallet client manages the use of the received payment token pursuant to the provided key value pairs. The key value pairs describe the use of the payment token as being at least one of: for single use, for a period of time, for a specified product, at a specified location, and for a limited dollar amount. The receiving wallet client may limit the use of the token upon any single or combination of any of the criteria above, and may automatically remove the payment token when the token is no longer valid for use.

An example simplified use case follows. A daughter asks her father if she may borrow his credit/debit card for the weekend. Being a generous father and her being a good daughter, he selects his Wells Fargo Visa card from his wallet client, but (not being too generous), sets parameters as to how she may use the electronic card. He then sends this restricted electronic version of his credit card to his daughter's mobile device. She may now use the card, but under the restrictions that the father set. For example, she may only use it one time, or may only use up to a certain dollar limit, or for a period of time, at a specific location, or a combination of any of these restrictions.

Thus, personalized payment credentials may be sent from the first mobile wallet to the second mobile wallet, and the first mobile wallet may dictate to a common payment application type how that token or personalized credentials may be used. This may be implemented utilizing a new application program interface (API) in the payment applications to be able to send and control how those payment credentials may be used.

Figure 18:
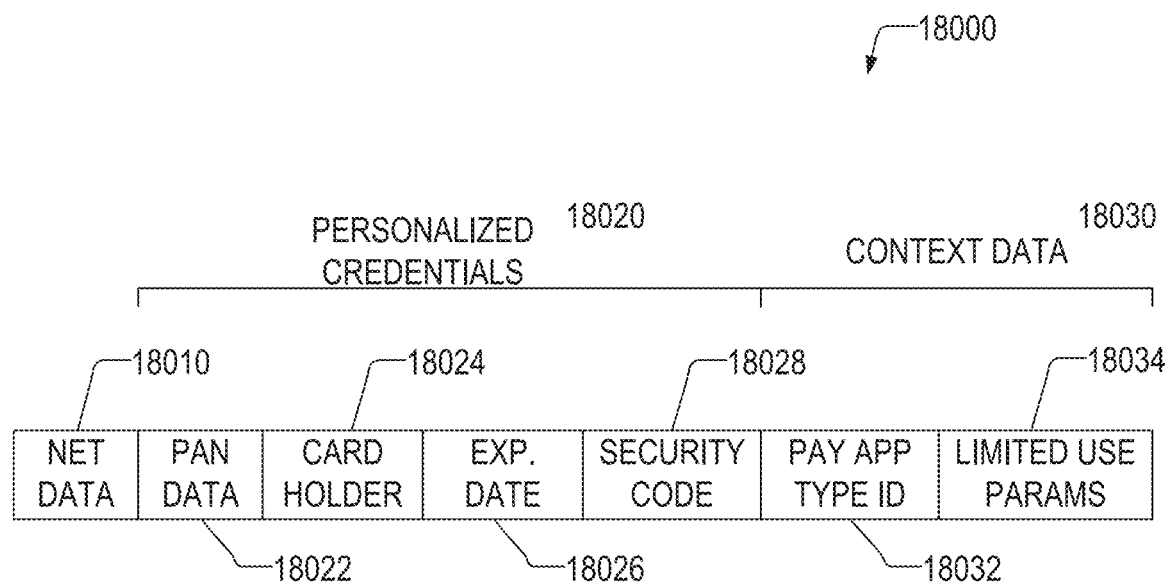
FIG. 18 is a data structure diagram illustrating an example serialized data structure that may be used to communicate limited use payment tokens between a (first) sending and (second) receiving wallet client in a wallet-to-wallet (W2W) communication.

FIG. 18 is a data structure diagram illustrating an example of a serialized data structure 18000 that may be used to communicate limited use payment tokens between a (first) sending and (second) receiving wallet client in a wallet-to-wallet (W2W) communication.

The serialized data structure includes W2W network data 18010, personalized credentials 18020, which may be communicated over a near field communication (NFC) interface, and context data 18030 that include a payment application type identifier 18032 and limited use parameters 18034.

The W2W network data 18010 may define an originating address and the destination address of wallet service systems as well as the wallet identifier of the sending and receiving party. These communications may be made secure using, e.g., the public key infrastructure security apparatus described above.

The personalized credentials 18020 may be a digital copy of the personalized credentials that are found on Secure Elements (SE), which are hardware components in which, e.g., a credit card number may be stored. The SEs may exist either on a chip (embedded), or in a subscriber identity module (SIM), and used to payments between an instantiation of a payment application on the SE and a payment application on a point-of-sale (POS) terminal using a card reader using EMVCo standards. In other embodiment, the personalized credentials 18020 may come from other sources than the SE in mobile wallets such as a server in the cloud.

The context data 18030 may include a payment application type identifier 18032 that is sent by the sending device to the receiving device so that the receiving device may determine what type of application should be used, e.g. Visa, MasterCard, or any other payment type.

The context data 18030 may include key value parameters that dictate to the receiving device how the credentials may be used. Some examples of these parameters are:

Number of uses: e.g., a "0" might indicate unlimited use, whereas any other positive integer might indicate a number of times the card may be used;

Date range: e.g., MM-DD-YYYY-MM-DD-YYYY which defines a date range during which the card may be used; and Value limit: e.g., a dollar amount limit for the card—this could be specified per transaction, or total.

When a receiving mobile wallet uses the proxy, the mobile wallet, a merchant device, and/or the issuer of the payment element in the proxy may enforce the use specified in the limited use parameters. For instance, if the token may be used in a specified area only, the mobile wallet may block the token's use outside of the specified area based on the device location information (e.g., GPS). If the token can be used for purchasing a product up to $500, the issuer may deny the payment authorization when the merchant requests the authorization (in the case that the proxy is known to the issuer.)

Although the data structure shown in FIG. 18 is directed to a payment element, it could easily be adapted using the techniques discussed herein to include a non-payment element/account, such as a gym membership card, which would permit the owner of a second mobile wallet to visit a gym using the gym membership card of the owner of a first mobile wallet.

Helping and Lending Payment Element Between Mobile Wallets

A mobile wallet may be owned by individuals, such as minors and elderly persons with limited capabilities, who may need help in shopping and managing finance by other people, such as parents or guardians. A helping and lending payment element between mobile wallets may provide a novel way for assisting shopping, lending payment elements, and handling a situation where the purchaser (i.e., borrower) and lender who will make a payment for the purchaser are present at a store at the same time in mobile wallets.

A first mobile wallet may register a second mobile wallet as a helper with the mobile wallet provider. The first mobile wallet may ask the mobile wallet provider to establish communication with the second mobile wallet to get help while shopping. The first mobile wallet may be used to show products of interest to the second mobile wallet user and the first mobile wallet may be used to ask the second mobile wallet to lend a payment element the first mobile wallet to allow a purchase using a selected element. The second mobile wallet (lender) may send a loaner payment element to the first mobile wallet (borrower) and the borrower submit the loaner element to a POS device while in communication with the lender. When the transaction is complete, the borrower returns the loaner element to the lender. The second mobile wallet may have configured usage condition of the loaner element when it registered as a helper.

Figure 19:
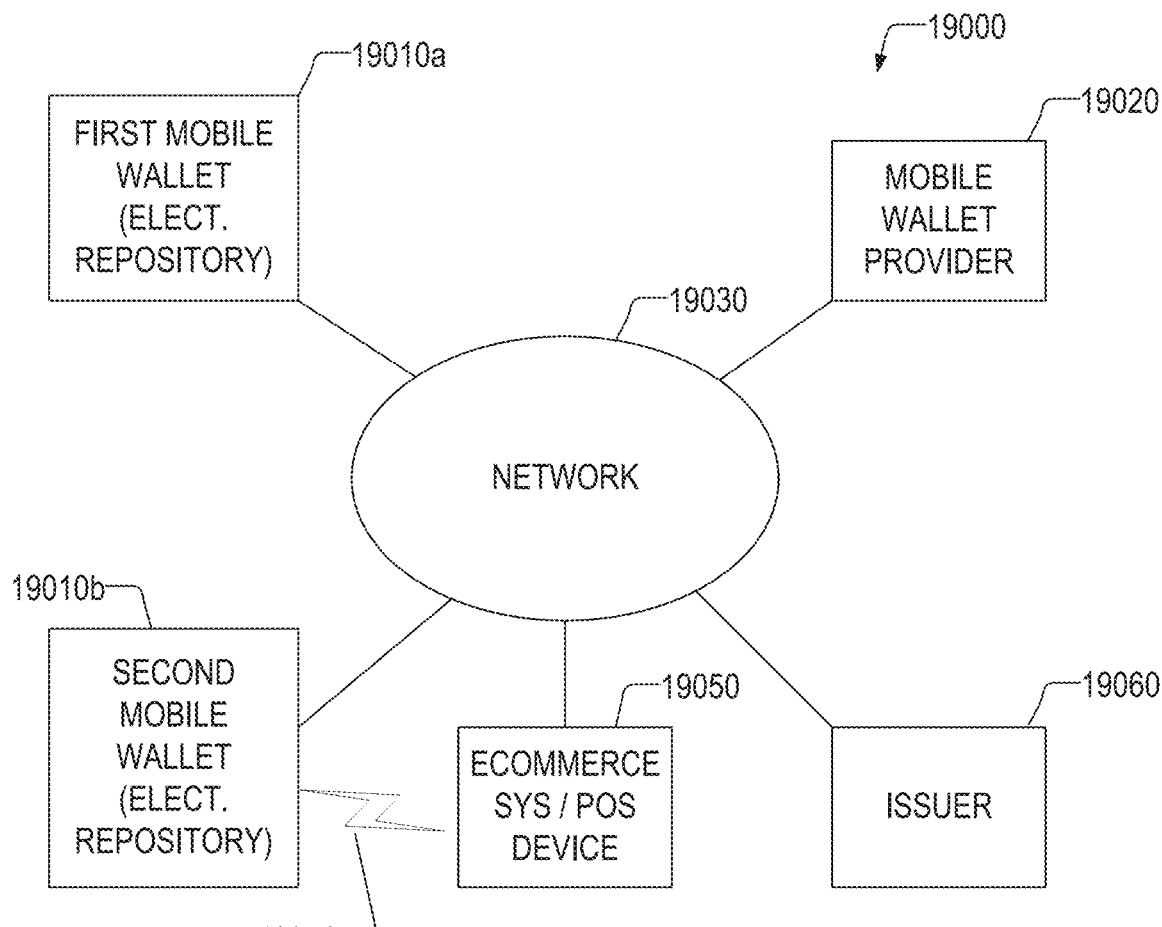
FIG. 19 is a block diagram that illustrates an environment for communications between a first and second mobile wallet.

In more detail, FIG. 19 is a block diagram that illustrates an environment 19000 for communications between a first and second mobile wallet. The environment comprises a first mobile wallet 19010*a*, a second mobile wallet 19010*b* (collectively or representatively 19010), a mobile wallet provider 19020, a point-of-sale (POS) device 19050, an issuer 19060, and a network 19030. The network 19030 may be a wired or wireless network (or mixture of both), and include any of the networking or communication mechanisms and protocols described herein.

The mobile/digital/electronic wallet 19010 is an application program and its associated data in a computing device, typically in a mobile device such as smartphone or a tablet computer. This wallet allows an individual to make electronic commerce transactions, which may include purchasing items and making payments. Examples of mobile wallets are Wells Fargo Wallet®, Apple Pay®, Google Wallet®, PayPal®, Samsung Pay®, and Starbucks App®.

The mobile wallet 19010 may comprise one or more of payment elements and non-payment elements. Payment elements may include payment accounts associated with a financial institution. A payment account may be an account into which the mobile wallet owner may deposit income, or out of which the owner may pay bills. Common payment accounts include savings accounts, checking accounts, line of credit, cyber cash, and credit cards. Other payment elements may include a certificate that may be used to make payments such as prepaid movie tickets, and gift cards. Non-payment elements may include a passport, driver's license, insurance card, employee card, student ID, and/or member card.

The mobile wallet provider 19020 may be an organization that provides the mobile wallet 19010 application to its customers. Examples of mobile wallet providers are Wells Fargo, Apple, Google, and Samsung. The issuer 19060 may be a financial organization (e.g., bank) that issues payment elements such as the credit/debit card for the mobile wallet 19010. In some cases, the issuer 19060 is the mobile wallet provider 19020. In some cases, the mobile wallet provider 19020 and the issuer 19060 may be the same entity.

The POS device 19050 may be an electronic cash register with near filed communication (NFC) 19070 capability. A mobile wallet owner (user) may be able to tap the mobile wallet 19010 to the POS device 19050 to submit a payment over the NFC 19070 and the POS device 19050 process it with the payment network 19030 to get a payment authorization with the issuer 19060.

The network 19030 may represent a virtual network which provides communication between entities 19010, 19020, 19040, 19050, and 19060. The network 19030 may comprise the Internet, LAN, Wi-Fi, home network, cellular network, NFC, and/or other types of networks.

Each mobile wallet 19010 or payment account has a unique ID which may be identified by the mobile wallet provider 19020 and/or the issuer 19060. The first mobile wallet 19010*a* (borrower) establishes real-time secure communication with a second mobile wallet 19010*b* (lender or helper). The communication may be provided by the mobile wallet provider 19060 or a trusted third party. For example, the communication may be provided by the methods described above.

Figure 20:
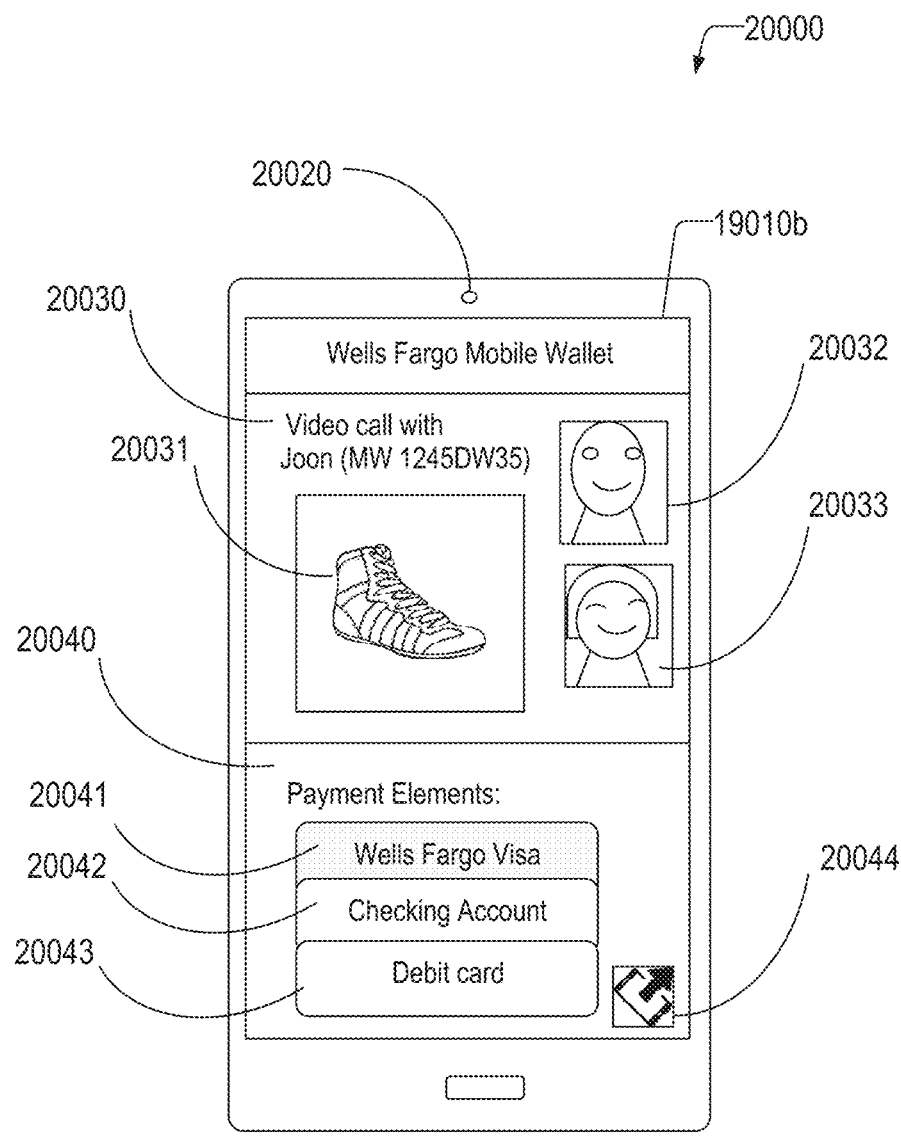
FIG. 20 is an example screen shot/display on a user device that illustrates use of the helper (lender) mobile wallet when two mobile wallets establish communication.

FIG. 20 is an example screen shot/display 20000 on a user device that illustrates use of the helper (lender) mobile wallet 19010*b* when two mobile wallets 19010 establish communication. The display 20000 may comprise a communication window 20030 and a payment window 20040. The communication window 20030 may comprise a photo (video) of a product 20031 sent from the remote mobile wallet 19010*a* (borrower's mobile wallet), a picture or a live video of the remote mobile wallet user 20032, and a picture or a live video of the helper 20033. The remote mobile wallet user may use a front camera 20020 to capture video for a video call with the helper 20033 and a rear camera (not shown) to capture video of a product of interest 20031.

The payment window 20040 may show available or in-use (e.g., via highlighting) payment elements, such as a Wells Fargo Visa card 20041, a checking account 20042, and a debit card 20043. The payment window 20040 may also include a send button 20044 that is utilized to initiate a transmission of the information. For example, the helper may select a payment element, for instance the Wells Fargo Visa 20041, which may be highlighted when selected, and touch the send icon 20044 to send it to the remote mobile wallet 19010*a*.

By way of illustrative example, the mobile wallet 19010*b* in FIG. 20 may be a mother's mobile wallet communicating with her son's mobile wallet 19010*a*. The son 20032 may show a shoe 20031 from a pair of shoes to his mom 20033 and have a real time video call with her to tell her that he is interested in buying the shoes. When the lender mobile wallet 19010*b* sends a payment element to the borrower mobile wallet 19010*a*, the action may be one of the following, depending on the configuration and/or capability of the lender mobile wallet 19010*b*:

1) Lending Payment Element: The lender mobile wallet 19010*b* sends the payment element as a loaner element for the borrower to use in making payment. In this situation, the borrower may tap (or interact in some way, such as barcode, QR code, etc.) his mobile wallet 19010*a* to (with) the POS device 19050 to connect to it and submit the loan element. The loaner element may be a one-time use element or a multi-use element with conditions to use such as max amount or expiration date or time, as described above.

2) Making Payment Directly: The lender mobile wallet 19010*b* makes a payment to the POS device 19050 directly via the borrower mobile wallet 19010*a*, where the borrower mobile wallet 19010*a* may touch the POS device 19050 and establish an NFC connection or in some other way interact with the POS device to connect to it. In this case, the borrower at the remote location becomes a bridge between the lender mobile wallet 19010*b* and the POS device, as described herein.

In the lending payment element, the lender may specify the type of loaner element. Example types include:

1) Indivisible payment element: A payment element may be used by one mobile wallet at a time. In other words, the payment element may not be activated in two mobile wallets at the same time. If a lender creates a loaner card from a payment account and sends it to a recipient, the lender may not use the originating payment element until he gets back the loaner card from the recipient.

2) Divisible payment element: A payment element may be used by two or more mobile wallets simultaneously. After a lender creates a loaner card and sends it to one or more recipients, the lender may still use the payment card.

To lend a payment element, the lender mobile wallet 19010*b* may get approval from the issuer 19060 (e.g., financial institution) and may specify the recipient mobile wallet's 19010*a* identity. The lender may specify usage condition such as single/multiple use (not shown), expiration date, maximum value allowed to use with the loaner card, geographic limits, and other conditions in producing loaner cards. The financial institution may review the request and may issue a permit to produce a loaner card.

Figure 21A:
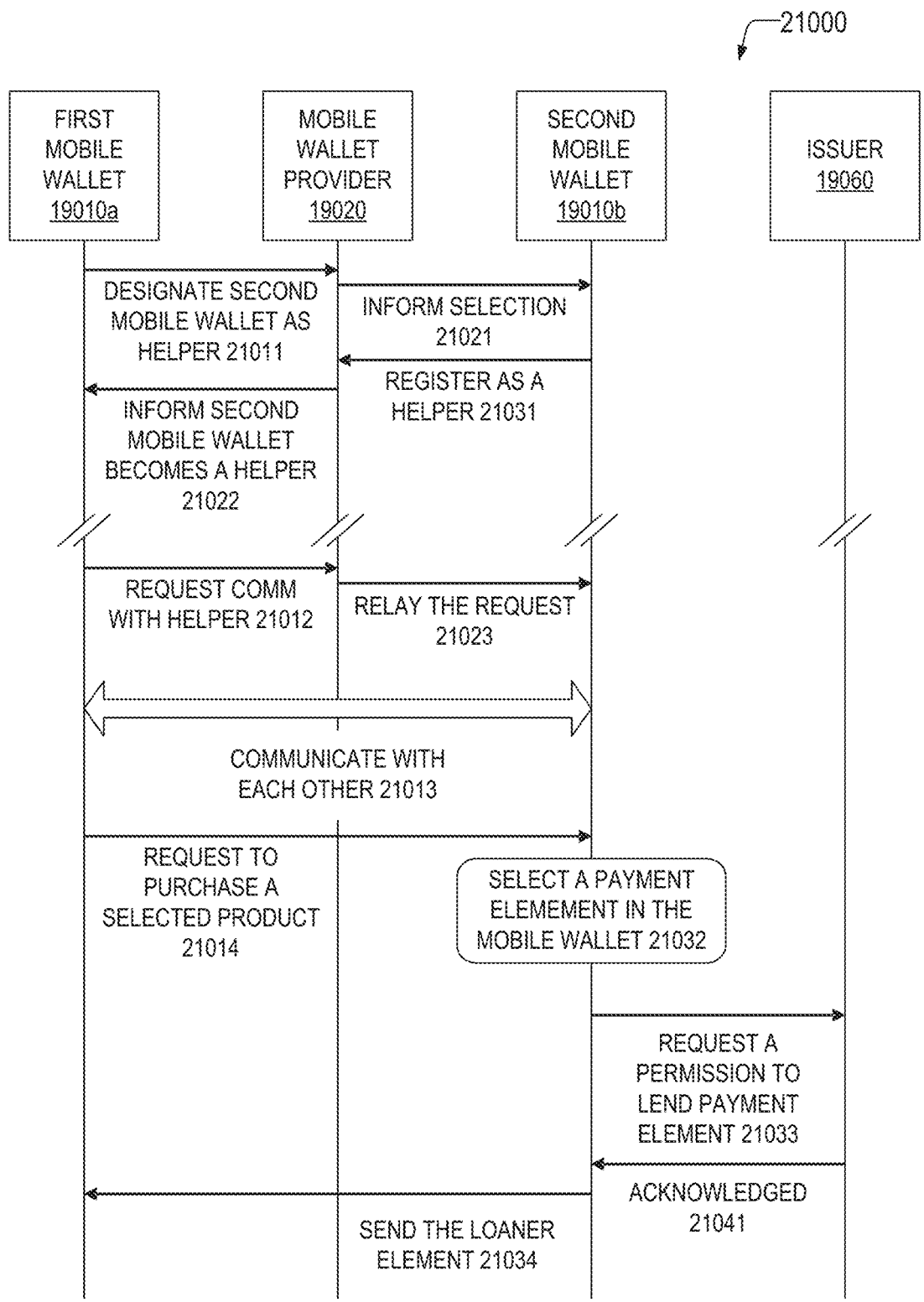
FIGS. 21A, 21B comprise a flowchart of an example of a process in which a second mobile wallet helps the first mobile wallet remotely.
Figure 21B:
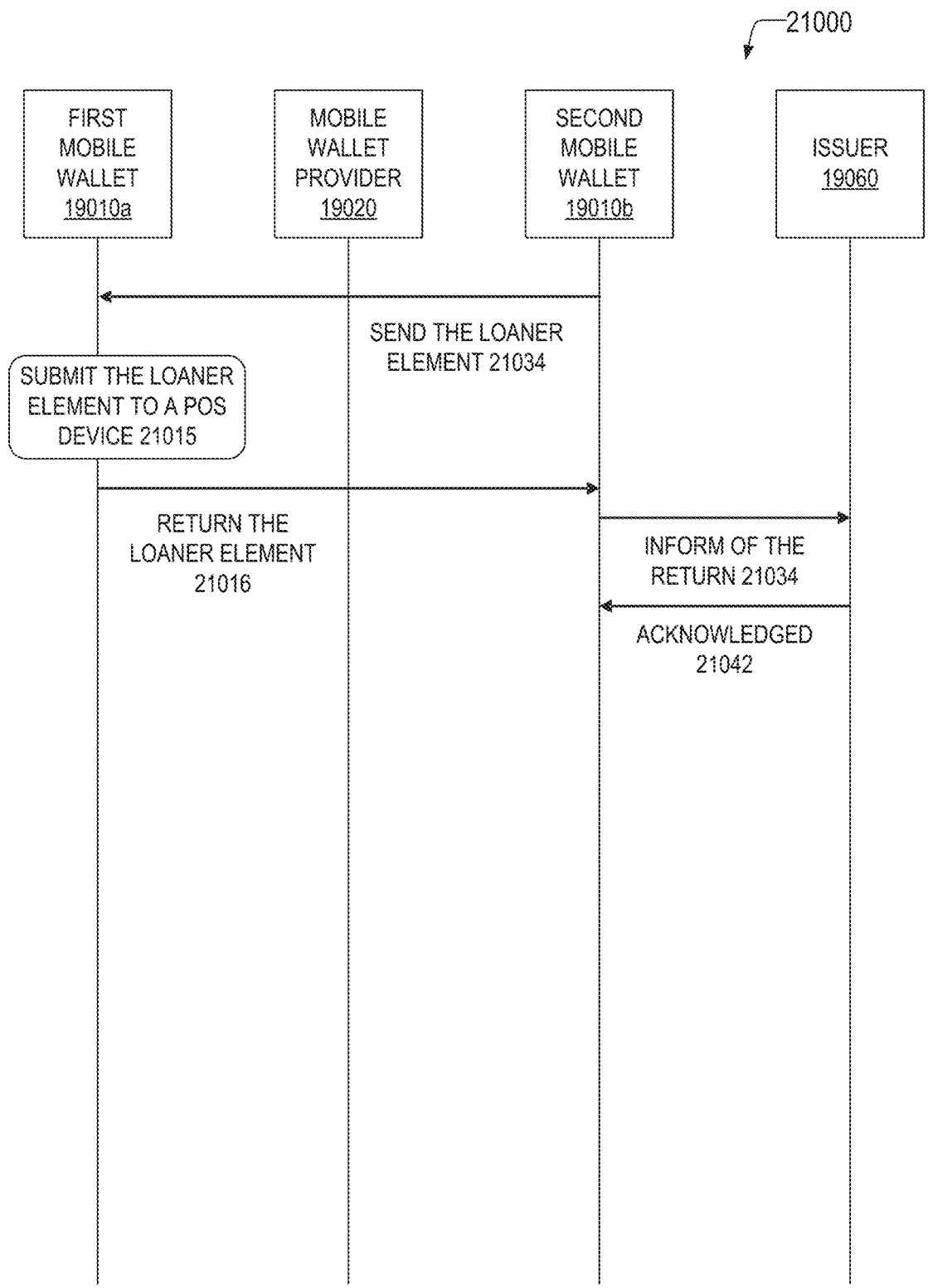

FIGS. 21A, 21B comprise a flowchart of an example of a process 21000 in which a second mobile wallet 19010*b* helps the first mobile wallet 19010*a* remotely. In this flowchart, as in any of the flowcharts discussed herein, the arrow flows may designate network based communications into network inputs and outputs of the respective entities communicating with each other. These network inputs and outputs may comprise hardware and/or software modules that are configured to receive, process, and send data as discussed herein. Furthermore, any of the elements 19010*a*, 19010*b*, 19020, 19060 shown in the flowcharts herein may comprise various components that may comprise software executable on respective processors for processing the inputs and outputs.

The first mobile wallet 19010*a* designates the second mobile 19010*b* wallet as a helper to the mobile wallet provider 19020 in operation 21011. The mobile wallet provider 19020 informs the second mobile wallet 19030 of its selection as a helper in operation 21021. The second mobile wallet 19030 registers as a helper in operation 21031 and the mobile wallet provider informs the first mobile wallet that the second mobile wallet became a helper in operation 21022.

At a later time, the first mobile wallet 19010*a* user may be at a store and need help from the second mobile wallet 19010*b*. It requests communication with the helper in operation 21012 to the mobile wallet provider. The mobile wallet provider relays the request to the second mobile wallet in operation 21023 and facilitates video communication between them, as described above in FIG. 20, in operation 21013. The first mobile wallet user may show a product of interest to the second mobile wallet and request to purchase the product in operation 21014.

The second mobile wallet user selects a payment element in its mobile wallet in operation 21032 and request permission to send it to the second mobile wallet to the issuer 19060 in operation 21033. When requesting the permission, it may specify usage conditions for the first mobile wallet and its identification. The issuer 19060 gives a permission to send a loaner element in operation 21041 and the second mobile wallet sends the loaner element to the first mobile wallet in operation 21034. The loaner element may be an indivisible element and, when this is the case, the second mobile wallet may not use it while the loaner element is in the first mobile wallet.

Referring now to FIG. 21B, after receiving the loaner element at 21034, the first mobile wallet submits the loaner element to a POS device (not shown) and the POS device gets a payment authorization in operation 21015. The first mobile wallet returns the loaner in operation 21016 and the second mobile wallet informs the return to the issuer in operation 21034 and the issuer send an acknowledgment to the second mobile wallet in operation 21042.

Figure 22:
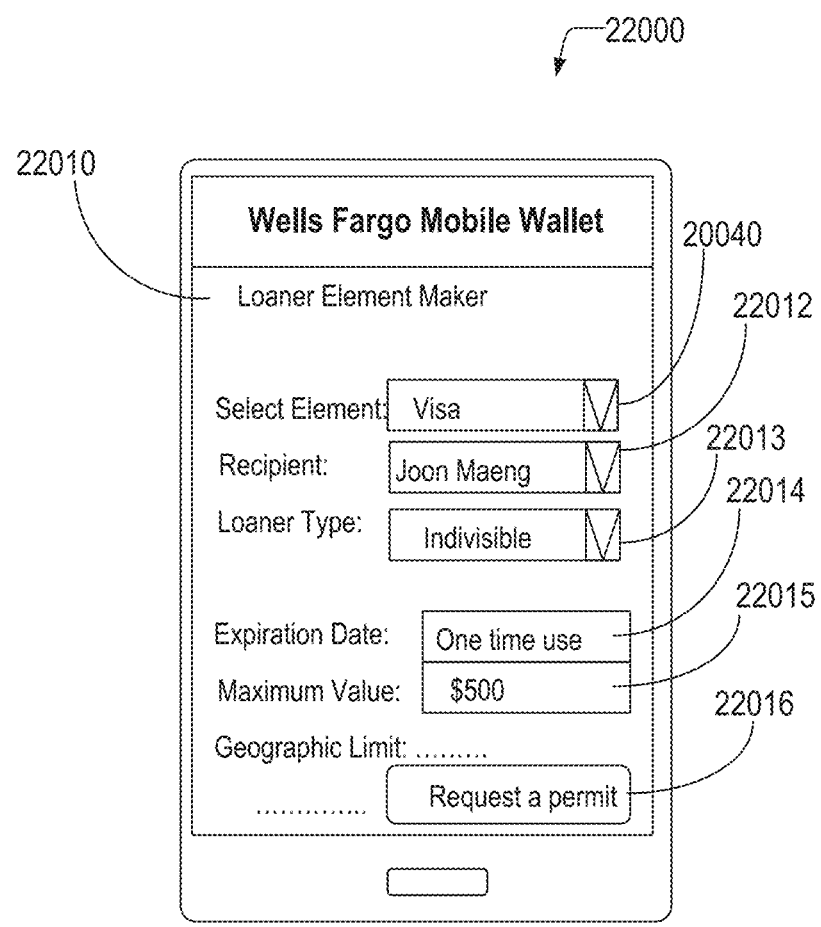
FIG. 22 is an example screen shot/display that illustrates an embodiment of a user interface for configuring the loaner element.

FIG. 22 is an example screen shot/display 22000 that illustrates an embodiment of a user interface for configuring the loaner element. The lender mobile wallet 19010b includes a loaner element maker application 22010. When a helper (lender) becomes a helper of a borrower mobile wallet 19010a, he may use the loaner element maker 22010 to configure the loaner element. The owner may select a payment element 20040, for instance Visa, the recipient 22012 or recipient mobile wallet ID, and the loaner type in 22013 which is indivisible in this example. The lender may specify the expiration date or one time use via an entry field 22014, a maximum amount the borrower may use via entry field 22015 and other usage conditions. The lender may request a permit to the issuer by e.g., touching the request a permit button 22016 or interacting with some other user interface element.

Proxy Payment Element for Mobile Wallets

Mobile wallets may include payment elements such as credit cards, debit cards, and checking accounts. Typical mobile wallets allow using payment elements that exist in the mobile wallet itself, and the mobile wallet owner may not provide a capability for another mobile wallet to use its elements. One capability described herein is to provide a mechanism for loaning a mobile wallet element to another mobile wallet or producing a proxy of or related to a payment element so that a recipient of the proxy may use this element as if it were the recipient's own mobile wallet element.

In this design, mobile wallets may create a temporary payment element in a form of proxy payment element from a payment element in the mobile wallet and send it to another mobile wallet securely. The proxy element may act in the same way as if the payment element were in the originator's mobile wallet, within the usage conditions. Mobile wallet providers or payment element issuers (i.e., financial institutions) may receive revenues by allowing mobile wallets to produce proxy elements.

A first mobile wallet (i.e., originator) may create a proxy payment element (PPE) with a payment element (e.g., credit card, debit card, checking account) in the first mobile wallet and transfer it to the second mobile wallet (i.e., recipient) securely via a W2W communication infrastructure. The PPE may include a total amount, originator's mobile wallet ID, payment element ID, payment issuer ID, effective date, and specifies usage conditions. The usage conditions may comprise one or more of number of types and/or number of uses, geographic limitations, transferability, purchasable products/services, and other conditions. A user's mobile wallet may submit the PPE to an ecommerce system (e.g., POS devices) where the user may or may not be the same as the recipient.

The mobile wallet credentials may be stored in a secure cloud system and the mobile wallet provider may provide credentials for a selected payment to the mobile wallet. In producing, transferring, and using proxy elements, a mobile wallet may take on a role from the three roles listed below:

Originator: A mobile wallet which produces a proxy element from a payment element in the mobile wallet.

Recipient: A mobile wallet which receives a proxy element from the originator. The recipient may transfer the proxy element to another mobile wallet if it is allowed to do so in the proxy usage conditions.

User: A mobile wallet which submits a proxy element to an ecommerce system, such as POS device, financial institution, or ATM. The user may be or may not be the same as the recipient of the proxy element.

Figure 23:
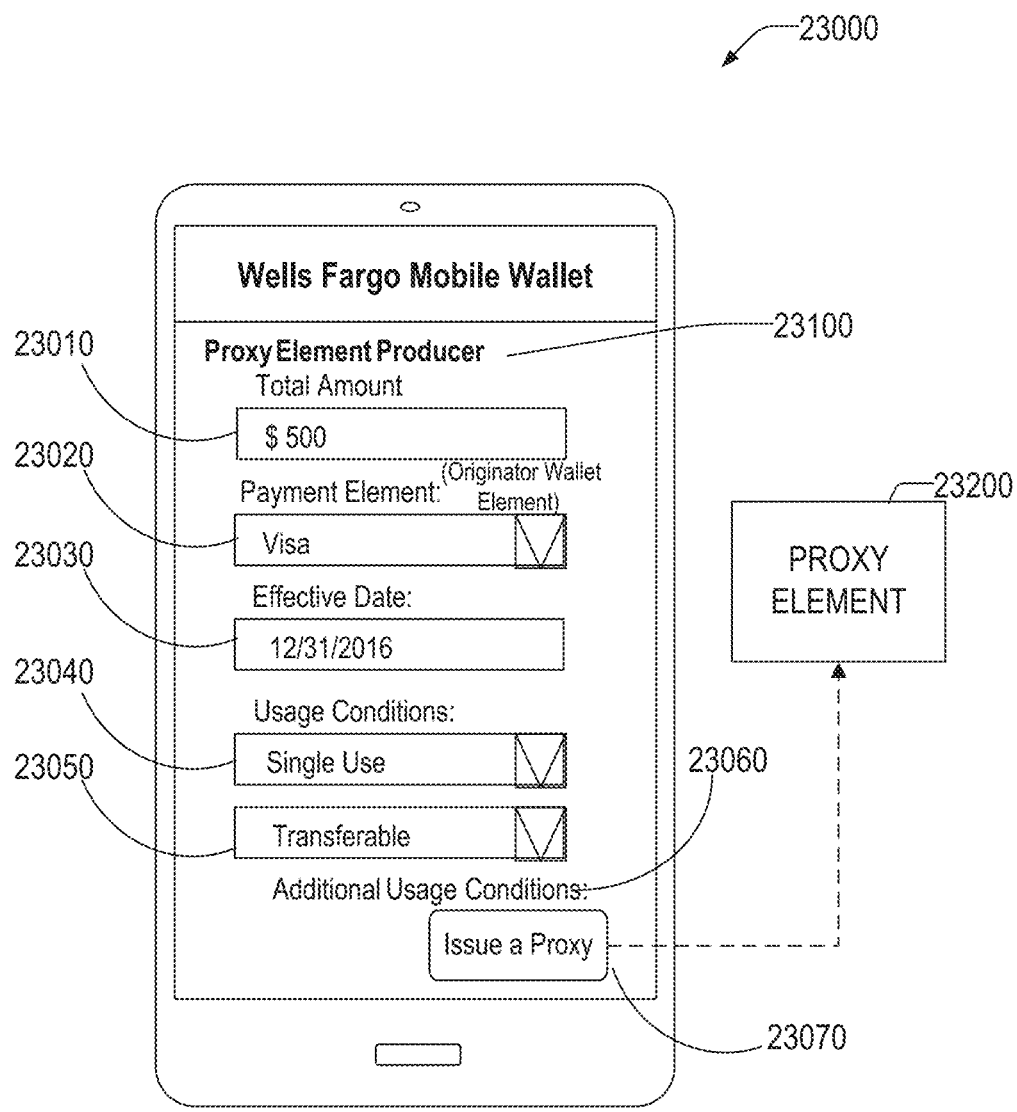
FIG. 23 is an example screen shot/display that illustrates an embodiment of a user interface for configuring a proxy element or proxy payment element (PPE).

In more detail, FIG. 23 is an example screen shot/display 23000 that illustrates an embodiment of a user interface for a proxy element producer 23100 that may be used for configuring a proxy element or proxy payment element (PPE) (also referred to herein as a proxy element) 23200. The user interface may comprise boxes or fields to enter or select a total amount 23010, payment (or originating wallet) element 23020, effective date 23030, usage conditions, including number of uses 23040, transferability selection 23050, and additional usage conditions 23060, and an issue a proxy icon 23070. Although a configuration shown herein has the proxy element producer 23100 running a device that contains the wallet having the originator wallet element 23020 that the proxy element 23200 relates to, the proxy element producer 23100 and associated user interface may be run on a separate device.

The mobile wallet owner may enter the total amount 23010, for instance $500, of the proxy element. She may select a payment element 23020 from among those available in her mobile wallet 19010a, for instance, a Visa card. The payment element may only present the payment elements that allow creating a proxy element since some payment elements issuers may not allow creating a proxy element. The payment element issuer 19060 may inform a user of fees associated with producing a payment element if there are any. The mobile wallet owner may specify the effective date 23030 or leave it blank. The effective date could include an earliest available date, and expiration date, both (for a date range), or neither (for no date restrictions). An originating wallet element 23020 may be a payment element, but it could also relate to a non-payment element, such as a membership card, as described herein—although certain illustrated fields would not be applicable for non-payment elements (and other additional fields may be provided).

The owner may specify usage conditions 23040, 23050, 23060. For example, she may specify how many times the proxy element may be used 23040. A default may be a single use, but multiple uses may also be specified as well. The owner may also specify 23050 if the proxy element is transferable to anyone other than the specified recipient. If a proxy element is transferable, the recipient may transfer the proxy to the other recipient without using it or after using a portion of it. The owner may specify additional conditions 23060 such as geographic limit and/or a specific purchasable product or service. The user interface may present additional conditions when the user interacts with the user interface 23060. In a configuration, a request to transfer the proxy element may be sent to the proxy approval system 24100 (see the discussion regarding FIGS. 24A, 24B below) prior to transferring the proxy element.

When an originator produces a proxy for a specified product or service, the proxy may act as if it is a gift card and the fees associated with producing the proxy may be paid by the merchant or manufacturer of the product or service. In the alternative, any such fees could be paid by the recipient.

Once the owner specifies all the necessary entries, she may initiate issuance by, e.g., clicking or touching the "issue a proxy icon" 23070, or interacting with some other user interface element. The mobile wallet then produces a proxy element with the mobile wallet provider and/or payment element issuers. The mobile wallet may send the proxy to other mobile wallet securely by email, text message, wallet-to-wallet communication, or other method, and the receiving mobile wallet may use it as specified in the usage conditions. In some cases, the user may specify the receiving mobile wallet in the proxy element producer 23010 and the mobile wallet may send it to the receiving mobile wallet.

Figure 24A:
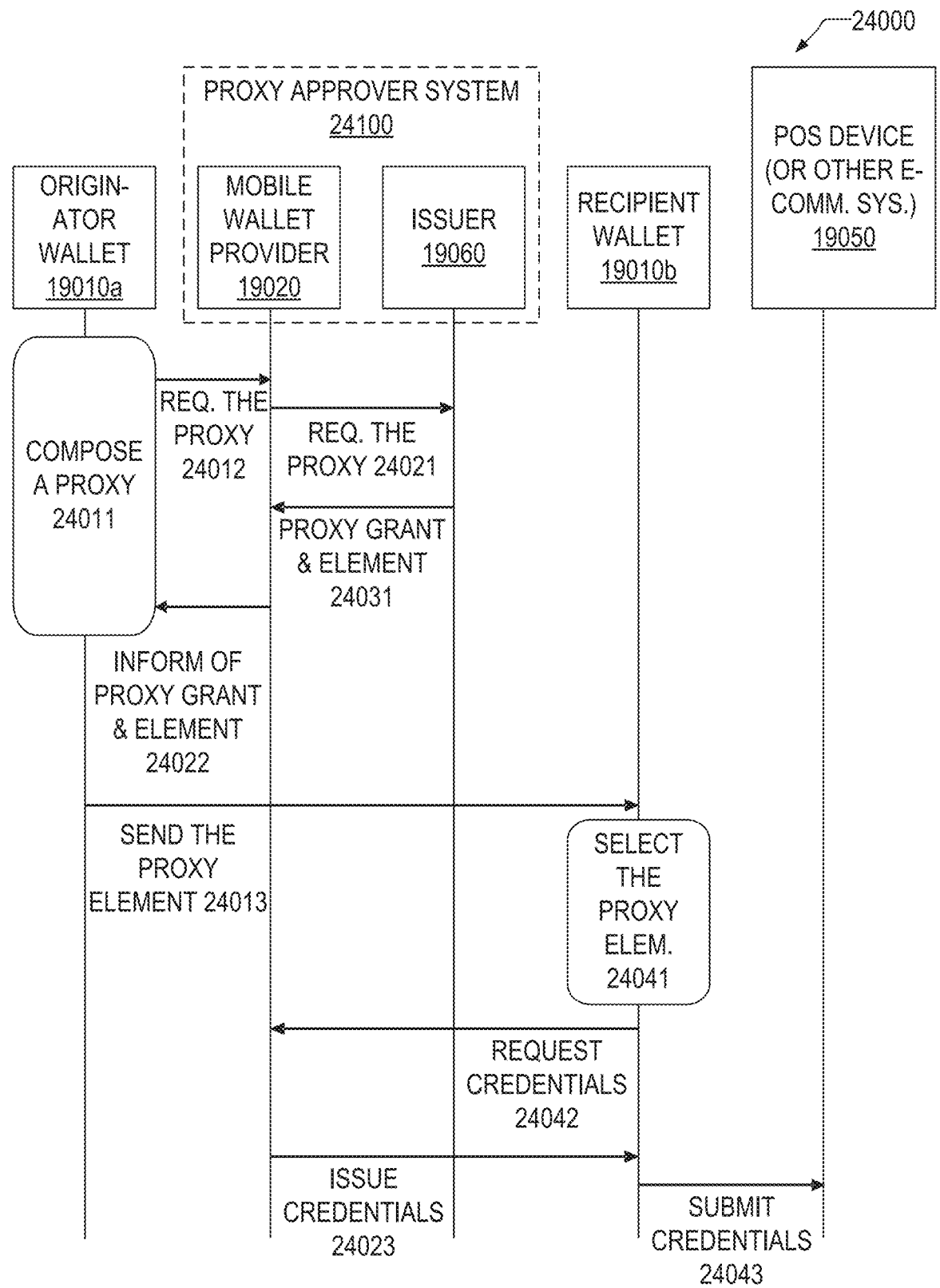
FIGS. 24A, 24B comprise a flowchart of an example of a process that may be used for proxies.
Figure 24B:
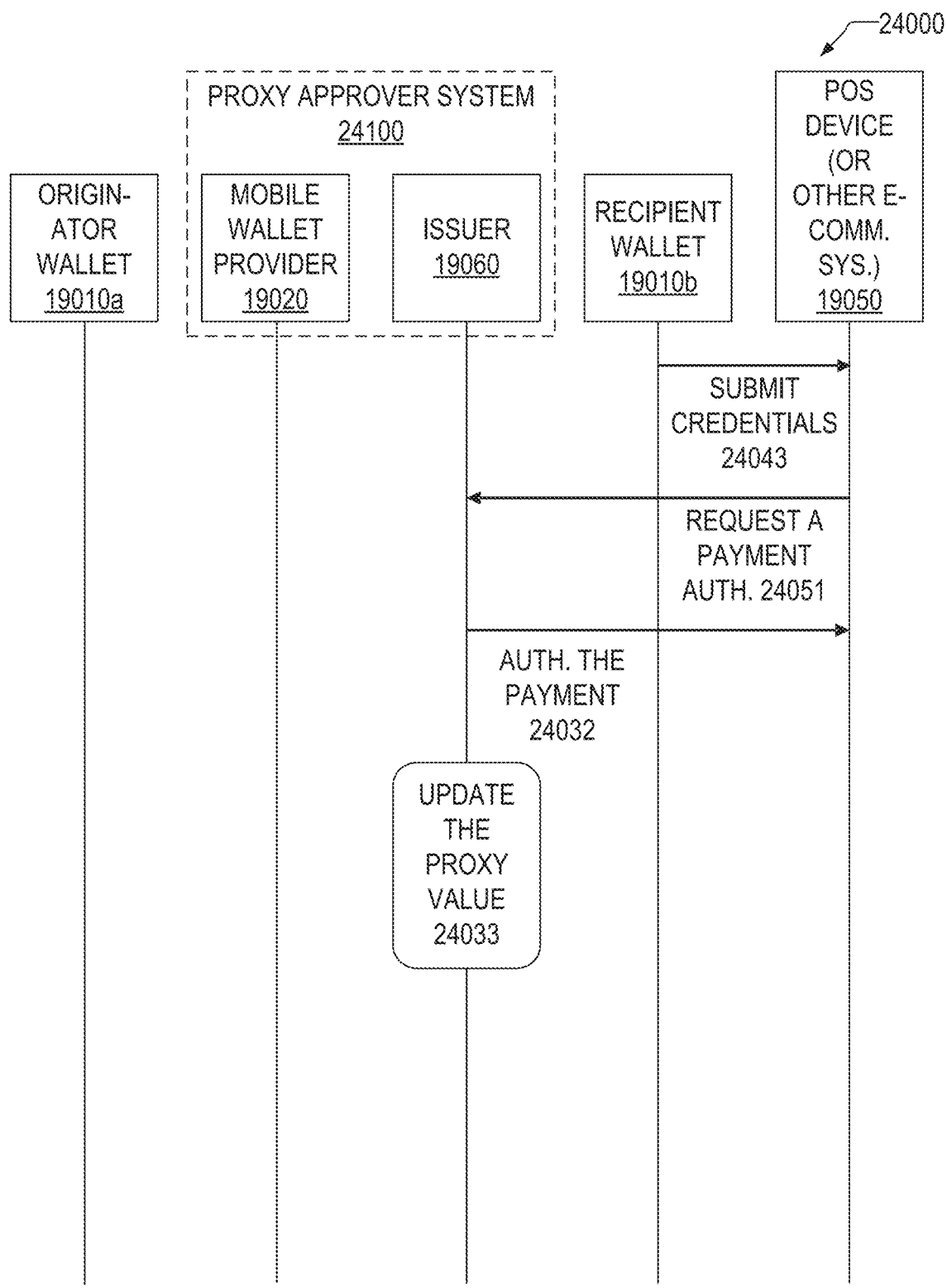

FIGS. 24A, 24B comprise a flowchart of an example of a process 24000 that may be used for proxies. In this example, the originator wallet 19010a may compose a proxy by using a user interface such as the example shown in FIG. 23. When the mobile wallet owner clicks the issue a proxy button 23070, the mobile wallet 19010a transfers the data to the proxy approval system 24100, which may comprise the mobile wallet provider 19020 and the issuer 19060, to the mobile wallet provider 19020 and requests permission to create a proxy element in operation 24012. The arrows illustrated in these FIGs. illustrate process operations, but may also be understood as representing network inputs and outputs to the components illustrated in the FIGs.

The mobile wallet provider may submit the request to the payment element issuer 19060 which may be selected in the user interface element 23020 in FIG. 23. The element issuer 19060 records the proxy element request and grants the request in operation 24031, if proper. The mobile wallet provider may then inform the requester of the grant from the element issuer to the originator mobile wallet in operation 24022. In a configuration, once the proxy element is granted, it may be considered active until an expiration date, has a zero monetary amount remaining balance, or has some other form of terminating activity or status. The related payment element may be disabled while the proxy element is active.

At this point, the originator mobile wallet 19010a has produced and holds a proxy element with the specification shown in FIG. 23. The proxy element may be encrypted in a configuration. The originator sends the proxy element to the recipient wallet 19010b in operation 24013 by using a secure W2W communication infrastructure. The recipient wallet 19010b may store the proxy element in a memory. The transmission of data between elements contained in FIGS. 24A, 24B may take place over a network 19030, which may include wired or wireless elements.

The recipient mobile wallet 19010b may transfer the proxy element to another mobile wallet (not shown) if it is allowed in the usage conditions in the proxy mobile wallet. The recipient mobile wallet 19010b may select a proxy element (see, e.g., 25030 in FIG. 25 for a mobile wallet with different types of components for the proxy element) from among a number of proxy elements in operation 24041. The selection may trigger the recipient mobile wallet 19010b to send a request to the mobile wallet provider 19020 to get credentials for the proxy in operation 24042. The mobile wallet provider may then issue credentials of the proxy element to the recipient mobile wallet in operation 24023.

The recipient mobile wallet 19010b then may submit the received credentials of the (credentialed) proxy element to a wallet element receiving device of the ecommerce system 19050. An example of an ecommerce system includes a system which communicates with the mobile wallet, such as a POS device, a W2W compliant mobile wallet, and an ATM. The ecommerce system 19050 may then request a payment authorization of the proxy element to the element issuer (i.e., financial institution) 19060 with the credential in operation 24051. The element issuer may then issue an authorization in operation 24032 after verifying the proxy element 23200 based on the data stored during the process of creating the proxy element. The issuer 19060 may update the proxy value in operation 24033 if a portion of it is used or disable it if there is no more value or the expiration date has passed.

In other configurations, the proxy element 23200 may be a non-payment element, such as a membership card, royalty card, or gym pass. For instance, an originator mobile wallet 19010a may produce a proxy access pass from a gym membership card so that the recipient 19010b may access a gym with the proxy element. The above-described process operations may be performed by software components, as described above. For example, the mobile wallet provider 19020, which may be an electronic repository provider, may comprise a proxy request component that handles the proxy requests, a proxy grant component that handles the granting of the proxy, a credentials request component that handles proxy credential requests, and a credentials component that handles the credentials themselves. The issuer 19060 may comprise a proxy request component that handles the proxy requests, a payment authorization request component that handles payment authorization, and a payment authorization component that handles the actual payment authorization from, for example, a merchant.

Figure 25:
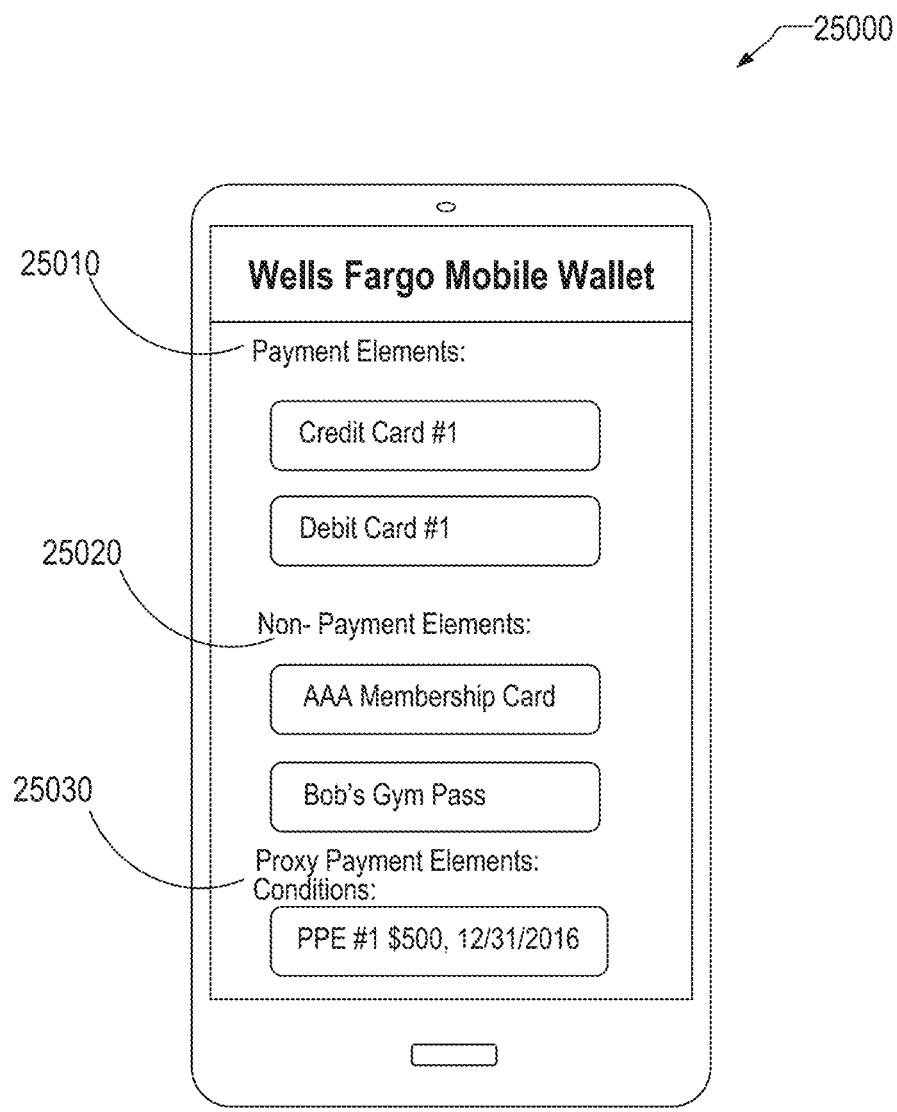
FIG. 25 is an example screen shot/display that illustrates an embodiment of a user interface for using received PPEs.

FIG. 25 is an example screen shot/display 25000 that illustrates an embodiment of a user interface for using received proxy elements or proxy payment elements (PPE). The display shows the presence of two payment elements 25010 (a credit card and a debit card), two non-payment elements 25020 (a membership card and a gym pass), and proxy payment element conditions 25030, discussed above. The mobile wallet user may select the proxy element 25030 and tap the mobile device to a POS device to submit it.

A proxy element 23200 may co-exist with the originator wallet element 23020 in the originator 19010a or the wallet element in the originator may be disabled or suspended while the proxy element is active or in circulation in some cases. An issuer 19060 may specify that there should be only one payment element for an account, and if an originator issues a proxy element from a payment element, the payment element in the originator may not be used until the proxy element comes back and restores the payment element in the originator. In this example, only one mobile wallet with the proxy element may use it.

Access Control List for Mobile Wallets

In the event that someone with an electronic wallet (trusting user), such as one owned by a friend or family member, is unavailable to lend a trusted user their electronic card, it may be desirable for the trusted user to still be allowed access to the electronic wallet of the trusting user. In a pre-electronic real world situation, in the event the trusting user was able to physically provide the card to the trusted person, the trusted person might be able to simply take the physical card from the trusting user's wallet, and (perhaps in a limited way), use it to make a purchase.

As described herein, in the case of digital wallets, an incapacitated trusting user may still provide the ability for a trusted user to access the trusting user's digital wallet and utilize its contents, even though at the time such access is needed by the trusted person, the trusting person may not provide express consent to do so. This may be achieved by having the trusting user digital wallet holder to grant access to cloud based secure element (CBSE) stored payment credentials to trusted (secondary) digital wallet holders. Thus, a mobile wallet system described herein includes a cloud based SE, a first and at least one second mobile wallet, and an access-controlled database in which access to the database is set by the first mobile wallet and grants access to a second, and possibly other, mobile wallets. The access-controlled database may be stored on the CBSE or on the first mobile wallet (or both, and may be split across both), and gives access to payment credentials stored in the CBSE to the second or other mobile wallets.

An example use case could include an emergency situation in which the trusting person is unavailable, but the trusted person needs access to an electronic card stored on the trusting person's digital wallet. The trusted person could simply send a request to the trusting person's wallet for access to the card. If the trusting person has previously set the trusted person's wallet identifier as a privileged user that may access a card or cards from the trusting person's digital wallet without express consent, the trusted person may access the trusting person's digital wallet and gain access to the cards or other contents of the wallet so designated.

Figure 26:
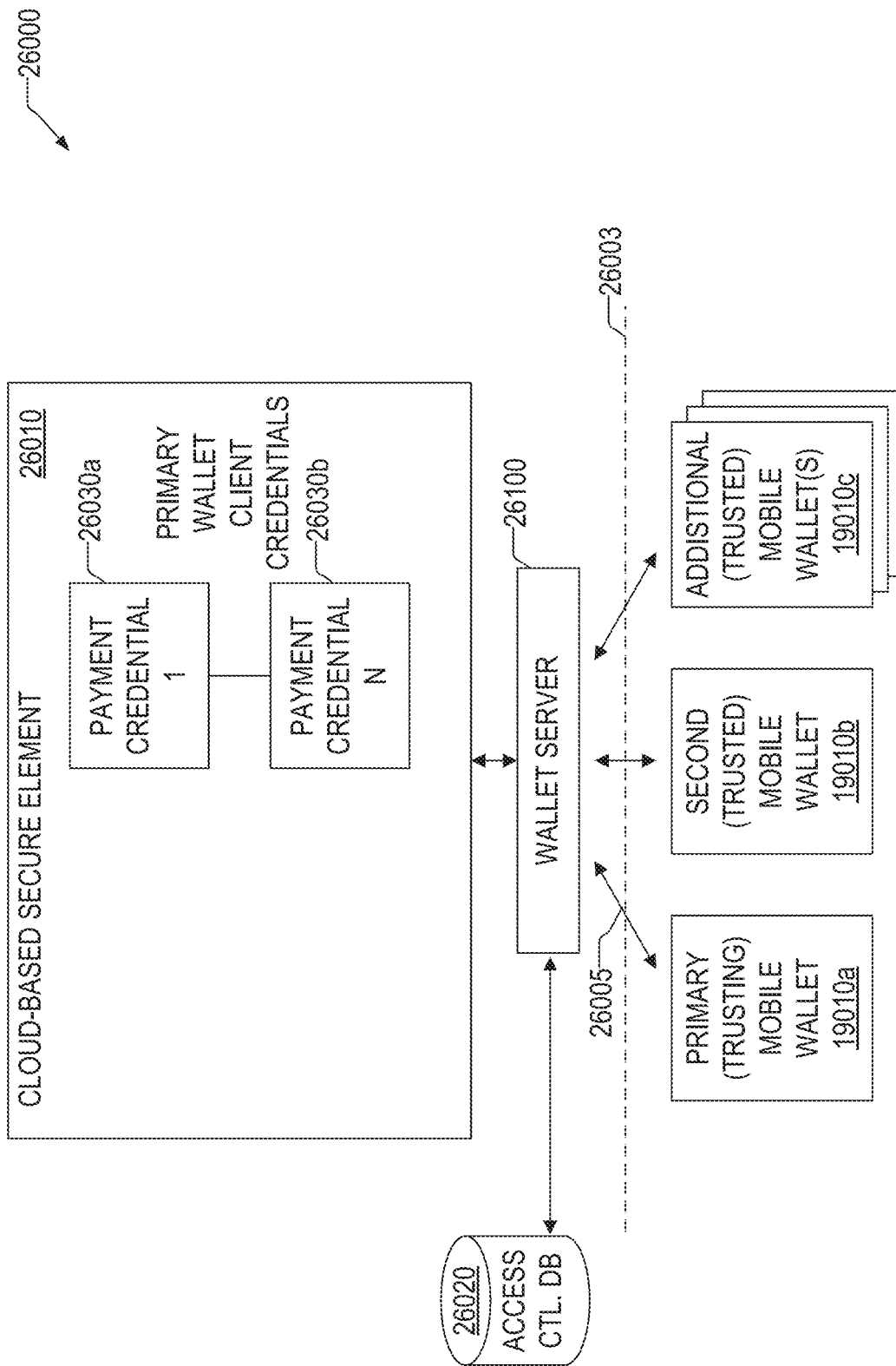
FIG. 26 is block diagram illustrating components of an example of a system for providing access control to payment credentials.

FIG. 26 is block diagram illustrating components of an example of a system 26000 for providing access control to payment credentials that is described in more detail below. A primary trusting wallet client 19101a authenticates to a wallet server 26100, e.g. over a network 26003 using, e.g., a secure HTTP interface 26005, and gains authorized access to a CBSE 26010 and an access control database 26020. The access control database may be inside or outside of the CBSE. The primary trusting wallet client 19010a then may update an account record to include at least one secondary wallet client 19010b, 19010c to have access to payment credentials 26030a, 26030b (collectively or representative instance 26030) stored on the cloud based SE 26010.

The primary trusting wallet client 19010a could set, in the access control database 26020 access information, such as an identifier, (e.g., an email address), along with a password or passcode for the second trusted wallet client 19010b to access various payment credentials 26030. The primary wallet client holder could then pass this access information to the secondary wallet client.

The access control database 26020 could reside, e.g., in the wallet server system 26100, although portions of it could reside within the mobile wallets 19010 themselves. In addition, how the credentials could be used by the secondary wallet client may be described in the section herein on Managing and Using Limited Use Tokens, as an embodiment. Once the secondary wallet client 19010b receives their password or passcode, it may log into the wallet server 26100 and access the payment credential(s) 26030.

Producing Electronic Gift Cards in Mobile Wallets

The mobile wallet 19010 may be utilized to produce and provide electronic gift cards as well, which may be distinguished from traditional plastic gift cards which must be physically purchased and given to a recipient.

Figure 27A:
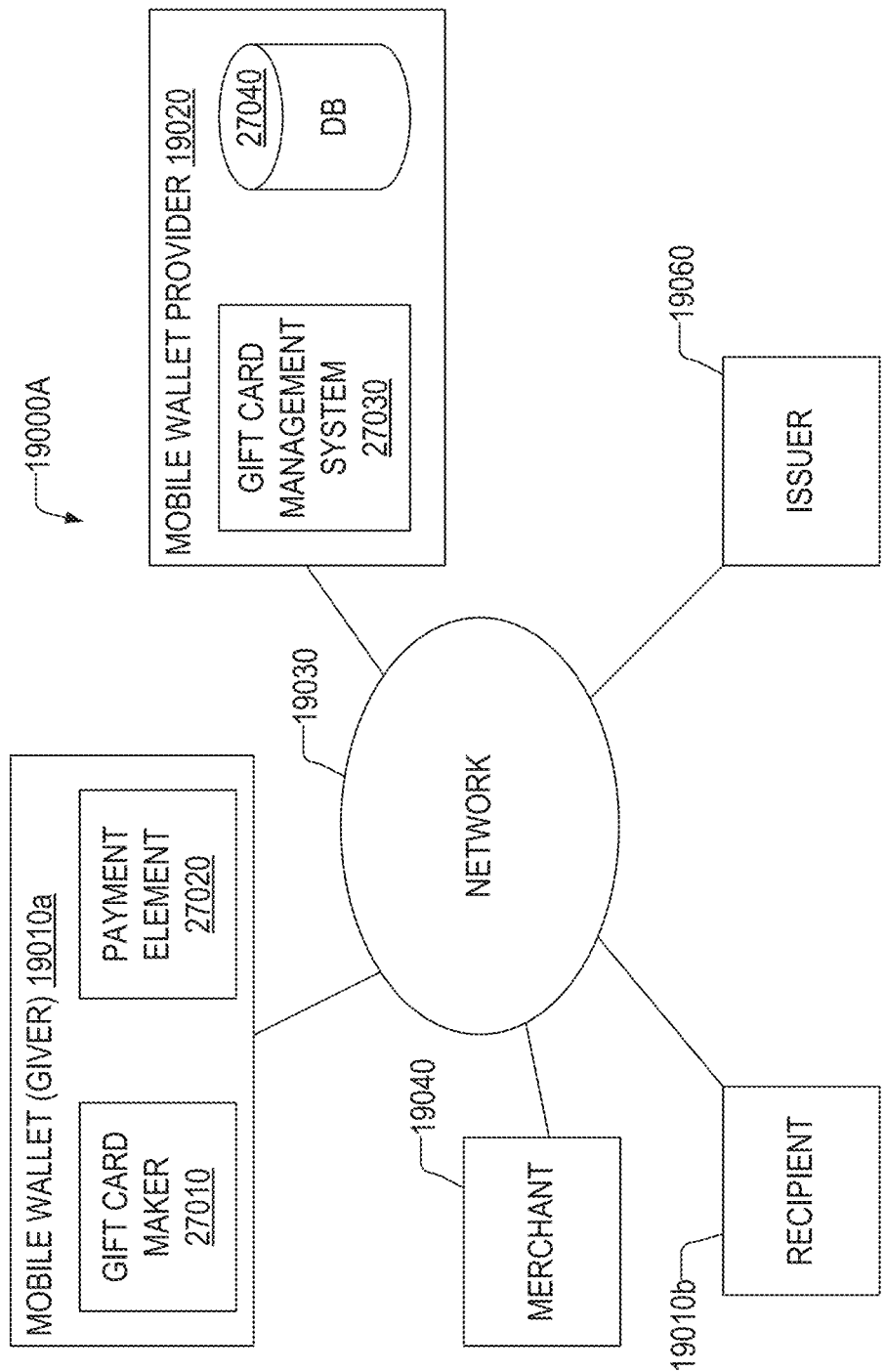
FIG. 27A is a block diagram that illustrates an example of an environment for using a gift card.

FIG. 27A is a block diagram that illustrates an example of an environment for using a gift card. The illustrated environment 19000A comprises a mobile wallet 19010a which is a giver of a gift card, a recipient device (which may or may not be a mobile wallet) 19010b, a network 19030, a merchant 19040, a mobile wallet provider 19020, and an issuer 19060.

The mobile/digital/electronic wallet 19010a is an application program in a computing device, typically a mobile device such as a smartphone or tablet computer, as described elsewhere herein. The mobile wallet 19010a may also include a sub-application or a feature that is a gift card maker 27010, for the user to produce gift cards with their payment account. The mobile wallet 19010a (i.e., giver) may produce an electronic gift card with the gift card maker 27010 using a process that produces a payment element 27020 and sends it to a device of the recipient 19010b electronically.

The recipient 19010b is a receiver of the gift card payment element sent by the mobile wallet 19010a electronically. The recipient 19010b may use a mobile wallet to receive and use the gift card, or some other computing device.

The issuer 19060 is a financial institution, such as bank or credit card company, that issues the payment element 27020 to the mobile wallet 19010a. When a mobile wallet, such as that of a recipient 19010b, submits a received payment element 27020 to make a payment with a merchant 19040, e.g., by tapping the mobile wallet with a selected payment element to a POS device for instance, the merchant may use the payment network 19030 to get a payment authorization of the submitted payment element from the issuer 19060.

The merchant 19040 is a business that may sell products or provide services. The merchant may be a brick-and-mortar or online store/service provider.

A mobile wallet provider 19020 is an organization that provides the mobile wallet application 19010 to mobile devices and related services and manages them. In some cases, a mobile wallet provider 19020 is the issuer 19060 of the mobile wallet payment element. For instance, Wells Fargo is a provider of the wallet application (e.g., Wells Fargo Wallet) and the payment element for Wells Fargo credit card (e.g., Visa). The mobile wallet provider 19020 may use a gift card management system 27030 and a database 27040 to manage the service to produce gift cards with the gift card maker 27010 in the mobile wallet 19010a.

The communication network 19030 represents a virtual network which provides communication between entities illustrated in FIG. 27A, and which is described in more detail herein.

In the environment in FIG. 27A, the mobile wallet provider 19020 is a facilitator to provide the service of producing gift cards from the mobile wallet 19010a. Merchants 19040 may sign up to participate in the service and issuers 19060 may join to become a provider of a payment element 27020 for selected merchants 19040. The mobile wallet 19010a user may choose to select a merchant and a payment element (issuer) in producing gift cards. If the mobile wallet 19010a does not have a particular payment element 27020 issued by an issuer 19060 that is accepted by a merchant 19040, the mobile wallet may not be able to produce a gift card that may be used at the merchant 19040.

An electronic gift card may comprise a cover page and a gift page. When a recipient of an electronic gift card opens it in a computing device, such as a smartphone, the computing device may show the cover page with a message such as "Happy Birthday!" The gift page may display, e.g., a value of the gift card, such as dollar amount, merchant name, a product, and/or, and issuing bank (see FIG. 30 below).

Figure 27B:
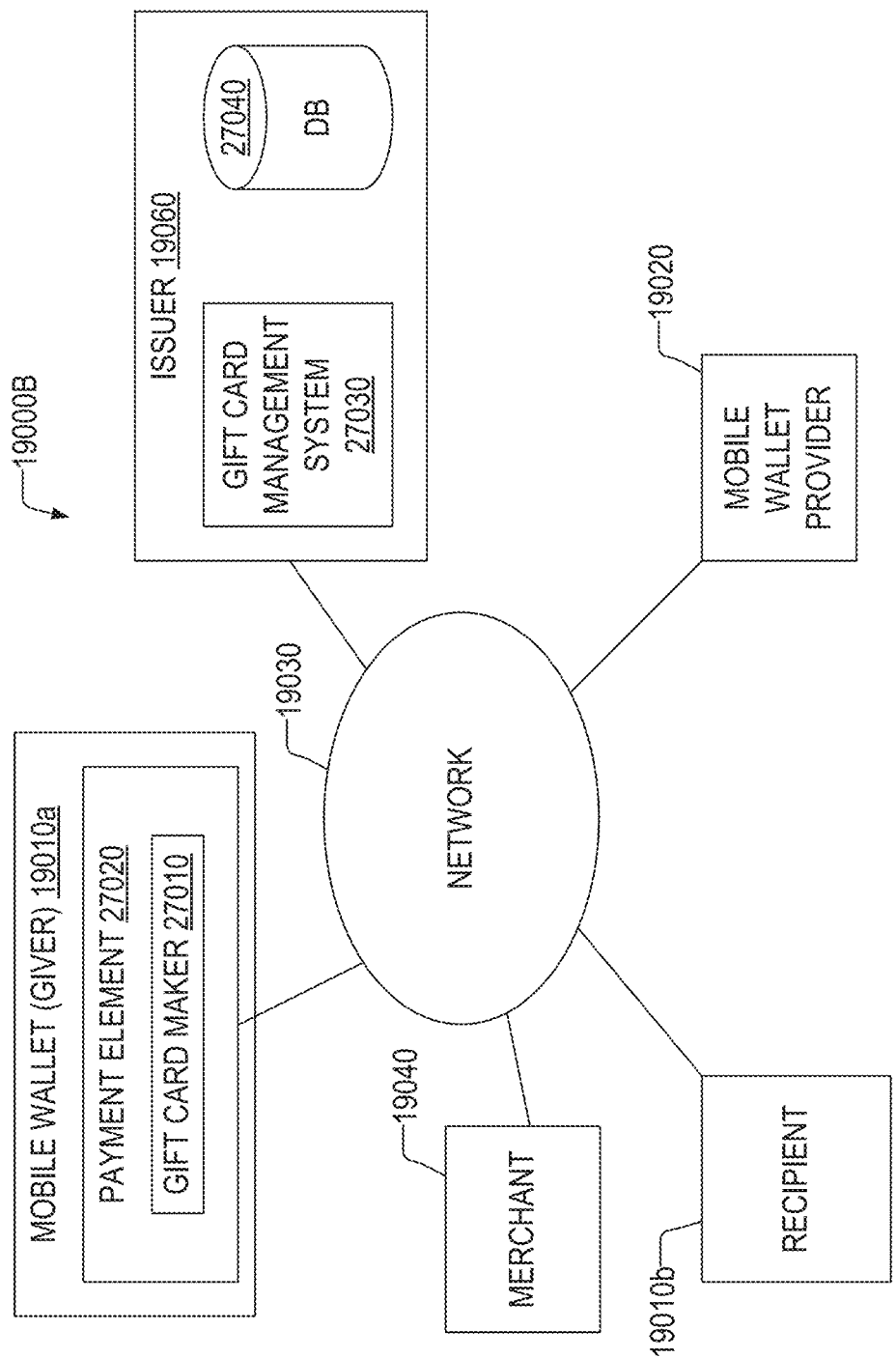
FIG. 27B is a block diagram of an alternative environment for using a gift card in which the facilitators of the service to produce gift cards are issuers.

FIG. 27B is a block diagram of an alternative environment. In this environment, the facilitators of the service to produce gift cards are issuers 19060, such as a bank or credit card company. The environment 19000B comprises a mobile wallet 19010a with payment element 27020, a recipient 19010b, a merchant 19040, a mobile wallet provider 19020, and an issuer 19060.

Unlike the configuration shown in FIG. 27A, the gift card maker 27010 may be a sub-application or a feature in the payment element 27020. The mobile wallet 19010a user may open the gift card maker 27010 after selecting the payment element 27020, where the payment element 27020 presents the gift card maker 27010 presented as an icon to launch the sub-application. As an aside, various functions described herein and associated with the mobile wallets 19010 may be invoked as an independent function or process, or, as illustrated in FIG. 27B, may be invoked as a function that is bound with a payment element 27020 itself. Thus, the selection of the payment element 27020 could provide a list of icons or other selectable indicia for functions that could be performed relative to that particular payment element (e.g., proxy, gift card, loaner element, etc.).

The issuer 19060 or a third party associated with the issuer manages the gift card management system 270201 and the database 270202. Merchants 19040 may join the issuer to participate in the service and the gift card management system 270201 that may directly interface with the gift card maker 27010 in the payment element 27020 without interacting with mobile wallet provider 19020.

Figure 28:
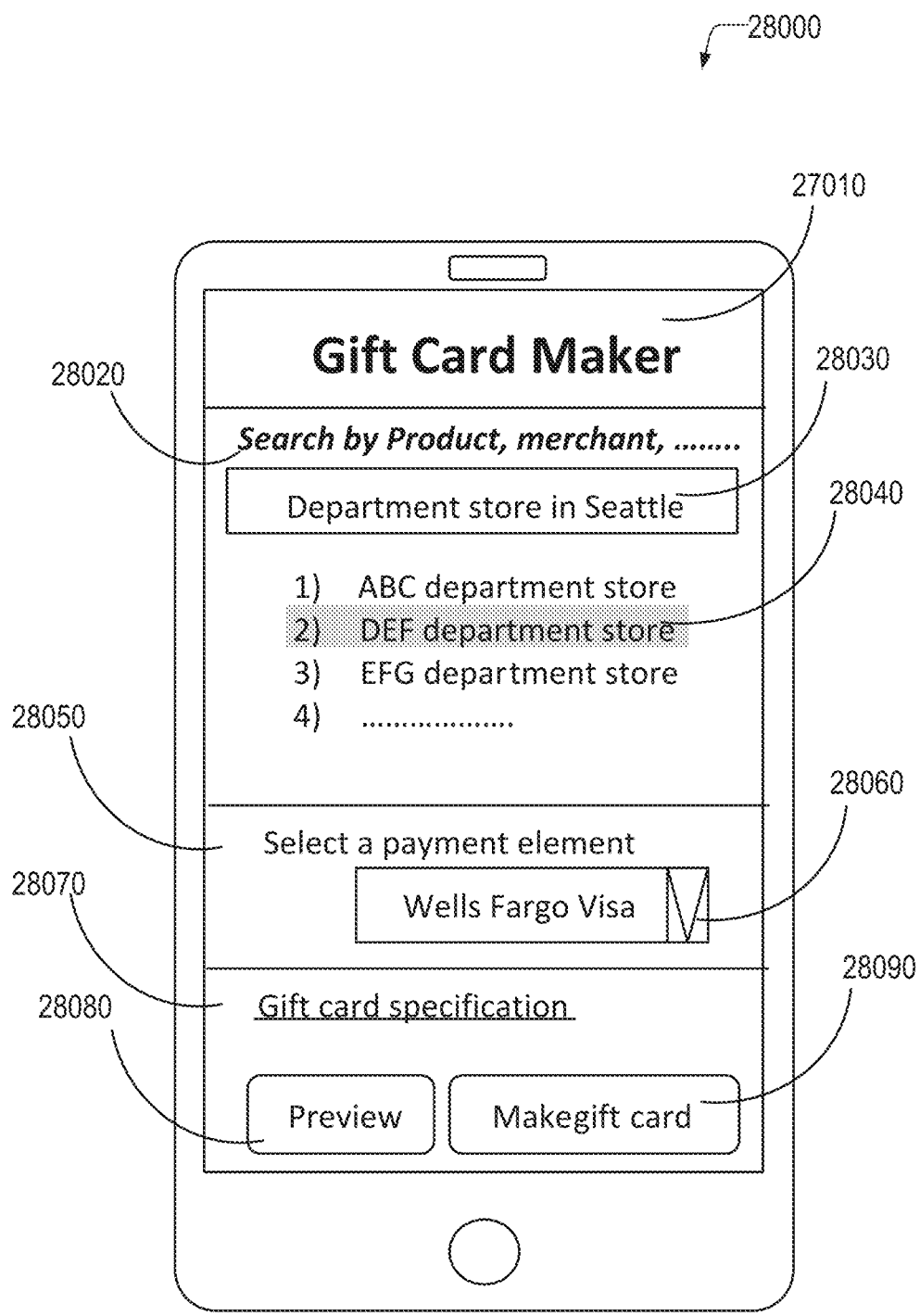
FIG. 28 is an example screen shot/display that illustrates an embodiment of gift card maker in a mobile wallet.

FIG. 28 is an example screen shot/display 28000 that illustrates an embodiment of gift card maker in a mobile wallet 19010. The mobile wallet 19010 presents the gift card maker application 27010 when the user launches it from the mobile wallet 19010. The gift card maker 27010 may comprise a search engine utility interface 28020, a window or field 28050 to select a payment element in the mobile wallet 19010, a window or field to specify a gift card with usage conditions 28070, a preview user interface element, such as a button 28080, and a maker a gift card user interface element, such as a button 28090. (FIG. 28 is described in association with the environment shown in FIG. 27)

The mobile wallet 19010a user (giver) may use the search engine 28020 to find product, merchant, suggestions (for, e.g., birthday gifts), or other targets. The user may enter search content in a user interface element, such as the box 28030. The search engine contacts the mobile wallet provider 19020 and interfaces with the gift card management system 27030, performs a search in the database 27040, and presents the results. The database 27040 may hold information relating to participating merchants, products, promotions, issuers, and other information that are used by the gift card maker 27010 in the mobile wallet 19010. For example, the giver 19010a searches participating department stores in Seattle, Wash. in the database 27040, and the search engine presents a list of available department stores from the database 27040. If the giver 19010a selects a merchant 19040 DEF department store on the mobile device, the gift card maker 27010 may identify a set of payment elements in the mobile wallet 19010 which is accepted by the department store and present these payment elements in the window of the user's display device. The giver may select a preferred payment element 28060 from a list of available elements. If none of the payment element in the mobile wallet is accepted by the chosen merchant 19040, the payment element window 28050 may indicate that there is none.

The giver may touch the gift card specification 28070 of their device to specify a value of the gift card (e.g., $ amount), usage condition, and provide other information. A link may be provided to open a new user interface for the giver to specify the additional information. The usage condition may specify a specific product, if the card is transferable, amount is divisible, expiration date, geographic limit, and/or other information.

When a merchant 19040 joins the gift card service, it may provide promotion offers for the gift card to attract customers to its store. For instance, a merchant may provide an offer for a user to purchase a $100 gift card for $85 which is equivalent to a 15% discount. Other merchants 19040 may offer reward points, discounts for a future purchase, or the like. Some stores may offer incentives for the giver 19010a. When the giver searches products and/or merchants, the gift card maker 27010 may obtain promotional information from the database 27040 and present information to help the giver make a decision.

In other variations, the gift card maker 27010 may allow the user to produce a universal gift card which may be used at any merchant 19040. In an alternative variant, a gift card may be used with a group of related merchants, such as restaurants, within a geographic boundary, for instance, New York City.

Figure 29:
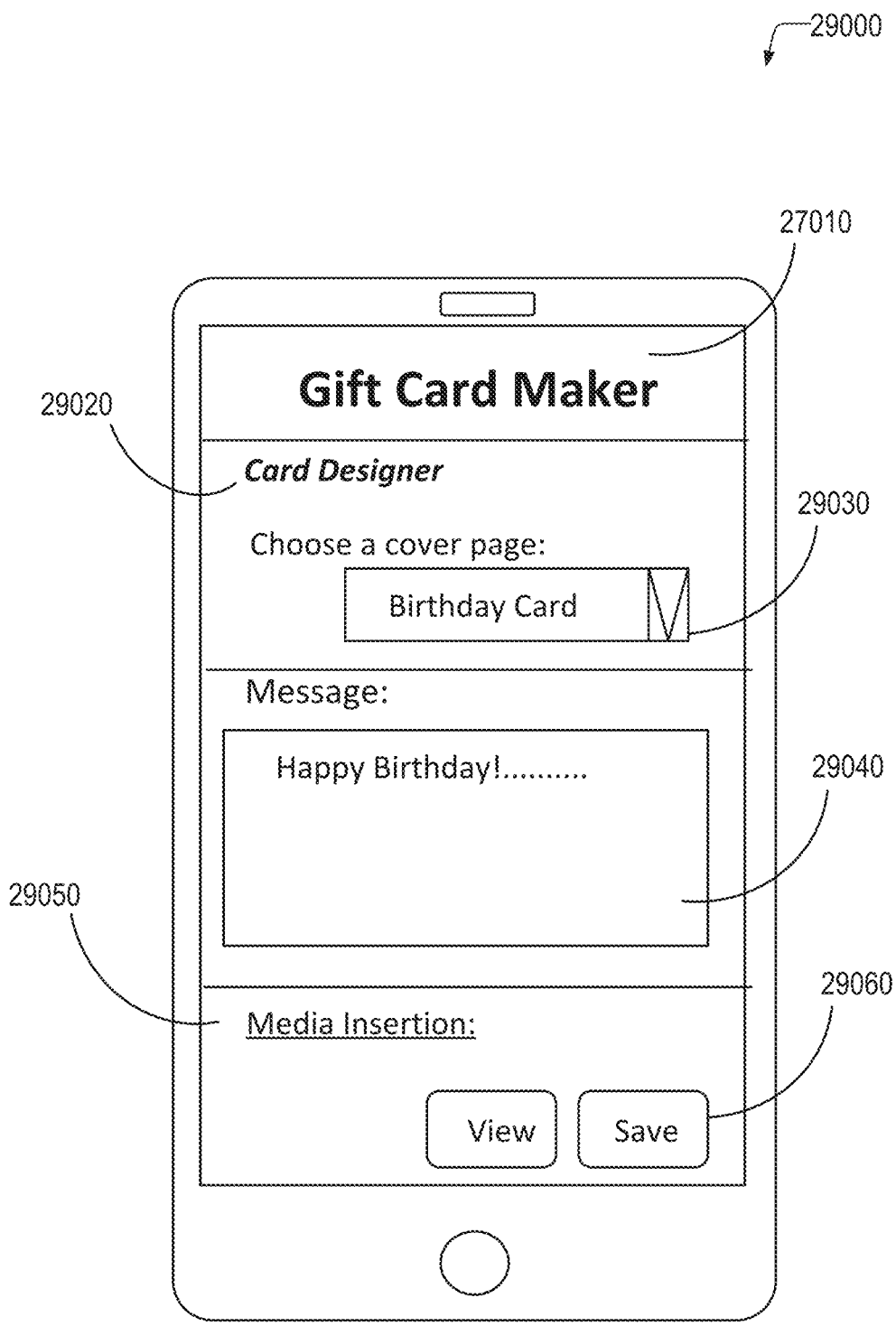
FIG. 29 is an example screen shot/display that illustrates an embodiment of the card designer in the gift card maker.

FIG. 29 is an example screen shot/display 29000 that illustrates an embodiment of the card designer in the gift card maker. A mobile wallet may use the card designer 29020 to make a personalized cover page of the gift card. The giver may choose a cover page from one or more preexisting templates via a selection element 29030 or create a cover page with a tool provided by the card maker. The giver may enter a message, such as "happy birthday" or "congratulations," etc., in a window region 29040. The card designer may allow the giver to add media to the cover page through a media insertion element 29050. A media type may be, e.g., voice, music, photo, animation, and video, and any combination of these. The giver may preview the content of the personalized card and save it by e.g., touching a save button 29060. When the recipient receives the gift card, she may play the personalized content on the cover page. The personalized content may have the giver's contact info, such as an email address or phone number in one embodiment. The recipient may send a reply through the contact info in the cover page after the opening the gift card.

Figure 30:
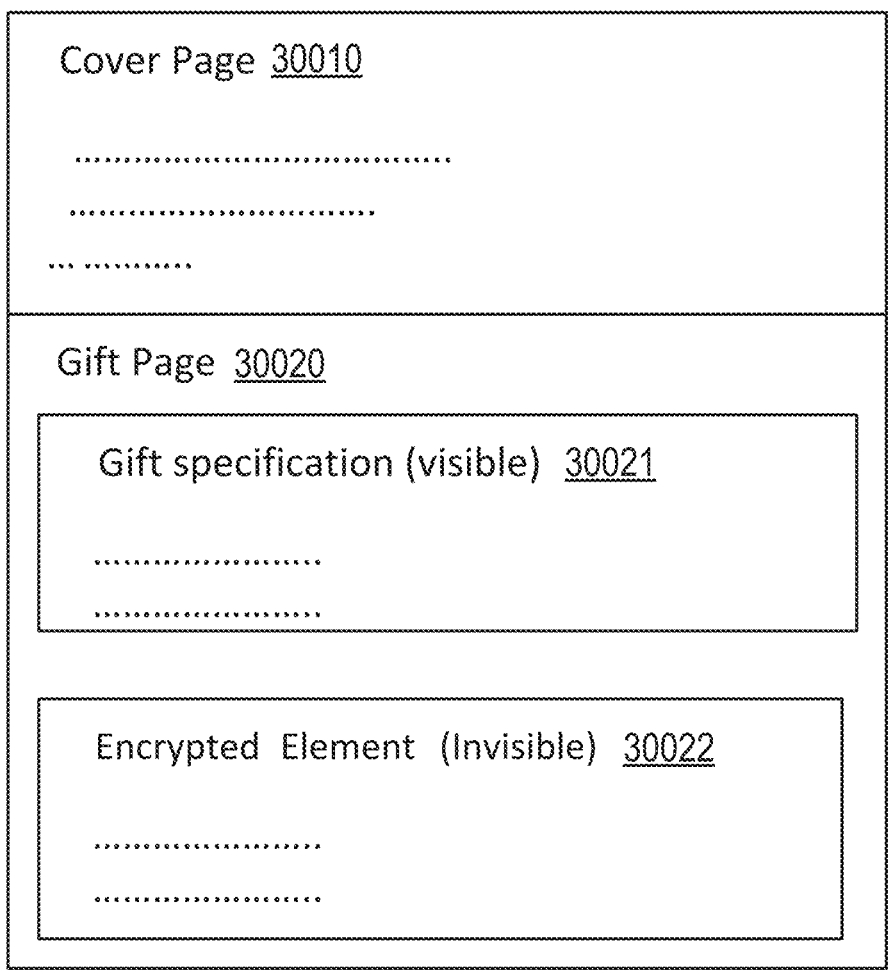
FIG. 30 is a block diagram that illustrates an example of a data structure of an electronic gift card.

FIG. 30 is a block diagram that illustrates an example of a data structure of an electronic gift card. The gift card 30000 may comprise a cover page 30010 and gift page 30020. The cover page 30010 includes the content displayed on the cover page of the electronic gift card and associated media, which are visible to the recipient. The gift page 30020 may comprise two parts. A first part may include a gift specification 30021, such as gift amount, merchant name, address, phone number, issuer name, giver name, and usage condition (if any). A second part may include an encrypted element 30022, which is not displayed on the gift page when the gift card is opened. The encrypted element 30022 may be used by the mobile wallet, and supporting entities, such as an issuing bank, mobile wallet provider, and/or merchant to process the payment when the gift card is used.

The specification part 30021 may include a unique gift card number which may be recognized by the issuing bank or supporting entity. The gift specification 30021 may have a bar code, QR code, or other identifying code of the specification which may be recognized by the issuing bank only. The code may be encrypted in one embodiment. The encrypted element 30022 is typically invisible to the recipient computing device when the gift card is displayed on the device, and may hold the account information, including giver's info, issuer info, financial value, and other in an encrypted form that may be processed by the issuer or a supporting entity such as mobile wallet provider and merchant.

The cover page 30010 and the gift page 30020 in an electronic gift card may be separable. The gift specification 30021 and encrypted element 30022 in the gift page 30020 may not be separable. When a recipient receives an electronic gift card, she may store the gift page 30020 as a payment element in the mobile wallet, which automatically stores the encrypted element 30022 with it. In one embodiment, gift card service providers may process a gift card with the content in the gift specification 30021 and the recipient may print the gift specification 30021 (without the encrypted element) on a paper and submit it to a merchant to process.

When a recipient submits the gift page 30020 in the mobile wallet, the mobile wallet submits the encrypted element 30022 as a payment and the merchant may get a payment authorization from the issuer. In one embodiment, the gift page 30020 is transferable to another entity if the usage condition allows it. Since the issuer has the same copy of the encrypted element in its database, any tampering of the gift card may be recognized and not be processed by the issuing bank.

Figure 31:
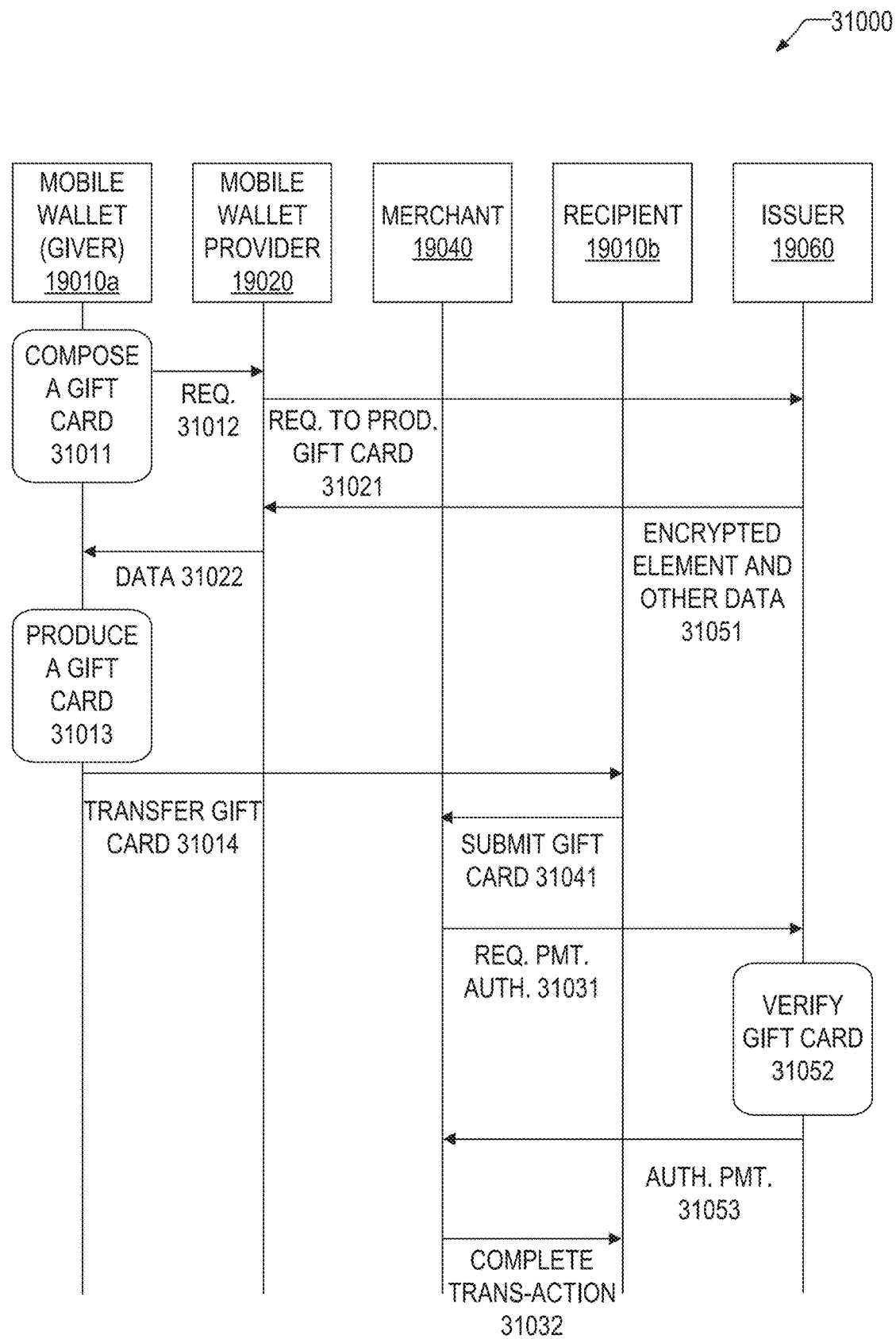
FIG. 31 is a flowchart that illustrates an example of a process of producing and processing the electronic gift card.

FIG. 31 is a flowchart that illustrates an example of a process of producing and processing the electronic gift card. The mobile wallet (i.e., giver) 19010a composes a gift card and, e.g., touches the make gift card button 28090 in operation 31011 (FIG. 31 shows the process in the environment shown in FIG. 27A). The mobile wallet 19010a may send a portion or all of the specification the giver entered in the gift card maker and request the mobile wallet provider 19020 to get a gift card in operation 31012. The mobile wallet provider 19020 may pass the information to the issuer 19060 and request the issuer to produce an electronic gift card in operation 31021. The issuer 19060 may create the encrypted element 30022 and some data in the gift specification, for instance, the QR code or other identifying code, if it is used, and sends them to the mobile wallet provider 19020 in operation 31051. The issuer 19060 may also keep the information about the gift card in its database. The mobile wallet provider 19020 may keep some of the gift card information in its database and pass the data to the mobile wallet 19010a in operation 31022. The mobile wallet may then produce an electronic gift card 30000 shown in FIG. 30 in operation 31013.

The giver mobile wallet 19010a may provide the gift card 30000 to the recipient mobile wallet 19010b. The recipient may receive the gift card 30000 with her mobile wallet 19010b or, in this instance, another computing device which may open the gift card. The recipient 19010b may separate the gift page 30020 and submit it as a payment to the merchant 19040. The merchant 19040 may verify if the gift card 30000 may be used in their place and request a payment authorization to the issuer 19060 in operation 31031. The issuer 19060 may verify the gift card 30000 in operation 31052 by using the information in the encrypted element 30022. If the authenticity of the gift card is verified, the issuer may authorize the payment in operation 31053. The merchant may complete the transaction and inform the recipient 19010b of the completion in operation 31032. In one embodiment, if the recipient 19010b uses a portion of the total value of the gift card, the merchant may keep a record or this and inform the issuer and the recipient of the partial use and possibly allowing the recipient 19010b a credit for the amount.

Figure 32:
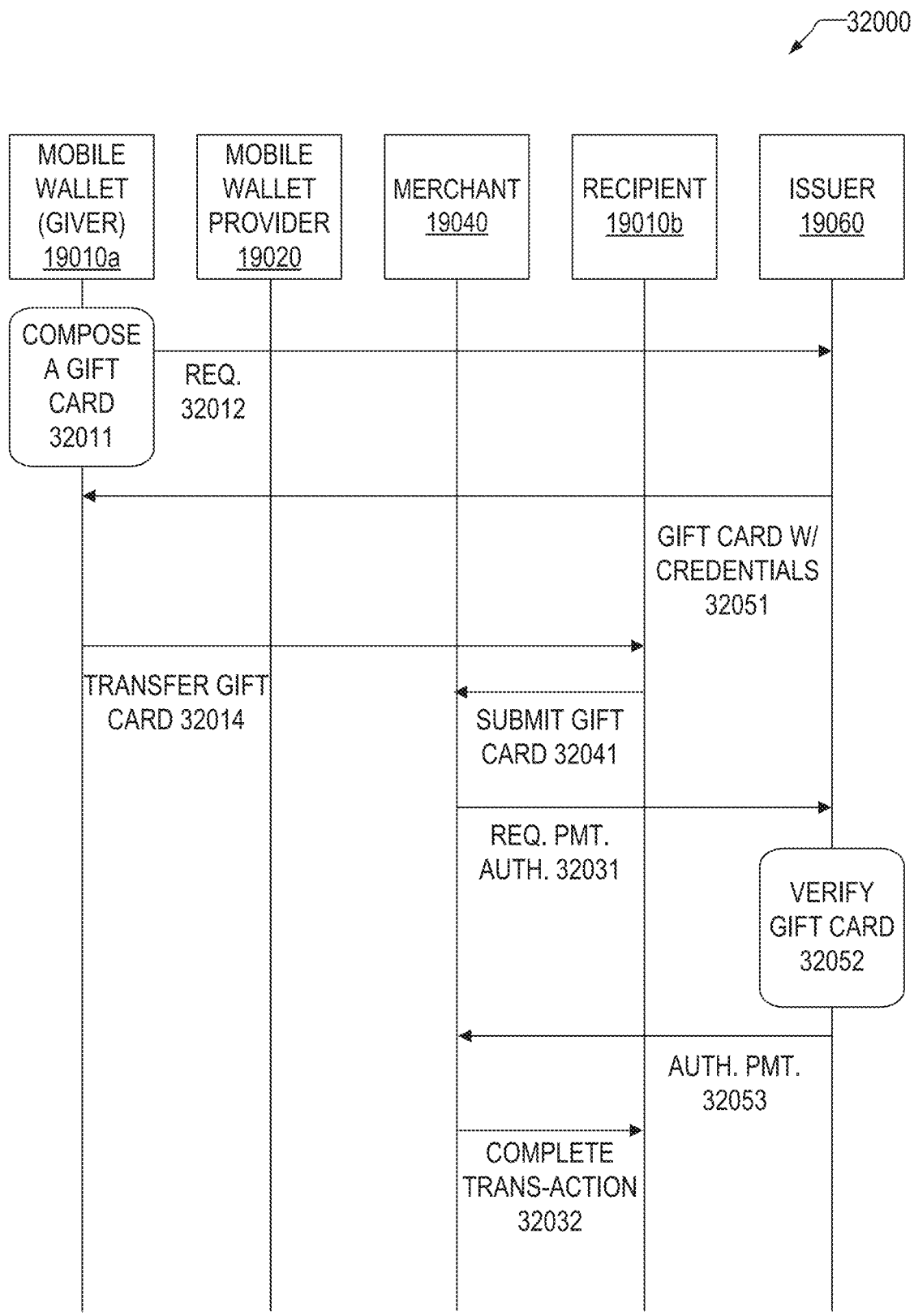
FIG. 32 is a flowchart that illustrates an example of an alternate process of producing and processing the electronic gi card.

In the environment shown in FIG. 27B, the giver mobile wallet 19010a may bypass the mobile wallet provider 19020 and interact with the issuer 19060 directly in producing a gift card 30000. FIG. 32 is a flowchart illustrating an example of operation in this environment. Here, the mobile wallet user (i.e., giver) may open a payment element (e.g., credit card) 28060 in the mobile wallet 19010a and use a function (gift card maker 27010) embedded in the payment element 27020 itself to create a gift card.

In composing the cover page 30010, the issuer 19060 may provide enhancing functions to the gift card creation element, such as searching for a merchant, searching for a product, and/or accessing promotions offered by chosen (or other) merchants. After the giver composes the gift page 30020 and specifies the gift content, the mobile wallet (i.e., element) 19010a, may request the issuer 19060 to create a gift card 30000 and send it to the giving mobile wallet 19010a in operation 32012. The mobile wallet issuer 19060 may create and send the gift card 30000 with the cover page 30010 and the gift page 30020 shown in FIG. 30 to the giving mobile wallet 19010a in operation 32051.

The giver mobile wallet 19010a may give the gift card to the recipient mobile wallet 19010b in operation 32014. The recipient may receive the gift card 30000 with her mobile wallet 19010b or other computing device which may open the gift card. The recipient may separate the gift page 30020 and submit it as a payment to the merchant 19040 in operation 32041. The merchant may verify if the gift card may be used in their business and request a payment authorization to the issuer 19060 in operation 32031. The issuer 19060 verifies the gift card in operation 32052 by using the information in the encrypted element 30022. If the authenticity of the gift card is verified, the issuer 19060 authorizes the payment in operation 32053. The merchant 19040 completes the transaction and informs the recipient mobile wallet 19010b of the completion in operation 32032.

In FIG. 31, the giver mobile wallet 19010a composes the gift card by getting help from the mobile wallet provider 19020, while in FIG. 32, the issuer 19060 composes the gift card and send the gift card to the giver mobile wallet 19010a. However, in the configuration illustrated in FIG. 31, the mobile wallet 19010a may operate directly with the issuer 19060 to get the gift card, as illustrated in FIG. 32. Conversely, in the configuration illustrated in FIG. 32, the mobile wallet 19010a may interact with the wallet provider 19020 to get the gift card, as illustrated in FIG. 31.

Gift Cards Merchant Services in Augmented Reality Platforms

As consumers accelerate their transition to mobile only digital services, it may be desirable for businesses and professionals to provide compelling merchandising offerings to advertise their products and services to prospective consumers within the local communities that they serve and represent. For instance, businesses operating in local communities may rely on a combination of merchandising offers, such as the use of assets (for example, gift cards or coupons), to drive traffic to their various retail locations or online stores.

Although widely used, these assets come with several major limitations to their users, such as getting lost, damaged, or simply forgotten. This effectively translates into a loss for their buyers in a manner which is not is becoming less acceptable with today's connected world of digital wallet and social network interactions.

In order to facilitate the use of such assets, described below is a system and method that relates to the use of merchant gift card services in an augmented reality platform. This is a platform for the publishing, distribution, and management of assets, such as merchant gift cards, between two or more registered users through the use of augmented reality applications that leverage embedded camera(s) of mobile connected devices. Augmented reality may be distinguished from virtual reality in that an augmented reality application may utilize actual imagery of a user's surroundings that has been enhanced by the provision of additional information. In virtual reality, the entirety of the user's viewing experience may be computer-created. For example, an augmented reality shopping experience may have a person walking around a store and viewing items. When viewed through an application on their smart phone, an image of a product captured with the camera and displayed on the screen might be enhanced with customer reviews or alternative products displayed on the screen with the product. In an example virtual reality shopping experience, representations of the products, shelves, and aisles may be completely generated by the computer and have no physical structure in reality.

Today's large scale deployment of localization services running from mobile smartphones and other connected devices enable a new range of merchandising services that may leverage augmented reality mobile applications to dynamically bridge the local retailer to its potential consumers based on their relative proximity to each other and other expressed interests, as may be managed in real-time by an augmented reality platform back-end system and applications.

The term "registered user" of this merchant gift card services in an augmented reality platform is defined herein to be a merchant service provider or a consumer. When a merchant service provider is registered, he may access an online business-to-business (B2B) portal to post various assets, such as one or several: gift cards, coupons, or other valuable items. The posts may include a description of the posted assets along with individual properties and/or rules that govern the purchase of these assets from within the augmented reality platform, including, for instance, the security and authentication level that may be applicable to the purchase of a particular asset as well as those described above.

Once published, the platform back-end system may manage a transfer of the published assets first between a specific merchant (professional) and its buyer (consumer) and second between two (or more) consumers defined respectively as a buyer and one (or more) receiver, including enforcement of the required security and authentication levels.

The buyer is a business-to-consumer (B2C) consumer who is purchasing or acquiring an asset, such as a gift card, a valuable item, or a coupon(s) to apply for future purchases. The receiver is a B2C consumer who is receiving the acquired asset from a buyer. A buyer may also be a receiver.

Once registered, a B2C consumer may access the merchant gift card augmented reality application from his connected mobile device, triggering specific merchandising offers when getting in close proximity of a registered retail location, as correlated by the augmented reality application. The specific registered retail location may be determined using a GPS location of the mobile device and/or image data captured from a camera of the mobile device. For example, if the consumer is standing on a sidewalk and facing three stores, pointing the camera at the middle store may indicate that this is the selected merchant and trigger the specific merchandising offers from this merchant. Thus, the camera may serve as a mechanism for delineating between merchants that are within a same vicinity of one another.

When the user points his camera at the merchant's building from outside of the building, or when the user is within the building, the application may overlay retail location merchandising offerings onto the screen of its connected mobile device. In this case, the B2C registered user may receive a dynamic listing of the various assets that are provided by this particular retailer at this retail location and that may be purchased or transferred to its augmented reality account.

Figure 33:
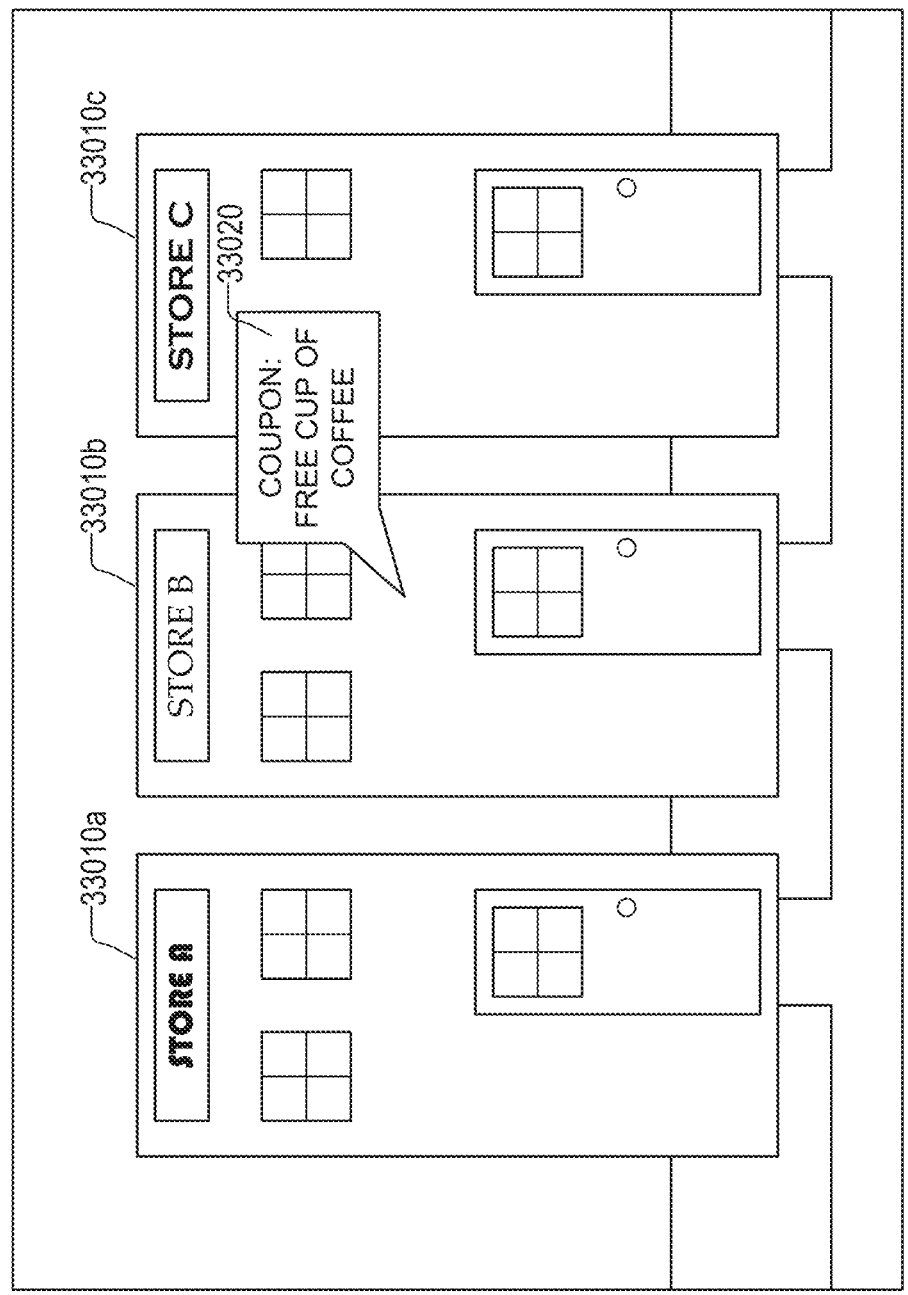
FIG. 33 is a screen shot for an example augmented reality gift card application.

FIG. 33 is a screenshot 33000 from an example augmented reality application. The screenshot 33000 may be displayed on a user's smartphone or similar device. Here, the GPS unit may determine an approximate location of the device and the application may provide information on merchants in the area. The camera of the device may be generally pointed at a group of stores 33010a-33010c, and aimed at one particular store, Store B 33010b. The augmented reality application may then provide on the screenshot 33000 an indicator of the availability of a coupon or gift card by overlapping the indication 33020 on the display.

In this model, a giver may purchase a particular (e.g., by selecting) asset as listed from within its augmented reality application based on a correlation of that retail location coupled with the listing of the published selection of merchandising offers as linked to this particular retailer. As a buyer, the purchased item may be consumed either by that same user, i.e. giver is also the receiver, or by another registered user of the augmented reality platform, as selected by the giver. Such a selection may be, for example, from a list of pre-existing first degree connections as compiled and managed by the platform—or it could be by any other pre-established criteria.

Similarly, a receiver may be notified that a particular asset has been delivered to its account, as may be listed from within its augmented reality application, based on, for example, the correlation of that retail location coupled with the listing of available gift cards or coupons that are licensed to that user's account by the augmented reality platform. By selecting the one or several items presented, the receiver may confirm the transfer of these assets from the buyer's account to the receiver's account.

The following non-limiting use cases illustrate an application of the system described above. The first use case illustrates a use of merchant gift card services for B2B accounts. In this use case, a seller B2B registered user, such as a business owner or professional who may be a local retailer, creates and posts assets. These assets may comprise digital assets such as gift cards of different styles and monetary values, and may be defined by a set of rules and properties that the B2B user specifies. In the B2B context, a buyer B2B registered user might purchase assets in bulk from the seller, subject to certain restrictions specified by the seller.

For example, a seller might be a manufacturer of household products and offer bulk gift certificates for three of its soap products. A buyer might be a local grocery store who purchases bulk gift certificates for these soap products. The seller may specify certain restrictions or conditions for the gift certificates, and the buyer may specify further restrictions or conditions that are consistent with (equal to or narrower in scope) the seller's restrictions and conditions when acquired by an ultimate consumer end-user.

Such restrictions and conditions on assets may include, for example, their overall value, any applicable discounts, expiration time, product references, target audience, any applicable age restrictions, required authentication settings, or any applicable transferring restrictions. Some examples follow.

With regard to an overall value, this may be defined as the price a buyer needs to pay for acquiring the asset, such as "$5", "$100", or "$100,000". The asset value may be further discounted by quantities ordered if needed. The applicable discounts may be defined as discounts that may be applied to a particular product, or class of product, at the time of acquisition by a buyer, such as "30%" or "$20 Off". The buyer may further modify the value when offering the asset to the consumer end-user, provided it is consistent with the seller's conditions. For example, the buyer could purchase 1000 $5 coupons for Brand X soap from the seller and then offer them to consumer end-users for $4.95.

An expiration time may be defined as the day and hour at which point a particular asset, once acquired by a buyer, ceases to be usable by the buyer, or any receivers or consumer end-users. The expiration time may be in a form such as "May 31, 2017", "Next 30 days", or "8 am-9 pm", or according to any other absolute or relative time criteria. As noted above, the buyer may further restrict this criterion before making the asset available to a consumer end-user. For example, if the time window from the seller is "next 30 days", but the retailer buyer's place of business will be closed for the last two days, it could further restrict the expiration of time to being "next 28 days".

The product references may be defined as categories that correspond to a particular asset, such as food, clothes, alcohol, consumer electronics, cars, homes, bonds, travel tickets, and others. The target audience may be defined by groups such as child, teenager, adult, retired, couple, professional, retiree, male or female, for example. The applicable age restrictions may be defined as an age restriction that constrain the purchase of an asset, such as being at least 18 years old to buy cigarettes and at least 21 years old to buy alcohol, for example.

The required authentication may be defined as the level of authentication that a buyer (and/or consumer end-user) needs to provide when acquiring a particular asset, ranging from no required authentication (e.g., only a registered user account login and password), to low-level authentication based on the delivery of a one-time-passcode (OTP) to the registered user mobile connected device running the augmented reality application, to a medium-level authentication based on voice recognition from the built-in microphone, to high-level authentication based on facial and voice recognition as captured by the microphone and webcam of the registered user mobile connected device running the augmented reality application and processed by the platform back-end authentication systems.

The transferring restrictions may be defined as a way to control the redistribution, or gifting, of a purchased asset, defining, for instance, if an asset may be transferred (gifted) to a different consumer end-user or instead may only be used by its original consumer end-user. Additional restrictions may apply to a buyer or consumer end-user based on an attribute of the assets that may be used. For example, a restriction might be imposed that a consumer end-user may only use an aggregated value of the asset within a particular time period, for example.

A second use case illustrates a use of merchant gift card services for B2C accounts. In this use case, a B2C registered user is looking at purchasing a particular asset for her own use, as posted by the augmented reality platform. Here, the seller may be the buyer in the above B2B use case, or may be an originating seller of assets, and the buyer in this use case is a consumer end-user. The seller here has posted a number of assets available to buyers.

According to a proximity location service, once a prospective buyer gets within close proximity of the recorded geographic retail location associated with that brand and/or merchant as may be determined by GPS or other location criteria (location proximate to nearby network or cell phone devices, user indication, etc.), and (optionally) the prospective buyer points its mobile connected device towards the general direction of that retail location (or provides some other indication of the particular retailer of interest, such as choosing from a selection list of retailers located within the proximity), the augmented reality application that runs on the buyer's mobile connected device with built-in camera displays a listing of published assets available for purchase from that particular merchant as posted by the augmented reality application.

Borrowing from the previous use case, Store A is offering $5 coupons for Brand X soap. As the consumer is standing outside of Store A and pointing her camera at Store A, she sees in the display the $5 coupon for Brand X soap superimposed over the image of the store captured by her camera on the display. Moving the phone and its built-in camera away from pointing at the general reported location of the merchant, such as moving it left or right, could operate in different selectable ways. In a first selectable way, the system locks on the seller (here, Store A, possibly by the user initiating a lock via, e.g., a displayed lock button) and the published assets and descriptions keep being presented onto the buyer's augmented reality application. In a second selectable way, the system updates, based on the selected seller. For example, if the user points her camera at Store B, which is next door to Store A, then the assets of Store B could be displayed to the user.

Once an asset is presented to the buyer within the augmented reality application, the buyer may review all available information as posted by the merchant and directly purchase that asset via the integrated payment gateway interfaced to various financial service providers, using mechanisms described above. Following approval of the transaction, the platform may transfer the purchased asset to the account of the buyer, at which point that particular asset may be used by the buyer. For example, a buyer who is in front a branded coffee retail location may purchase a gift card of specific monetary value redeemable at any brand's location when pointing its connected mobile device towards the location of that merchant while running the augmented reality application. The purchased gift card gets delivered to the account of the buyer, who may present it to the clerk, or use it online, for purchasing goods or services. In order to purchase a particular asset, the buyer should satisfy the conditions defined by the merchant who posted the asset, as described above.

A third use case also illustrates a use of merchant gift card services for B2C accounts. In this use case, a B2C registered user is looking at purchasing a particular asset, as posted by the augmented reality platform, for one of his connections. The proximity location service and the purchasing of the asset may operate in a manner similar to that described above. Here, a transferring of the asset is described.

Once an asset is purchased and delivered to the account of a buyer, that asset may be transferred, based on its transferring properties, to a particular connection of the buyer. As a result of a transfer, the asset may be removed from the account of the buyer and transferred to the account of the receiver.

As described above, the buyer of an asset may set additional properties or restrictions for an asset to be transferred in addition to preexisting ones set on the asset. This secondary (or possibly tertiary) set of properties may be used to either overlap certain original asset properties or to complement them. For example, the overall value of a transferred asset by a buyer may be set to nothing if defined as a gift, or to a specific monetary value of its choice. For example, a buyer may gift a purchased asset to a connection, effectively setting its transfer value to zero, or alternatively set a value of its choice, be it lower or higher than the original purchased asset. Similarly, a particular discount set by a merchant may be further discounted by a buyer before being transferred to a connection. For example, a buyer may purchase an additional $5 discount on top of a $20 discount that would be set by a merchant.

In one configuration, the expiration time set by a buyer may not extend the expiration time of the merchant, if set, but could further restrict it. For example, a buyer may set the expiration time of a transferred asset to within 30 days from a merchant expiration time of 60 days. The reverse could be allowed by the platform.

Similarly, in a configuration, the age restrictions, authentication level, or any further transferring restrictions may only be redefined by the buyer as a subset of the original properties defined by the merchant.

Once an asset has been transferred by its buyer to one of its connections, (i.e., the recipient), the account of the recipient may be credited with the transferred asset, and the recipient may be notified about the credited asset. To redeem the asset, the recipient may travel to within close proximity of the recorded geographic retail location associated with the brand and/or merchant of the asset. By pointing its mobile connected device towards the general direction of that retail location, the recipient may trigger the augmented reality application that runs on its mobile connected device and built-in camera to display the newly transferred assets, effectively redeeming that asset for use at that particular merchant location, or merchant network, based on the transferred properties of the asset as defined jointly by the merchant and buyer, as described above.

A fourth use case also illustrates a use of merchant gift card services for B2C accounts. In this use case, a B2C registered user is looking at purchasing a particular asset for several of her connections, as posted by the augmented reality platform. The proximity location service and the purchasing of the asset may operate in a manner similar to that described above. Here, a transferring of the asset is described.

Once an asset is purchased and delivered to the account of a buyer, that asset may be transferred, based on its transferring properties, to multiple connections of the buyer. As a result of a transfer, the asset is removed from the account of the buyer and transferred to the account of all receivers.

For example, the CEO of a corporation may purchase a plurality of merchant gift cards intended for all of a selection of her employees by stepping in front of a particular retail location from the augmented reality application and transferring these cards automatically to the individual employee accounts in a controlled way by defining the asset properties at the employee's group level. This could be, for example, the CEO stepping in front of a Starbucks and pointing her cell phone camera at the store, seeing the availability of $2.00 gift cards overlaid on the image of the store captured by her camera, selecting the $2.00 gift card, and directing this gift card to each of a group of employees who have been recognized as receiving a service reward.

As described above, the asset purchased by a buyer comes with a set of properties that may be edited by the buyer. Depending on the asset, the location property that may be used by the augmented reality application to correlate that asset to a particular registered user location may be set by the buyer when that property location is not specifically defined by the merchant. For instance, an asset such as a gift card which is not location defined, may be set by the buyer before being transferred to its connections. In the above example, the CEO of the corporation may set the merchant gift card location to be transferred to its employees to the location of its company, event or any other location, effectively constraining the redemption of these assets to the specified location, as controlled and managed by the augmented reality application.

With regard to the platform architecture, the "Gift Card Personalized Services" back-end system may include components necessary to support the gift card augmented reality applications, including a B2B and B2C portal, data visualization, compute jobs, back-end systems APIs, content catalog database, and may include a set of secured encrypted APIs to communicate and interface with third-party service provider systems to import data into data lakes as described below.

The augmented reality applications may include components that may be downloaded from a server to the user's connected mobile device, and provide services to the downloaded component when a server-side application is running. The B2B and B2C portals may be a gateway (proxy) to backend APIs, as requested by gift card augmented reality applications. The back-end systems APIs may provide a listing of APIs that gift card services call for interacting with the back-end system and include users, access rights, marketing data, finance data, legal data, ecommerce data, and other data. The listing may be grouped by domain of applications, such as music, sports, health, food, etc.

The compute platform may handle the generation of the data files and an asset playlist, for instance a video playlist, that gift card augmented reality applications depend on. It may push the data files to the data visualization platform where they may be consumed by the gift card augmented reality applications on connected devices. These functions may be run on regular time intervals to update the data files and playlist. The data catalog describing those data files may include a DataSet Catalog and Metadata Catalog API. It may also contain data access rules that manage data-related rules, encryption, and decryption of data. The data catalog may also record changes made to the data.

Data lakes may be used to captures analytically useful datasets onto one single infrastructure, and may contain collections of domain specific assets, such as gift cards, coupons, brands, categories, merchant data, user data, third-party data, etc. The data visualization platform and content distribution component may handle content data requests and delivery to the gift card augmented reality applications, and may include support for data visualization based on mobile device types and other display formats. It may create and send temporary URLs to the user's mobile phone and push asset playlists to distribution server. An enterprise eCommerce and backend system may contain a typical enterprise ecommerce and backend system, but that includes components described above, and may also include an enterprise data warehouse.

General Computer Architecture

Figure 34:
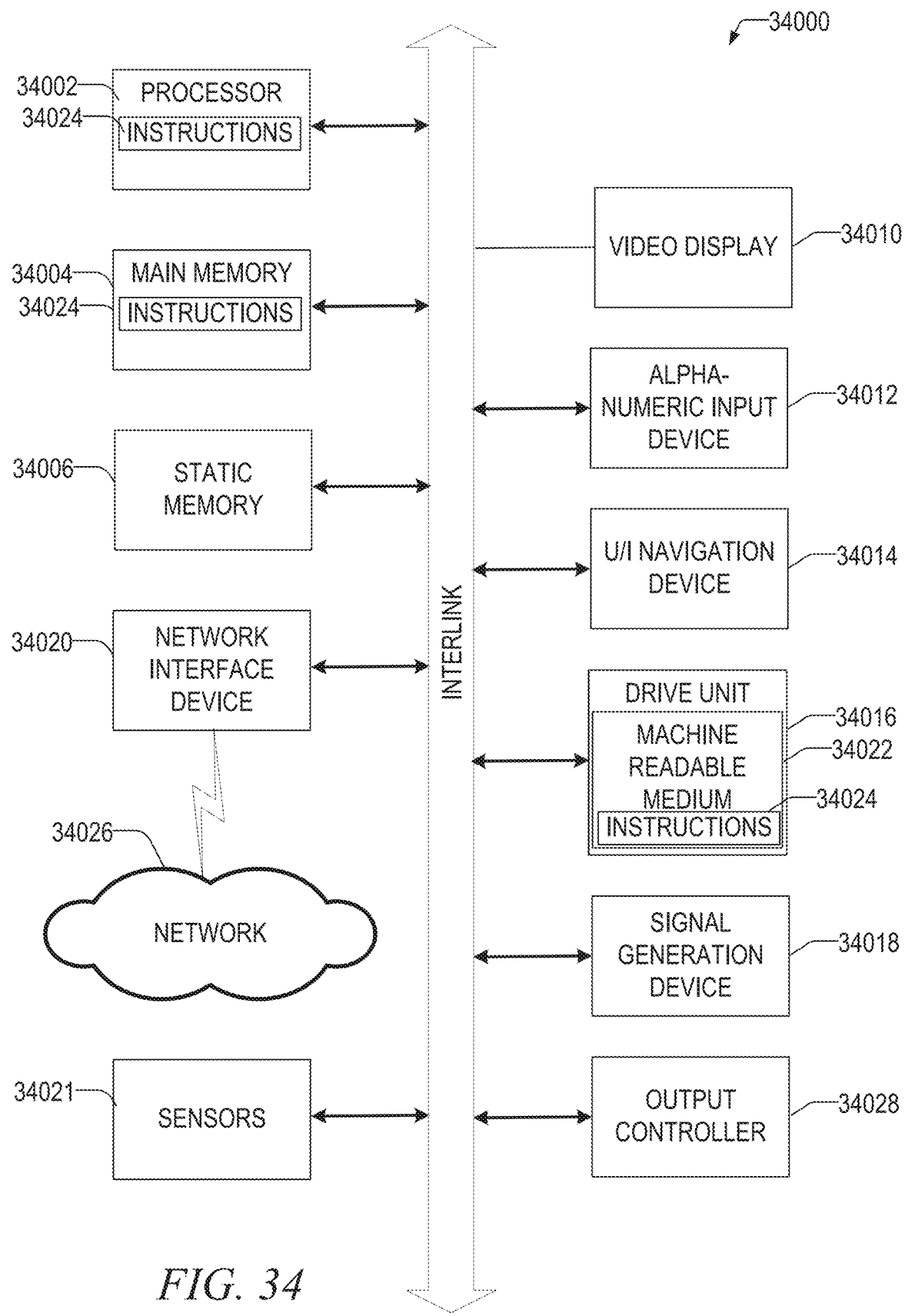
FIG. 34 is a block diagram illustrating an example of a machine upon which one or more embodiments may be implemented.

FIG. 34 is a block diagram illustrating an example of a machine 34000 upon which one or more of the techniques (e.g., methodologies) discussed herein may be performed. In alternative embodiments, the machine 34000 may operate as a standalone device or may be connected (e.g., networked) to other machines. In a networked deployment, the machine 34000 may operate in the capacity of a server machine, a client machine, or both in server-client network environments. In an example of a machine described herein, the machine 34000 may act as a peer machine in peer-to-peer (P2P) (or other distributed) network environment. The machine 34000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 34000 may function as an MUA, MTA, computing device executing a mobile wallet application, DNS, CA, PKS, Key Manager, Key Keeper, or the like. For example, the machine 34000 may be configured to perform any of the operations illustrated in FIGS. 5-10, 12, and 14. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules may include tangible entities (e.g., hardware) capable of performing specified operations and may be configured or arranged in a certain manner. In an example, circuits may be arranged (e.g., internally or with respect to external entities such as other circuits) in a specified manner as a module. In an example as described herein, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example as described herein, the software, when executed by the underlying hardware of the module, causes the hardware to perform the specified operations.

Accordingly, the term "module" is understood to encompass a tangible entity, and that entity may be one that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 34000 may include a hardware processor 34002 (e.g., a central processing unit (CPU), a graphics processing unit (GPU), a hardware processor core, or any combination thereof), a main memory 34004 and a static memory 34006, some or all of which may communicate with each other via an interlink (e.g., bus) 34008. The machine 34000 may further include a display unit 34010, an alphanumeric input device 34012 (e.g., a keyboard), and a user interface (UI) navigation device 34014 (e.g., a mouse). In an example described herein, the display unit 34010, input device 34012 and UI navigation device 34014 may be a touch screen display. The machine 34000 may additionally include a storage device (e.g., drive unit) 34016, a signal generation device 34018 (e.g., a speaker), a network interface device 34020, and one or more sensors 34021, such as a global positioning system (GPS) sensor, compass, accelerometer, or other sensor. The machine 34000 may include an output controller 34028, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 34016 may include a machine readable medium 34022 on which is stored one or more sets of data structures or instructions 34024 (e.g., software) embodying or utilized by any one or more of the techniques or functions described herein. The instructions 34024 may also reside, completely or at least partially, within the main memory 34004, within static memory 34006, or within the hardware processor 34002 during execution thereof by the machine 34000. In an example, one or any combination of the hardware processor 34002, the main memory 34004, the static memory 34006, or the storage device 34016 may constitute machine readable media.

While the machine readable medium 34022 is illustrated as a single medium, the term "machine readable medium" may include a single medium or multiple media (e.g., a centralized or distributed database, and/or associated caches and servers) configured to store the one or more instructions 34024.

The term "machine readable medium" may include any medium that is capable of storing, encoding, or carrying instructions for execution by the machine 34000 and that cause the machine 34000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 34024 may further be transmitted or received over a communications network 34026 using a transmission medium via the network interface device 34020. The Machine 34000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 34020 may include one or more physical jacks (e.g., Ethernet, coaxial, or phone jacks) or one or more antennas to connect to the communications network 34026. In an example, the network interface device 34020 may include a plurality of antennas to wirelessly communicate using at least one of single-input multiple-output (SIMO), multiple-input multiple-output (MIMO), or multiple-input single-output (MISO) techniques. In some examples, the network interface device 34020 may wirelessly communicate using Multiple User MIMO techniques.

What is claimed is:

1. A method for creating and securely transmitting, over a network interface, a proxy element, the method comprising:
using a processor of a computing device, executing a mobile wallet application to perform operations comprising:
providing, as part of the mobile wallet application, a graphical user interface (GUI);
receiving user input through the GUI defining usage parameters of the proxy element through a user interface associated with the mobile wallet application;
creating the proxy element, the proxy element including at least one of the usage parameters; and
sending the proxy element including the usage parameters over a packet-based network to a recipient mobile wallet application on a second computing device by addressing a message to a recipient mobile wallet, the message including a recipient mobile wallet address, the proxy element encrypted in the message with a public key of the recipient mobile wallet, the public key determined based upon a domain name portion of the recipient mobile wallet address of the recipient mobile wallet, wherein the proxy element includes information usable by a second instance of the recipient mobile wallet application to engage in a transaction so long as the usage parameters are respected.

2. The method of claim 1, wherein:
the usage parameters comprise at least one of:
a spending limit, a time duration, a use number condition, a transfer condition, and a product condition.

3. The method of claim 2, wherein the receiving of the user input further comprises receiving a selection of an originator wallet element, the proxy element being a proxy of the selected wallet element.

4. The method of claim 3, further including disabling the selected wallet element while the proxy element is active.

5. The method of claim 2, further comprising:
producing an electronic gift card with a gift card maker in the mobile wallet application, comprising:
providing a search utility to permit searching to find and select a merchant of choice in the mobile wallet application;
presenting a selectable list of payment elements in the mobile wallet accepted by a selected merchant;
providing an entry mechanism to permit specifying a value and usage condition for the electronic gift card;
providing a card designer to permit personalized content of the electronic gift card by entry of at least one of a message and media content;
contacting an issuer for recording the electronic gift card;
receiving payment credentials for the electronic gift card from the issuer;
producing the electronic gift card comprising the personalized content and payment credentials; and
transmitting the electronic gift card, via a network interface, to a recipient mobile wallet.

6. The method of claim 2, further comprising:
designating, by a borrower mobile wallet, a loaner mobile wallet as a helper to a mobile wallet provider;
requesting, by the borrower mobile wallet to the mobile wallet provider, communications with the loaner mobile wallet;
relaying the communications request to the loaner mobile wallet by the mobile wallet provider;
establishing communications between the borrower mobile wallet and the loaner mobile wallet;
requesting, by the borrower mobile wallet to the loaner mobile wallet, to purchase a selected item; and
receiving, by the borrower mobile wallet from the loaner mobile wallet, a loner element to permit the borrower mobile wallet to make the purchase of the selected item.

7. A computing device comprising:
a processor;
a memory, the memory including instructions for an originator mobile wallet application, the instructions, when executed by the processor, causes the computing device to perform operations comprising:
providing, as part of the originator mobile wallet application, a graphical user interface (GUI);
receiving user input through the GUI defining usage parameters of a proxy element through a user interface associated with the originator mobile wallet application;
formatting a request to create the proxy element from the received user input;
sending the request to create the proxy element, the request being sent via a network interface over a packet-based network, to a proxy approver system associated with the originator mobile wallet application, the request including at least one of the usage parameters;
receiving a proxy grant acknowledgement from the proxy approver system, the proxy grant acknowledgement including the proxy element; and
sending the proxy element including the usage parameters over the packet-based network to a recipient mobile wallet application on a second computing device by addressing a message to a recipient mobile wallet, the message including a recipient mobile wallet address, the proxy element encrypted in the message with a public key of the recipient mobile wallet, the public key determined based upon a domain name portion of the recipient mobile wallet address of the recipient mobile wallet, wherein the proxy element includes information usable by a second instance of the recipient mobile wallet application to engage in a transaction so long as the usage parameters are respected.

8. The computing device of claim 7, wherein:
the usage parameters comprise at least one of:
a spending limit, a time duration, a use number condition, a transfer condition, and a product condition.

9. The computing device of claim 8, wherein the proxy approver system includes one or more of a mobile wallet provider and an issuer of a wallet element related to the proxy element.

10. The computing device of claim 8, wherein the receiving of the user input further comprises receiving a selection of an originator wallet element, the proxy element being a proxy of the selected wallet element.

11. The computing device of claim 10, further including disabling the selected wallet element while the proxy element is active.

12. A non-transitory machine-readable medium, storing instructions for an originator mobile wallet application, the instructions, when executed by a computing device, causes the computing device to perform operations comprising:

providing, as part of the originator mobile wallet application, a graphical user interface (GUI);

receiving user input through the GUI defining usage parameters of a proxy element through a user interface associated with the originator mobile wallet application;

formatting a request to create the proxy element from the received user input;

sending the request to create the proxy element, the request being sent via a network interface, over a packet-based network, to a proxy approver system associated with the originator mobile wallet application, the request including at least one of the usage parameters;

receiving a proxy grant acknowledgement from the proxy approver system, the proxy grant acknowledgement including the proxy element; and sending the proxy element including the usage parameters over the packet-based network to a recipient mobile wallet application on a second computing device by addressing a message to a recipient mobile wallet, the message including a recipient mobile wallet address, the proxy element encrypted in the message with a public key of the recipient mobile wallet, the public key determined based upon a domain name portion of the recipient mobile wallet address of the recipient mobile wallet, wherein the proxy element includes information usable by a second instance of the recipient mobile wallet application to engage in a transaction so long as the usage parameters are respected.

13. The non-transitory machine-readable medium of claim 12, wherein:

the usage parameters comprise at least one of:

a spending limit, a time duration, a use number condition, a transfer condition, and a product condition.

14. The non-transitory machine-readable medium of claim 13, wherein the proxy approver system includes one or more of a mobile wallet provider and an issuer of a wallet element related to the proxy element.

15. The non-transitory machine-readable medium of claim 13, wherein the receiving of the user input further comprises receiving a selection of an originator wallet element, the proxy element being a proxy of the selected wallet element.

16. The non-transitory machine-readable medium of claim 15, further including disabling the selected wallet element while the proxy element is active.

* * * * *